US009852243B1

(12) United States Patent
Koop

(10) Patent No.: US 9,852,243 B1
(45) Date of Patent: Dec. 26, 2017

(54) HYBRID GEOTHERMAL HEAT PUMP DESIGN SIMULATION AND ANALYSIS

(71) Applicant: Dennis J. Koop, Fairview, TX (US)

(72) Inventor: Dennis J. Koop, Fairview, TX (US)

( * ) Notice: Subject to any disclaimer, the term of this patent is extended or adjusted under 35 U.S.C. 154(b) by 0 days.

(21) Appl. No.: 15/261,927

(22) Filed: Sep. 10, 2016

Related U.S. Application Data

(63) Continuation-in-part of application No. 15/231,520, filed on Aug. 8, 2016, which is a continuation-in-part of application No. 14/673,805, filed on Mar. 30, 2015, now Pat. No. 9,443,043.

(60) Provisional application No. 61/971,716, filed on Mar. 28, 2014.

(51) Int. Cl.
G06G 7/48 (2006.01)
G06F 17/50 (2006.01)
F24F 5/00 (2006.01)

(52) U.S. Cl.
CPC .. G06F 17/5009 (2013.01); *F24F 2005/0057* (2013.01)

(58) Field of Classification Search
CPC ............................................. F24F 2005/0057
USPC .............................................................. 703/6
See application file for complete search history.

(56) References Cited

U.S. PATENT DOCUMENTS

| 5,244,037 | A | 9/1993 | Warnke |
| 5,477,914 | A | 12/1995 | Rawlings |
| 5,992,507 | A | 11/1999 | Peterson et al. |
| 7,647,773 | B1 | 1/2010 | Koenig |

(Continued)

FOREIGN PATENT DOCUMENTS

WO WO2012061929 A1 5/2012

OTHER PUBLICATIONS

Kavanaugh (Ground Source Heat Pump System Designer GshpCalc Version 5.0: An Instruction Guide for Using a Design Tool for Vertical Ground-Coupled, Groundwater and Surface Water Heat Pumps Systems, 2010).*

(Continued)

*Primary Examiner* — Hugh Jones
(74) *Attorney, Agent, or Firm* — Law Office of Sam Sokhansanj PLLC

(57) ABSTRACT

An in-ground geothermal heat pump (GHP) closed loop design program is disclosed for designing, analyzing, and simulating a detailed model and analysis of a building's in-ground geothermal heat pump system, including borehole length, number of boreholes, heat pump capacity, grid layout, total electric operating costs, efficiency ratios, and hybrid designs, among others. In one aspect of the disclosure described herein, the GHP design program can reliably and efficiently predict the fluctuations of the GHP equipment performance in very small increments which enable the determination of energy consumption and demand information on a specific and unique hourly schedule basis for the building design, including incorporating thermal load data for each individual zone of the building. More specifically, the small increment method here can be used to eliminate overly broad approximations by evaluating GHP performance that is specific to building dynamics, constants, and variables for all of the building individual zones and the building's hourly operating schedule, thereby providing an efficient, reliable, simple, and effective geothermal heat pump design and simulation model.

20 Claims, 46 Drawing Sheets

(56) References Cited

U.S. PATENT DOCUMENTS

| | | |
|---|---|---|
| 8,346,679 B2 | 1/2013 | Baller |
| 2006/0101820 A1 | 5/2006 | Koenig et al. |
| 2010/0294456 A1 | 11/2010 | Taraba et al. |
| 2011/0220341 A1 | 9/2011 | Kidwell |
| 2011/0224942 A1 | 9/2011 | Kidwell |
| 2012/0080163 A1 | 4/2012 | Hoffman |
| 2012/0318491 A1 | 12/2012 | Melink |
| 2014/0133519 A1 | 5/2014 | Freitag |
| 2015/0013370 A1 | 1/2015 | Wiggs |

OTHER PUBLICATIONS

"Geothermal Energy", Chapter 34, pp. 463-496, ASHRAE Handbook, HVAC applications, 2011; 34 pp.

"A Modified Analytical Method for Simulating Cyclic Operation of Vertical U-Tube Ground-Coupled Heat Pumps", Dobson, Monte K., et al., Nov. 1994, ASME Int'l Solar Energy Conference Proceedings; 8 pp.

Ian W Johnston, "Geothermal Energy Using Ground Source Heat Pumps", New Zealand Geothermal Workshop 2012 Proceedings, Nov. 19-21, 2012, Auckland, New Zealand; 8 pp.

"Ground Source Heat Pump Simulation within a Whole-Building Analysis", Purdy, Julia, et al., pp. 1077-1084, Eighth International IBSPA Conference, Eindhoven, Netherlands, Aug. 11-14, 2003; 88 pp.

Soolyean Cho, Sedighehsadat Mirianhosseinabadi, "Simulation Modeling of Ground Source Heat Pump Systems for the Performance Analysis of Residential Buildings", Proceedings of BS2013: 13th Conference of International Building Performance Simulation Association, Chambéry, France, Aug. 26-28, 2013 8 pp.

Deerman, J.D., Kavanaugh, S.P., "Simulation of Vertical U-Tube Ground- Coupled Heat Pump Systems Using the Cylindrical Heat Source Solution", Conference Proceeding by ASHRAE, 1991; 4 pp.

Carl Hiller, "Grouting for Vertical Geothermal Heat Pump Systems (Engineering Design and Field Procedures Manual)", International Ground Source Heat Pump Association, 2000; 2 pp.

Richard A. Beier, Garen N. Ewbank, "In-Situ Test Thermal Response Tests Interpretations", OG&E Ground Source Heat Exchange Study, Aug. 2012; 26 pp.

Sung Lok Do, Jeff S. Haberl, "A Review of Ground Coupled Heat Pump Models Used in Whole-Building Computer Simulation Programs", Proceedings of the 17th Symposium for Improving Building Systems in Hot and Humid Climates, Austin, Texas, Aug. 24-25, 2010; 9 pp.

Stephen P. Kavanaugh, Kevin Rafferty, "Ground-Source Heat Pumps: Design of Geothermal Systems for Commercial and Institutional Buildings", American Society of Heating, Refrigerating and Air-Conditioning Engineers, Inc., 1997; 176 pp.

"The Ground Loop Design(TM) Premier 2012 Edition User's Manual", Gaia Geothermal, Part No. GGENG-1107, Oct. 2012; 365 pp.

"Geothermal Heat Pump Design Manual", Application Guide AG 31-008, McQuay International, 2002; 70 pp.

Steve Kavanaugh, Josh Kavanaugh, "Long Term Commercial GSHP Performance", ASHRAE Journal, Sep. 2012; 18 pp.

Phetteplace: Basic Design Considerations for Geothermal Heat Pump Systems 2005 Tri-Service Infrastructure Systems Conference and Exhibition; 2005; 39 pp.

\* cited by examiner

Continued from FIG. 7

Continued from FIG. 8

GEO DESIGN - COOLING EXAMPLE - ZONE #1 - HYBRID = 0%
ITERATION STEPS - OFFICE - DALLAS, TEX - ZONE OPERATING COST - GROUND BTU'S

| TEMP | HOURS | ZONE BTU/HR | EWT | TYPE | H. PUMP BTU/HR | H. PUMP kW | kWHR | GROUND TRANSFER BTU'S |
|---|---|---|---|---|---|---|---|---|
| 103 | 3 | 370,167 | 95.46 | FULL | 353,239 | 26.558 | 83 | -1,395,372 |
| 102 | 2 | 358,900 | 94.47 | FULL | 355,906 | 26.254 | 53 | -898,466 |
| 101 | 3 | 347,633 | 93.49 | FULL | 358,573 | 25.951 | 76 | -1,300,433 |
| 100 | 6 | 336,367 | 92.51 | FULL | 361,240 | 25.649 | 144 | -2,507,123 |
| 99 | 7 | 325,100 | 91.53 | FULL | 363,907 | 25.346 | 160 | -2,816,515 |
| 98 | 13 | 313,833 | 90.55 | FULL | 366,573 | 25.044 | 283 | -5,030,880 |
| 97 | 35 | 302,576 | 89.57 | FULL | 369,205 | 24.757 | 723 | -13,012,682 |
| 96 | 54 | 291,300 | 88.59 | FULL | 371,791 | 24.487 | 1059 | -19,265,173 |
| 95 | 61 | 280,033 | 87.61 | FULL | 374,377 | 24.218 | 1134 | -20,852,381 |
| 94 | 50 | 268,767 | 86.63 | PART | 276,009 | 16.580 | 809 | -16,192,682 |
| 93 | 54 | 257,500 | 85.65 | PART | 277,925 | 16.328 | 823 | -16,692,319 |
| 92 | 54 | 246,233 | 84.67 | PART | 279,844 | 16.076 | 773 | -15,902,876 |
| 91 | 58 | 234,967 | 83.69 | PART | 281,767 | 15.825 | 778 | -16,239,610 |
| 90 | 60 | 223,700 | 82.71 | PART | 283,694 | 15.574 | 753 | -15,936,080 |
| 89 | 52 | 212,433 | 81.73 | PART | 285,625 | 15.324 | 608 | -13,068,618 |
| 88 | 57 | 201,167 | 80.75 | PART | 287,560 | 15.073 | 620 | -13,517,309 |
| 87 | 62 | 189,900 | 79.76 | PART | 289,439 | 14.835 | 625 | -13,832,853 |
| 86 | 61 | 178,633 | 78.78 | PART | 291,132 | 14.635 | 570 | -12,765,563 |
| 85 | 64 | 167,367 | 77.80 | PART | 292,821 | 14.434 | 552 | -12,513,022 |
| 84 | 72 | 156,100 | 76.82 | PART | 294,507 | 14.234 | 570 | -13,092,638 |
| 83 | 72 | 144,833 | 75.84 | PART | 296,189 | 14.034 | 521 | -12,113,899 |
| 82 | 80 | 133,567 | 74.86 | PART | 297,869 | 13.835 | 525 | -12,378,689 |
| 81 | 71 | 122,300 | 73.88 | PART | 299,545 | 13.636 | 420 | -10,031,995 |
| 80 | 82 | 111,033 | 72.90 | PART | 301,217 | 13.437 | 434 | -10,490,537 |
| 79 | 71 | 99,767 | 71.92 | PART | 302,887 | 13.239 | 332 | -8,139,808 |
| 78 | 72 | 88,500 | 70.94 | PART | 304,533 | 13.041 | 294 | -7,302,940 |
| 77 | 78 | 77,233 | 69.96 | PART | 306,216 | 12.843 | 273 | -6,886,277 |
| 76 | 53 | 65,967 | 68.98 | PART | 307,875 | 12.646 | 156 | -3,986,209 |
| 75 | 69 | 54,700 | 68.00 | PART | 309,532 | 12.449 | 165 | -4,292,218 |
| | | | | | | TOTAL | 14,316 | -302,455,000 |
| | | | | | | | x .08 | GROUND BTU'S |
| | | TOTAL ZONE #1 GEO DESIGN COOLING OPERATING COST | | | | | $ 1,145 | |

FIG. 9

| | | | | Geo Design - Heating Example - Zone #1 - hybrid = 0% | | | | |
|---|---|---|---|---|---|---|---|---|
| | | | | Iteration Steps - Office - Dallas, Tex - Zone Operating Cost - Ground Btu's | | | | |
| Temp | Hours | Zone Btu/hr | Ewt | Type | H. Pump Btu/hr | H. Pump kW | kWhr | Ground Transfer Btu's |
| 61 | 91 | 2,306 | 65.88 | Part | 368,319 | 17.887 | 11 | 175,104 |
| 59 | 81 | 14,974 | 65.41 | Part | 365,964 | 17.883 | 66 | 1,010,698 |
| 57 | 89 | 27,643 | 64.93 | Part | 363,616 | 17.879 | 133 | 2,047,435 |
| 55 | 89 | 40,311 | 64.46 | Part | 361,273 | 17.876 | 195 | 2,981,963 |
| 53 | 70 | 52,979 | 63.99 | Part | 358,937 | 17.872 | 202 | 3,078,480 |
| 51 | 56 | 65,647 | 63.52 | Part | 356,607 | 17.868 | 201 | 3,047,728 |
| 49 | 65 | 78,315 | 63.05 | Part | 354,283 | 17.864 | 278 | 4,214,669 |
| 47 | 69 | 90,983 | 62.58 | Part | 351,965 | 17.861 | 344 | 5,190,863 |
| 45 | 55 | 103,651 | 62.10 | Part | 349,654 | 17.857 | 313 | 4,707,438 |
| 43 | 47 | 116,319 | 61.63 | Part | 347,349 | 17.853 | 301 | 4,508,251 |
| 41 | 49 | 128,987 | 61.16 | Part | 345,050 | 17.849 | 349 | 5,204,819 |
| 39 | 60 | 141,655 | 60.69 | Part | 342,757 | 17.846 | 470 | 6,989,461 |
| 37 | 38 | 154,323 | 60.22 | Part | 340,470 | 17.842 | 325 | 4,815,755 |
| 35 | 24 | 166,991 | 59.75 | Part | 338,189 | 17.838 | 223 | 3,286,523 |
| 33 | 22 | 179,660 | 59.27 | Part | 335,915 | 17.834 | 220 | 3,236,522 |
| 31 | 33 | 192,328 | 58.80 | Part | 333,647 | 17.830 | 354 | 5,189,531 |
| 29 | 17 | 204,996 | 58.33 | Part | 331,385 | 17.827 | 195 | 2,845,282 |
| 27 | 11 | 217,664 | 57.86 | Part | 329,129 | 17.823 | 134 | 1,951,918 |
| 25 | 4 | 230,332 | 57.39 | Part | 326,880 | 17.819 | 52 | 749,963 |
| 23 | 6 | 243,000 | 56.92 | Part | 324,636 | 17.815 | 82 | 1,185,000 |
| 19 | 2 | 268,336 | 55.97 | Part | 320,168 | 17.808 | 30 | 434,825 |
| 15 | 2 | 293,672 | 55.03 | Part | 315,725 | 17.800 | 33 | 474,360 |
| 13 | 1 | 306,340 | 54.56 | Part | 313,512 | 17.796 | 17 | 247,008 |
| | | | | | | Total | 4,528 x .08 | 67,574,000 Ground Btu's |
| | | | | Total Zone #1 Geo Design Heating Operating Cost | | | $ 362 | |

FIG. 9A continued from Fig 9

Geo Benchmark - Cooling Example - Zone #1 - Hybrid = 0%
Iteration Steps - Office - Dallas, Tex - Zone Operating Cost - Ground Btu's

| Temp | Hours | Zone Btu/hr | EWT | Type | H. Pump Btu/hr | H. Pump kW | kWhr | Ground Transfer Btu's |
|---|---|---|---|---|---|---|---|---|
| 103 | 3 | 370,167 | 86.67 | Full | 376,860 | 23.960 | 71 | -1,351,401 |
| 102 | 2 | 358,900 | 86.00 | Full | 378,618 | 23.778 | 45 | -871,608 |
| 101 | 3 | 347,633 | 85.33 | Full | 380,377 | 23.595 | 65 | -1,263,631 |
| 100 | 6 | 336,367 | 84.67 | Full | 382,135 | 23.413 | 125 | -2,440,105 |
| 99 | 7 | 325,100 | 84.00 | Full | 383,894 | 23.231 | 140 | -2,745,575 |
| 98 | 13 | 313,833 | 83.33 | Full | 385,652 | 23.049 | 248 | -4,911,812 |
| 97 | 35 | 302,576 | 82.67 | Full | 387,411 | 22.868 | 639 | -12,722,617 |
| 96 | 54 | 291,300 | 82.00 | Full | 389,169 | 22.868 | 941 | -18,858,906 |
| 95 | 61 | 280,033 | 81.33 | Part | 286,398 | 15.223 | 910 | -20,180,111 |
| 94 | 50 | 268,767 | 80.67 | Part | 287,714 | 15.053 | 708 | -15,837,328 |
| 93 | 54 | 257,500 | 80.00 | Part | 289,032 | 14.884 | 724 | -16,348,106 |
| 92 | 54 | 246,233 | 79.33 | Part | 290,184 | 14.747 | 686 | -15,602,177 |
| 91 | 58 | 234,967 | 78.67 | Part | 291,334 | 14.611 | 697 | -15,960,007 |
| 90 | 60 | 223,700 | 78.00 | Part | 292,483 | 14.474 | 680 | -15,688,317 |
| 89 | 52 | 212,433 | 77.33 | Part | 293,630 | 14.338 | 555 | -12,886,986 |
| 88 | 57 | 201,167 | 76.67 | Part | 294,776 | 14.202 | 571 | -13,351,449 |
| 87 | 62 | 189,900 | 76.00 | Part | 295,920 | 14.066 | 580 | -13,683,342 |
| 86 | 61 | 178,633 | 75.33 | Part | 297,063 | 13.931 | 532 | -12,640,132 |
| 85 | 64 | 167,367 | 74.67 | Part | 298,204 | 13.795 | 518 | -12,402,171 |
| 84 | 72 | 156,100 | 74.00 | Part | 299,344 | 13.660 | 539 | -12,989,108 |
| 83 | 72 | 144,833 | 73.33 | Part | 300,482 | 13.524 | 495 | -12,029,448 |
| 82 | 80 | 133,567 | 72.67 | Part | 301,618 | 13.389 | 502 | -12,303,794 |
| 81 | 71 | 122,300 | 72.00 | Part | 302,753 | 13.255 | 404 | -9,980,391 |
| 80 | 82 | 111,033 | 71.33 | Part | 303,887 | 13.120 | 420 | -10,445,932 |
| 79 | 71 | 99,767 | 70.67 | Part | 305,019 | 12.985 | 323 | -8,112,343 |
| 78 | 72 | 88,500 | 70.00 | Part | 306,149 | 12.851 | 288 | -7,284,607 |
| 77 | 78 | 77,233 | 69.96 | Part | 307,278 | 12.717 | 269 | -6,874,845 |
| 76 | 53 | 65,967 | 68.67 | Part | 308,406 | 12.583 | 155 | -3,982,926 |
| 75 | 69 | 54,700 | 68.00 | Part | 309,532 | 12.449 | 165 | -4,292,218 |
| | | | | | | Total | 12,996 | -298,041,000 |
| | | | | | | | x .08 | Ground Btu's |
| | | Total Zone #1 Geo Benchmark Cooling Operating Cost | | | | | $ 1,039 | |

FIG. 10

| | GEO DESIGN - COOLING EXAMPLE - ZONE #1 - HYBRID = 20% | | | | | | | |
|---|---|---|---|---|---|---|---|---|
| | ITERATION STEPS - OFFICE - DALLAS, TEX - ZONE OPERATING COST - GROUND BTU'S | | | | | | | |
| TEMP | HOURS | ZONE BTU/HR | EWT | TYPE | H. PUMP BTU/HR | H. PUMP kW | KWHR | GROUND TRANSFER BTU'S |
| 103 | 3 | 273,600 | 94.96 | FULL | 354,573 | 26.406 | 63 | -1,029,366 |
| 102 | 2 | 273,600 | 94.18 | FULL | 356,706 | 26.163 | 41 | -684,142 |
| 101 | 3 | 273,600 | 93.39 | FULL | 358,840 | 25.921 | 61 | -1,023,100 |
| 100 | 6 | 273,600 | 92.61 | FULL | 360,973 | 25.679 | 120 | -2,040,053 |
| 99 | 7 | 273,600 | 91.82 | FULL | 363,107 | 25.437 | 138 | -2,372,977 |
| 98 | 13 | 273,600 | 91.04 | FULL | 365,240 | 25.195 | 252 | -4,393,963 |
| 97 | 35 | 273,600 | 90.25 | FULL | 367,374 | 24.954 | 667 | -11,795,344 |
| 96 | 54 | 273,600 | 89.47 | FULL | 369,463 | 24.730 | 1015 | -18,148,590 |
| 95 | 61 | 273,600 | 88.69 | FULL | 371,532 | 24.514 | 1131 | -20,446,913 |
| 94 | 50 | 268,767 | 86.63 | PART | 276,009 | 16.580 | 809 | -16,192,682 |
| 93 | 54 | 257,500 | 85.65 | PART | 277,925 | 16.328 | 823 | -16,692,319 |
| 92 | 54 | 246,233 | 84.67 | PART | 279,844 | 16.076 | 773 | -15,902,876 |
| 91 | 58 | 234,967 | 83.69 | PART | 281,767 | 15.825 | 778 | -16,239,610 |
| 90 | 60 | 223,700 | 82.71 | PART | 283,694 | 15.574 | 753 | -15,936,080 |
| 89 | 52 | 212,433 | 81.73 | PART | 285,625 | 15.324 | 608 | -13,068,618 |
| 88 | 57 | 201,167 | 80.75 | PART | 287,560 | 15.073 | 620 | -13,517,309 |
| 87 | 62 | 189,900 | 79.76 | PART | 289,439 | 14.835 | 625 | -13,832,853 |
| 86 | 61 | 178,633 | 78.78 | PART | 291,132 | 14.635 | 570 | -12,765,563 |
| 85 | 64 | 167,367 | 77.80 | PART | 292,821 | 14.434 | 552 | -12,513,022 |
| 84 | 72 | 156,100 | 76.82 | PART | 294,507 | 14.234 | 570 | -13,092,638 |
| 83 | 72 | 144,833 | 75.84 | PART | 296,189 | 14.034 | 521 | -12,113,899 |
| 82 | 80 | 133,567 | 74.86 | PART | 297,869 | 13.835 | 525 | -12,378,689 |
| 81 | 71 | 122,300 | 73.88 | PART | 299,545 | 13.636 | 420 | -10,031,995 |
| 80 | 82 | 111,033 | 72.90 | PART | 301,217 | 13.437 | 434 | -10,490,537 |
| 79 | 71 | 99,767 | 71.92 | PART | 302,887 | 13.239 | 332 | -8,139,808 |
| 78 | 72 | 88,500 | 70.94 | PART | 304,533 | 13.041 | 294 | -7,302,940 |
| 77 | 78 | 77,233 | 69.96 | PART | 306,216 | 12.843 | 273 | -6,886,277 |
| 76 | 53 | 65,967 | 68.98 | PART | 307,875 | 12.646 | 156 | -3,986,209 |
| 75 | 69 | 54,700 | 68.00 | PART | 309,532 | 12.449 | 165 | -4,292,218 |
| | | | | | | TOTAL | 14,087 | -297,311,000 |
| | | | | | | | x .08 | GROUND BTU'S |
| | TOTAL ZONE #1 GEO DESIGN COOLING WITH HYBRID 20% OPERATING COST | | | | | | $ 1,127 | |

FIG. 11

Continued from FIG. 12

Geo Design - Cooling Example - Month & Year Total Building Btu's - Hybrid = 0%
Iteration Steps - Office - Dallas, Tex - Total Building Btu's

| Temp | Month Hours | Total Btu/Hr | Month Building Btu's | Year Hours | Total Yr Building Btu's |
|---|---|---|---|---|---|
| 103 | 3 | 740,333 | 2,222,000 | 3 | 2,221,000 |
| 102 | 2 | 717,800 | 1,435,000 | 2 | 1,436,000 |
| 101 | 3 | 695,267 | 2,086,000 | 3 | 2,086,000 |
| 100 | 4 | 672,733 | 2,691,000 | 6 | 4,036,000 |
| 99 | 5 | 650,200 | 3,251,000 | 7 | 4,551,000 |
| 98 | 6 | 627,667 | 3,766,000 | 13 | 8,160,000 |
| 97 | 14 | 605,133 | 8,472,000 | 35 | 21,180,000 |
| 96 | 17 | 582,600 | 9,904,000 | 54 | 31,460,000 |
| 95 | 24 | 560,067 | 13,442,000 | 61 | 34,164,000 |
| 94 | 18 | 537,533 | 9,675,000 | 50 | 26,877,000 |
| 93 | 20 | 515,000 | 10,300,000 | 54 | 27,810,000 |
| 92 | 13 | 492,467 | 6,402,000 | 54 | 26,593,000 |
| 91 | 17 | 469,933 | 7,989,000 | 58 | 27,256,000 |
| 90 | 10 | 447,400 | 4,474,000 | 60 | 26,844,000 |
| 89 | 14 | 424,867 | 5,948,000 | 52 | 22,093,000 |
| 88 | 14 | 402,333 | 5,633,000 | 57 | 22,933,000 |
| 87 | 16 | 379,800 | 6,077,000 | 62 | 23,548,000 |
| 86 | 7 | 357,267 | 2,501,000 | 61 | 21,793,000 |
| 85 | 9 | 334,733 | 3,012,000 | 64 | 21,423,000 |
| 84 | 10 | 312,200 | 3,122,000 | 72 | 22,478,000 |
| 83 | 8 | 289,667 | 2,317,000 | 72 | 20,856,000 |
| 82 | 4 | 267,133 | 1,069,000 | 80 | 21,371,000 |
| 81 | 5 | 244,600 | 1,233,000 | 71 | 17,367,000 |
| 80 | 9 | 222,067 | 1,999,000 | 82 | 18,209,000 |
| 79 | 3 | 199,533 | 598,000 | 71 | 14,167,000 |
| 78 | 3 | 177,000 | 531,000 | 72 | 12,744,000 |
| 77 | 5 | 154,467 | 733,000 | 78 | 12,048,000 |
| 76 | 4 | 131,933 | 527,000 | 53 | 6,992,000 |
| 75 | 5 | 109,400 | 547,000 | 69 | 7,549,000 |
|  |  |  | 121,986,000 |  | 510,245,000 |
|  |  |  | Total Month Building Btu's |  | Total Year Building Btu's |

FIG. 13

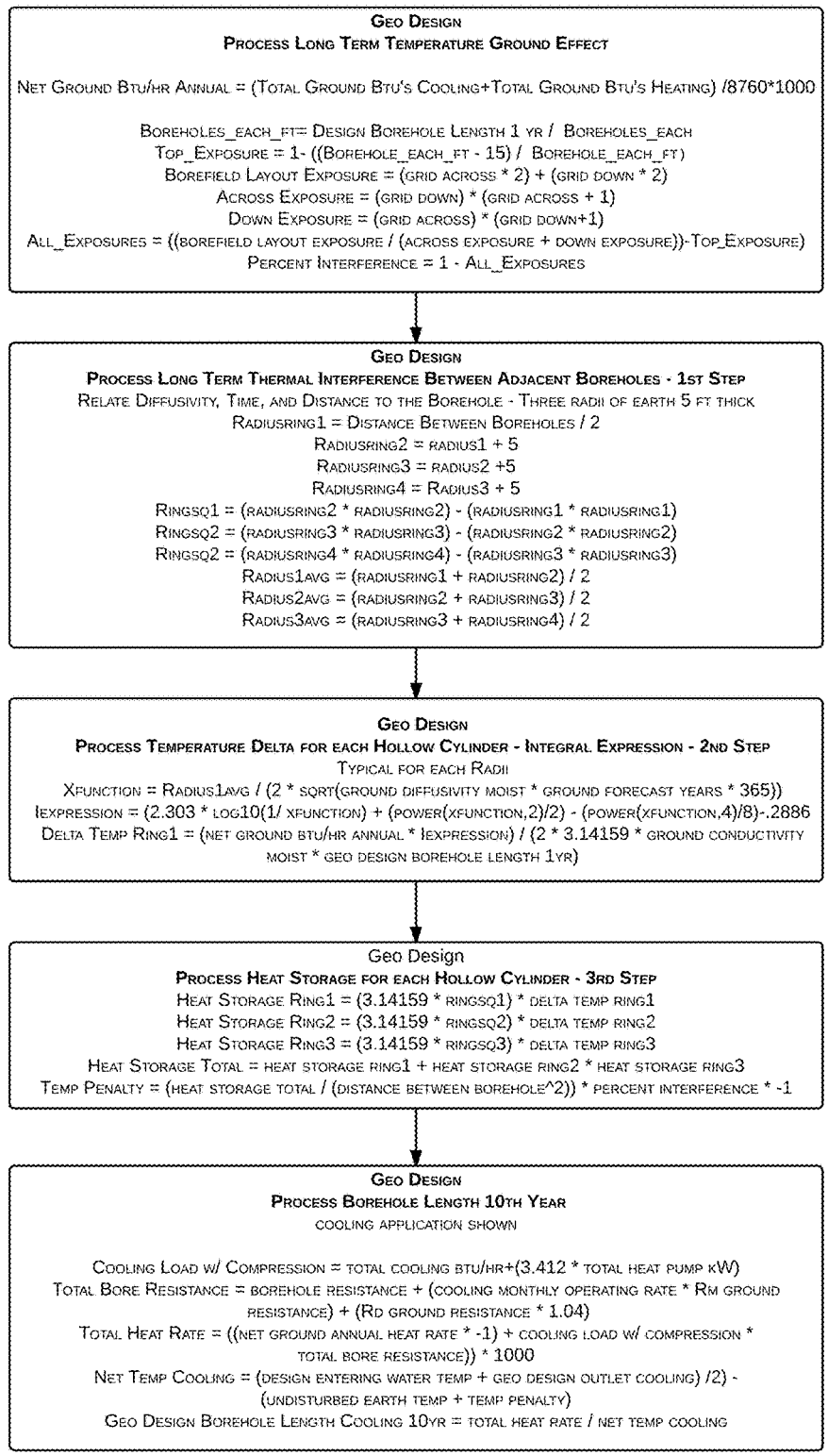
Continued from FIG. 14
FIG. 15

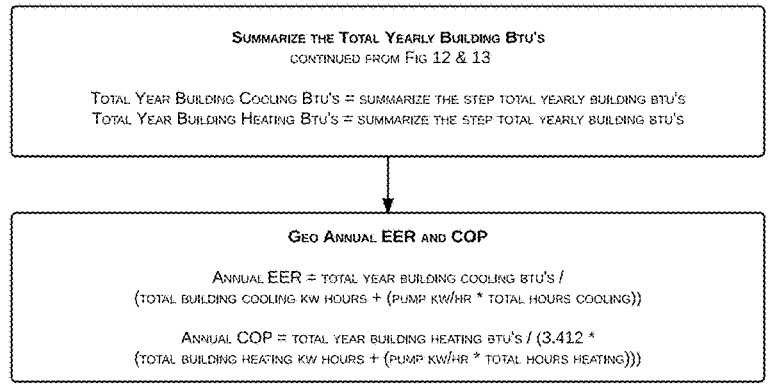
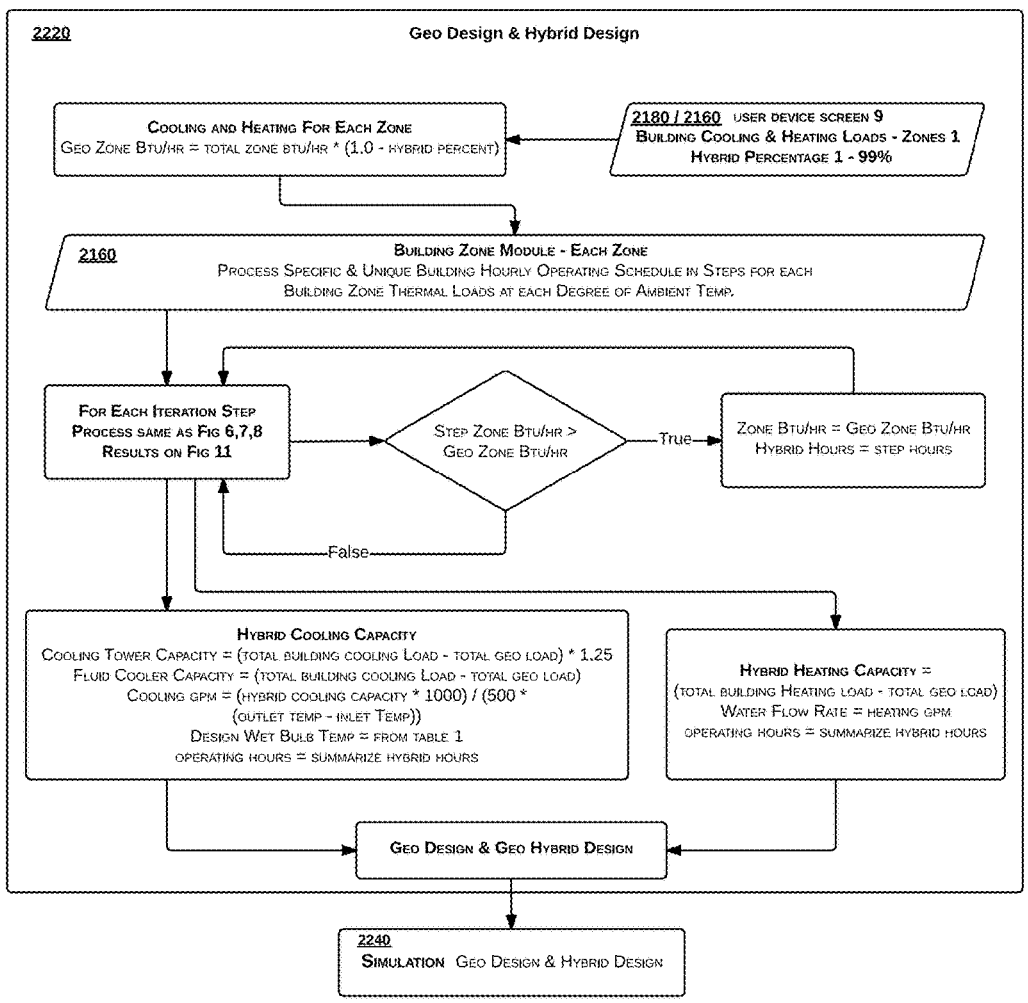
FIG. 17

| Simulations - Borehole Heat Exchanger Length & Electric Operating Cost | | | | |
|---|---|---|---|---|
| \_USER DEVICE SCREEN 12\_ | | | | |
| Climate Site Building Type | Design Temp. Air & Water | Building Btu Loads - $Elec | Borehole- Pipe - Grout | Ground Conditions |

| Simulation | Cooling | Heating | Units |
|---|---|---|---|
| Borehole Length - yr 10 | 12,612 | 4,636 | Feet |
| Boreholes | 36 | 36 | Each |
| Length per Borehole | 350 | 129 | Feet |
| Long Term Ground Effect | 2.4 | 4.9 | deg f |
| | | | |
| Borehole Length - yr 1 | 11,637 | 5,691 | Feet |
| | | | |
| Design Heat Pump Inlet | 93.0 | 50.0 | deg f |
| Design Heat Pump Outlet | 103.0 | 43.8 | deg f |
| | | | |
| Total - Building Btu Load | 684.0 | 486.0 | kBtu/hr |
| Geo - Building Btu Load | 684.0 | 486.0 | kBtu/hr |
| Geo - Heat pump Capacity | 719.8 | 799.9 | kBtu/hr |
| Geo - Peak Demand | 49.0 | 31.9 | kW |
| Geo - Flow Rate | 171.0 | 121.5 | gpm |
| Geo - Annual eer \| cop | 15.6 | 4.0 | eer \| cop |
| Geo - Elec Operating Cost $ | 2,616 | 963 | $ year |
| | | | |
| Benchmark Heat Pump Inlet | 85.0 | 50.0 | deg f |
| Benchmark Exceeds Design | 3,934 | 0 | Feet |
| Excess Feet Payback Period | 205 | 0 | Years |
| | | | |
| Undisturbed Earth Temp | | 68.0 | deg f |
| Ground Conductivity | | 1.30 | btu/hr-ft-f |
| Ground Diffusivity | | 0.75 | ft^2/day |
| Pipe Diameter | | 1.50 | inch |
| Borehole Diameter | | 6.00 | inch |
| Grout Conductivity | | 0.80 | btu/hr-ft-f |
| | | | |
| Borehole Resistance | | 0.177 | hr-ft-f/btu |
| | | | |
| Office - Hours Open | | 3,131 | annual |
| Ground Moisture | | 20 | % |
| Between Boreholes | | 20 | Feet |
| Grid Across Borefield | | 9 | Rows |
| Grid Down | | 4 | Columns |

FIG. 18

| Hybrid 25% Simulations - Borehole Heat Exchanger Length & Electric Operating Cost |||||
|---|---|---|---|---|
| USER DEVICE SCREEN 12A |||||
| Climate Site<br>Building Type | Design Temp.<br>Air & Water | Building Btu<br>Loads - $Elec | Borehole-<br>Pipe - Grout | Ground<br>Conditions |

| SIMULATION | COOLING | HEATING | Units |
|---|---|---|---|
| BOREHOLE LENGTH - YR 10 | 8,622 | 4,778 | FEET |
| BOREHOLES | 24 | 24 | EACH |
| LENGTH PER BOREHOLE | 359 | 199 | FEET |
| LONG TERM GROUND EFFECT | 3.1 | 4.3 | DEG F |
|  |  |  |  |
| BOREHOLE LENGTH - YR 1 | 7,804 | 5,717 | FEET |
|  |  |  |  |
| DESIGN HEAT PUMP INLET | 95.0 | 50.0 | DEG F |
| DESIGN HEAT PUMP OUTLET | 105.0 | 43.8 | DEG F |
|  |  |  |  |
| TOTAL - BUILDING BTU LOAD | 684.0 | 486.0 | KBTU/HR |
| GEO - BUILDING BTU LOAD | 513.0 | 486.0 | KBTU/HR |
| GEO - HEAT PUMP CAPACITY | 708.9 | 799.9 | KBTU/HR |
| GEO - PEAK DEMAND | 38.2 | 31.9 | KW |
| GEO - FLOW RATE | 171.0 | 121.5 | GPM |
| GEO - ANNUAL EER \| COP | 15.4 | 4.0 | EER \| COP |
| GEO - ELEC OPERATING COST $ | 2,574 | 973 | $ YEAR |
| USER DEVICE SCREEN 14A |  |  |  |
| HYBRID - COOLING TOWER CAP | 213.8 |  | KBTU/HR |
| HYBRID - WATER FLOW RATE | 42.6 |  | GPM |
| HYBRID - DESIGN WET BULB .4% | 78.6 |  | DEG F |
| HYBRID - OPERATING HOURS | 288 |  | HRS YEAR |
|  |  |  |  |
| UNDISTURBED EARTH TEMP |  | 68.0 | DEG F |
| GROUND CONDUCTIVITY |  | 1.30 | BTU/HR-FT-F |
| GROUND DIFFUSIVITY |  | 0.75 | FT^2/DAY |
| PIPE DIAMETER |  | 1.50 | INCH |
| BOREHOLE DIAMETER |  | 6.00 | INCH |
| GROUT CONDUCTIVITY |  | 0.80 | BTU/HR-FT-F |
|  |  |  |  |
| BOREHOLE RESISTANCE |  | 0.177 | HR-FT-F/BTU |
|  |  |  |  |
| OFFICE - HOURS OPEN |  | 3,131 | ANNUAL |
| GROUND MOISTURE |  | 20 | % |
| BETWEEN BOREHOLES |  | 20 | FEET |
| GRID ACROSS BOREFIELD |  | 8 | ROWS |
| GRID DOWN |  | 3 | COLUMNS |

FIG. 19

User Device Screen 2

Building Type Selection

Building Type Selection    Type ▼

*Table 2*

| User Selects | Building Type Selection |
|---|---|
| Parameter | Office, Retail, School/Public, Health, Residential |
| Drop-Down | Type |
| ↓ | Office |
|  | Retail |
|  | School / Public |
|  | Health |
|  | Residential |

User Device Screen 3

Office Operation Schedule

■ Check if - Open 24 hours every Day

Open Specific Hours Mon to Sun

|  | Open At | Close At |
|---|---|---|
| Mon - Fri | 8:00 AM ▼ | 5:00 PM ▼ |
| Saturday | 9:00 AM ▼ | noon ▼ |
| Sunday | closed ▼ | noon ▼ |

[ Set - Building operation ]

FIG. 22

| Table 3 | |  |
|---|---|---|
| User Selects | Office Operation Schedule | |
| Parameter | Mon-Fri, Saturday, Sunday | |
| Drop-Down | Open At | Close At |
| ↓ | open 24 | 10 am |
| | closed | 11 am |
| | 5 am | noon |
| | 6 am | 1 pm |
| | 7 am | 2 pm |
| | 8 am | 3 pm |
| | 9 am | 4 pm |
| | 10 am | 5 pm |
| | 11 am | 6 pm |
| | noon | 7 pm |
| | | 8 pm |
| | | 9 pm |
| | | 10 pm |
| | | 11 pm |
| | | midnt |

| | Table 4 | | | |
|---|---|---|---|---|
| Database | 8760 Hours of Ambient °F by City | | | |
| Code Selects | Typical Ambient °F | | | |
| Parameter | Month of Year | Day of Week | Hour of Day | Hour of Year | Typical Ambient °F |
| | 1 | Thursday | 1 | 1 | 42 |
| | 1 | Thursday | 2 | 2 | 42 |
| | 1 | Thursday | 3 | 3 | 40 |
| | 1 | Thursday | 4 | 4 | 36 |
| | 1 | Thursday | 5 | 5 | 33 |
| | 1 | Thursday | 6 | 6 | 29 |
| | 1 | Thursday | 7 | 7 | 30 |
| | 1 | Thursday | 8 | 8 | 33 |
| | 12 | Thursday | 23 | 8759 | 39 |
| | 12 | Thursday | 24 | 8760 | 39 |

FIG. 23

*User Device Screen 4*
Design Temperature & Flow

Design Entering Water Temperature
Cooling [ 95 ▼ ] °F        Heating [ 45 ▼ ] °F Thermostat Setting Inside Building
Cooling [ 75 ▼ ] °F        Heating [ 70 ▼ ] °F Flow Rate [ 3.00 ▼ ] gpm/ton
(based on heat pump capacity)

Antifreeze [ propylene glycol ▼ ]    freeze pt [ 28 ▼ ] °F

[ SET Temp & Flow ]

— User Device Screen 4

| | *Table 5* | | | | | | |
|---|---|---|---|---|---|---|---|
| User Selects | Design Temperature & Flow | | | | | | |
| Parameter | Design Entering Water Temperature | | Thermostat Setting Inside Building | | Flow Rate | Antifreeze | |
| | Cooling °F | Heating °F | Cooling °F | Heating °F | gpm/ton | name | freeze point °F |
| Drop-Down ↓ | 85 | 25 | 70 | 64 | 2.50 | propylene glycol | 32 |
| | 86 | 26 | 71 | 65 | 2.60 | methanol | 31 |
| | 87 | 27 | 72 | 66 | 2.70 | ethanol | 30 |
| | 88 | 28 | 73 | 67 | 2.80 | | 29 |
| | 89 | 29 | 74 | 68 | 2.90 | | 28 |
| | 90 | 30 | 75 | 69 | 3.00 | | 27 |
| | 91 | 31 | 76 | 70 | 3.10 | | 26 |
| | 92 | 32 | 77 | 71 | 3.20 | | 25 |
| | 93 | 33 | 78 | 72 | 3.30 | | 24 |
| | 94 | 34 | 79 | 73 | 3.40 | | 23 |
| | 95 | 35 | 80 | 74 | 3.50 | | 22 |
| | 96 | 36 | | | | | 21 |
| | 97 | 37 | | | | | 20 |
| | 98 | 38 | | | | | 19 |
| | 99 | 39 | | | | | 18 |
| | 100 | 40 | | | | | 17 |
| | 101 | 41 | | | | | 16 |
| | 102 | 42 | | | | | 15 |
| | 103 | 43 | | | | | |
| | 104 | 44 | | | | | |
| | 105 | 45 | | | | | |
| | | 46 | | | | | |
| | | 47 | | | | | |
| | | 48 | | | | | |
| | | 49 | | | | | |
| | | 50 | | | | | |

— Table 5

FIG. 24

User Device Screen 5
Borehole, Pipe, & Grout

Borehole Diameter [ 4.75 ▼ ] inches

Pipe Diameter [ 1.00 ▼ ] inch

HDPE [ 3608 ▼ ] resin | SDR- [ 11 ▼ ] ratio

Grout Conductivity [ 0.80 ▼ ] Btu/hr-ft-°F

[ Avg ( A. near center + B. near wall ) ▼ ]

— User Device Screen 5

— Table 6

| Table 6 | | | | | |
|---|---|---|---|---|---|
| User Selects | Borehole, Pipe, & Grout | | | | |
| Parameter | Borehole Dia | Pipe Diameter | HDPE resin | SDR ratio | Grout | U-Tube Pipe configuration |
| | inches | inches | name | name | Conductivity | in Borehole |
| | | | | | Btu/hr-ft-°F | configuration |
| Drop-Down ↓ | 2.75 | 0.75 | 3408 | 9.0 | 0.40 | A. Pipe near center of borehole |
| | 3.00 | 1.00 | 3608 | 11.0 | 0.43 | B. Pipe near outside walls |
| | 3.25 | 1.25 | 4710 | 13.5 | 0.45 | Avg (A. near center + B. near wall) |
| | 3.50 | 1.50 | geox | 15.5 | 0.52 | Double U-tube with spacer |
| | 3.75 | | | | 0.60 | |
| | 4.00 | | | | 0.68 | |
| | 4.25 | | | | 0.76 | |
| | 4.50 | | | | 0.80 | |
| | 4.75 | | | | 0.87 | |
| | 5.00 | | | | 0.95 | |
| | 5.25 | | | | 1.00 | |
| | 5.50 | | | | 1.10 | |
| | 5.75 | | | | 1.20 | |
| | 6.00 | | | | 1.30 | |
| | | | | | 1.40 | |
| | | | | | 1.50 | |

FIG. 25

Table 7

| In-code | Pipe Dimensions | | |
|---|---|---|---|
| Parameter | 0.75, 1.00, 1.25, 1.50 | | |
| | key | value | |
| | diameter | key name | value min wall " |
| | 0.75 | outside dia | 1.05 |
| | | sdr9 | 0.117 |
| | | sdr11 | 0.095 |
| | | sdr13 | 0.078 |
| | | sdr15 | 0.068 |
| | 1.00 | outside dia | 1.315 |
| | | sdr9 | 0.146 |
| | | sdr11 | 0.12 |
| | | sdr13 | 0.097 |
| | | sdr15 | 0.084 |
| | 1.25 | outside dia | 1.66 |
| | | sdr9 | 0.184 |
| | | sdr11 | 0.151 |
| | | sdr13 | 0.123 |
| | | sdr15 | 0.107 |
| | 1.50 | outside dia | 1.9 |
| | | sdr9 | 0.221 |
| | | sdr11 | 0.173 |
| | | sdr13 | 0.141 |
| | | sdr15 | 0.123 |

Table 8

| In-code | Pipe HDPE Resin presure Rating | | |
|---|---|---|---|
| Parameter | 3408, 3608, 4710, geox | | |
| | key | value | |
| | key name | key name | value psi |
| | 3408 | sdr9 | 200 |
| | | sdr11 | 160 |
| | | sdr13 | 128 |
| | | sdr15 | 110 |
| | 3608 | sdr9 | 200 |
| | | sdr11 | 160 |
| | | sdr13 | 128 |
| | | sdr15 | 110 |
| | 4710 | sdr9 | 250 |
| | | sdr11 | 200 |
| | | sdr13 | 160 |
| | | sdr15 | 130 |
| | geox | sdr9 | 200 |
| | | sdr11 | 160 |
| | | sdr13 | 128 |
| | | sdr15 | 110 |

Table 9

| In-code | U-Tube Pipe Borehole Configuration | | |
|---|---|---|---|
| Parameter | Center, Wall, Average, Double U-tube | | |
| | key | value | |
| | configuration | key name | value coefficient |
| | Center | geometry1 | 17.44 |
| | | geometry2 | -0.6052 |
| | Wall | geometry1 | 20.67 |
| | | geometry2 | -0.3796 |
| | Average | geometry1 | 19.68 |
| | | geometry2 | -0.445 |
| | Double | geometry1 | 34.588 |
| | | geometry2 | -0.605 |

FIG. 26

User Device Screen 6

Ground Thermal Resistance

- Ground Conductivity: 1.1 | 5 | Btu/hr-ft-°F
- Ground Diffusivity: 0.7 | 5 | ft²/day
- Earth Temp.: 63. | 5 | °F (undisturbed)
- Ground Density: 170 lb/ft³   Ground Moisture: 20 %
- Long Term Ground Effect – Forecast: 10 years
- Distance Between Boreholes: 20 ft
- Loopfield Grid Layout rows across: 4 X 1 rows down ☐ Check if - Horizontal Drilled Borehole
Horizontal Entry Angle 18.4° - 3:1 Degrees - ratio
1st Level Depth 15 ft  2nd Level Spacing 15

☐ Check if - Slinky Lay Horizontal 3 ft dia
Pitch 36 in  Pipe Dia 3/4 in
Depth 6 ft  Trench 4  c-c spacing 9

[SET Borehole & Ground]

Table 10 — Ground Thermal Resistance

| User Selects Parameter | Ground Conductivity Btu/hr-ft-°F | Ground Conductivity Btu/hr-ft-°F | Ground Diffusivity ft²/day | Ground Diffusivity ft²/day | Earth Temperature °F | Earth Temperature °F | Ground Density lb/ft³ | Ground Moisture % | Long Term Forecast years | Distance Between Boreholes ft | Loopfield Grid Layout Rows Across | Loopfield Grid Layout Rows Down |
|---|---|---|---|---|---|---|---|---|---|---|---|---|
| | 0.0 | .00 | 0.0 | .00 | 0.0 | .0 | | | | | | |
| Drop-Down ↓ | 0.3 | 0.00 | 0.3 | 0.00 | 39.0 | 0.0 | 80 | 0.0 | 5 | 15 | 1 | 1 |
| | 0.4 | 0.01 | 0.4 | 0.01 | 40.0 | 0.1 | 100 | 5.0 | 10 | 16 | 2 | 2 |
| | 0.1 | 0.02 | 0.1 | 0.02 | 41.0 | 0.2 | 120 | 10.0 | 15 | 17 | 3 | 3 |
| | 0.6 | 0.03 | 0.6 | 0.03 | 42.0 | 0.3 | 130 | 15.0 | 20 | 18 | 4 | 4 |
| | 0.7 | 0.04 | 0.7 | 0.04 | 43.0 | 0.4 | 135 | 20.0 | 25 | 19 | 5 | 5 |
| | 0.8 | 0.05 | 0.8 | 0.05 | 44.0 | 0.5 | 140 | 25.0 | | 20 | 6 | 6 |
| | 0.9 | 0.06 | 0.9 | 0.06 | 45.0 | 0.6 | 145 | 30.0 | | 21 | 7 | 7 |
| | 1.0 | 0.07 | 1.0 | 0.07 | 46.0 | 0.7 | 150 | 40.0 | | 22 | 8 | 8 |
| | 1.1 | 0.08 | 1.1 | 0.08 | 47.0 | 0.8 | 155 | 50.0 | | 23 | 9 | 9 |
| | 1.2 | 0.09 | 1.2 | 0.09 | 48.0 | 0.9 | 160 | 60.0 | | 24 | 10 | 10 |
| | 1.3 | | 1.3 | | 49.0 | | 165 | 70.0 | | 25 | 11 | |
| | 1.4 | | 1.7 | | 50.0 | | 170 | 80.0 | | | 12 | |
| | 1.5 | | 2.6 | | 51.0 | | 175 | 90.0 | | | 13 | |
| | 1.6 | | 4.2 | | 52.0 | | 180 | 95.0 | | | 14 | |
| | 1.7 | | | | 53.0 | | 185 | | | | 15 | |
| | 1.8 | | | | 54.0 | | 190 | | | | 16 | |
| | 2.4 | | | | 55.0 | | 195 | | | | 17 | |
| | 3.3 | | | | 56.0 | | 200 | | | | 18 | |
| | 3.4 | | | | 57.0 | | | | | | 19 | |
| | | | | | 58.0 | | | | | | 20 | |
| | | | | | 59.0 | | | | | | 21 | |
| | | | | | 60.0 | | | | | | 22 | |
| | | | | | 61.0 | | | | | | 23 | |
| | | | | | 62.0 | | | | | | 24 | |
| | | | | | 63.0 | | | | | | 25 | |
| | | | | | 64.0 | | | | | | 26 | |
| | | | | | 65.0 | | | | | | 27 | |
| | | | | | 66.0 | | | | | | 28 | |
| | | | | | 67.0 | | | | | | 29 | |
| | | | | | 68.0 | | | | | | 30 | |
| | | | | | 69.0 | | | | | | | |
| | | | | | 70.0 | | | | | | | |
| | | | | | 71.0 | | | | | | | |
| | | | | | 72.0 | | | | | | | |

FIG. 27

User Device Screen 7

| User Device Screen 7 |
| --- |
| Thermal Properties of Soils & Rocks |
| Typical Thermal Conductivity - Diffusivity |
| ---Type--- ▼ |
| Description ▼ |
| Content ▼ |

Table 11

| | Table 11 | | | | |
| --- | --- | --- | --- | --- | --- |
| User Selects | Thermal Properties of Soils & Rocks | | | | |
| Parameter | Soil or Rock, Type & Density, Moisture or Quartz | | | | |
| | Type | Description | Content | Conductivity Btu/hr-ft-°F | Diffusivity ft²/day |
| Drop-Down ↓ | Soil | Sand Med 100 lb/cuft | 5% moist | 1.04 | 1.04 |
| | Soil | Sand Med 100 lb/cuft | 10% moist | 1.32 | 1.08 |
| | Soil | Sand Med 100 lb/cuft | 15% moist | 1.42 | 1.00 |
| | Soil | Sand Med 100 lb/cuft | 20% moist | 1.52 | 0.92 |
| | Soil | Sand Light 80 lb/cuft | 5% moist | 0.74 | 0.95 |
| | Soil | Sand Light 80 lb/cuft | 10% moist | 0.80 | 0.85 |
| | Soil | Sand Light 80 lb/cuft | 15% moist | 0.84 | 0.76 |
| | Soil | Sand Light 80 lb/cuft | 20% moist | 0.90 | 0.71 |
| | Rock | Amphibolite | Typical value | 1.78 | 1.00 |
| | Rock | Andesite | Typical value | 1.45 | 1.20 |

FIG. 28

User Device Screen 8

| User Device Screen 8 |
| --- |
| Building Zone Module |

Hybrid cooling is 15% in Zone 1

Go to ... Zones 1 - 20 ▼

*(Heating loads with internal heat gain subtracted)

| Zone #1 | Cooling | *Heating | H-Pump # | Cool Cap | Heat Cap | $ Elec |
| --- | --- | --- | --- | --- | --- | --- |
| #20 | | | | | | |

User Device Screen 9

| User Device Screen 9 |
| --- |
| Building Peak Cooling & Heating Loads - Zone 1-20 |
| Building Zone Module |

Heat Pump Zone 1-20 ◀

Heat Pump - required

Hybrid %        Hybrid %
  15  ▼           ▼

Peak Btu Loads at ASHRAE DESIGN outside Air Temp
*(Heating loads with internal heat gain subtracted)

| Design °F COOLING (1000 Btu/hr) | Design °F *HEATING (1000 Btu/hr) | Internal average Heat Gain (1000 Btu/hr) |
| --- | --- | --- |
| Geo Load Capacity | Geo Load Capacity | Internal Estimator |
| Power   kW | Power   kW | |
| Flow    gpm | Flow    gpm | SET Zone # |

FIG. 29

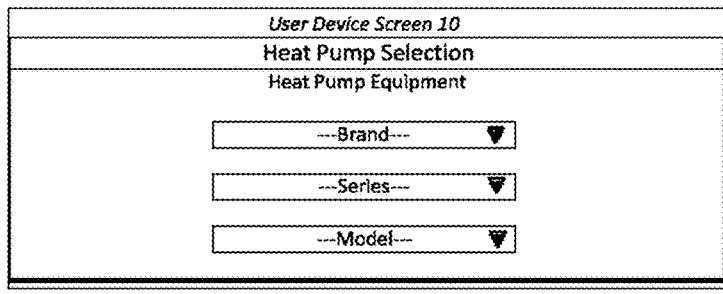

| Table 12 | | | |
|---|---|---|---|
| User Selects | Heat Pump Equipment - Name | | |
| Parameter | Brand, Series, Model | | |
| | Brand | Series | Model |
| Drop-Down ↓ | Bosch | SM | 060 |
| | Bosch | SM | 070 |
| | Bosch | TA | 025 |
| | Bosch | TA | 035 |
| | Bosch | TA | 049 |
| | Bosch | TA | 061 |
| | Carrier | YD | 026 |
| | WaterFurnace | NS | 060 |
| | WaterFurnace | NS | 070 |

| Table 13 | | | | | | | | |
|---|---|---|---|---|---|---|---|---|
| Database | Heat Pump Equipment - Raw Performance Data | | | | | | | |
| Code Selects | Brand, Series, Model, Stage or Variable Speed | | | | | | | |
| Parameter | Heating - model048 | | | | Cooling - model048 | | | |
| | EWT °F | Flow Rate GPM | Capacity Mbtu/h | Power kW | EWT °F | Flow Rate GPM | Capacity Mbtu/h | Power kW |
| | 30 | 9 | 36.7 | 2.90 | 60 | 9 | 52.6 | 2.24 |
| | | 12 | 37.2 | 2.90 | | 12 | 53.1 | 2.17 |
| | 40 | 9 | 42.2 | 3.00 | 80 | 9 | 50.2 | 2.78 |
| | | 12 | 43.0 | 3.01 | | 12 | 50.7 | 2.70 |
| | 50 | 9 | 47.3 | 3.08 | 90 | 9 | 46.8 | 3.09 |
| | | 12 | 48.2 | 3.10 | | 12 | 47.3 | 3.00 |
| | 60 | 9 | 52.3 | 3.18 | 100 | 9 | 45.1 | 3.46 |
| | | 12 | 53.6 | 3.20 | | 12 | 45.6 | 3.36 |

FIG. 30

Table 14

| Database | Heat Pump Equipment - Air Flow - Correction Factor | | | | | |
|---|---|---|---|---|---|---|
| Code Selects | Brand, Series | | | | | |
| Parameter | Heating - Series NS | | | Cooling - Series NS | | |
| | cfm per Ton | Capacity Factor | Power Factor | cfm per Ton | Capacity Factor | Power Factor |
| | 325 | 0.977 | 1.075 | 325 | 0.970 | 0.974 |
| | 375 | 0.993 | 1.018 | 375 | 0.991 | 0.991 |
| | 400 | 1.000 | 1.000 | 400 | 1.000 | 1.000 |
| | 450 | 1.012 | 0.987 | 450 | 1.013 | 1.023 |

Table 15

| Database | Heat Pump Equipment - Entering Air °F - Correction Factor | | | | | |
|---|---|---|---|---|---|---|
| Code Selects | Brand, Series | | | | | |
| Parameter | Heating - Series NS | | | Cooling - Series NS | | |
| | Entering Air °F | Capacity Factor | Power Factor | Entering Air °F | Capacity Factor | Power Factor |
| | 60 | 1.025 | 0.893 | 70 | 0.907 | 0.991 |
| | 65 | 1.012 | 0.945 | 75 | 0.939 | 0.996 |
| | 70 | 1.000 | 1.000 | 80 | 1.000 | 1.000 |
| | 75 | 0.987 | 1.048 | 85 | 1.064 | 1.004 |

FIG. 31

| Table 16 | |
|---|---|
| Database | Water Freeze Protection |
| User Selects | Antifreeze Type, Freeze Pt. |
| Parameter | Propylene Glycol |

| | Freeze Point °F | % vol |
|---|---|---|
| | 15 | 23.7 |
| | 20 | 18.1 |
| | 25 | 11.6 |
| | 30 | 3.9 |

| Table 17 | | | | | | |
|---|---|---|---|---|---|---|
| Database | Heat Pump Equipment - Antifreeze - Correction Factor | | | | | |
| Code Selects | Antifreeze Type | | | | | |
| Parameter | Heating - Propylene Glycol | | | Cooling - Propylene Glycol | | |
| | Antifreeze % | Capacity Factor | Power Factor | Antifreeze % | Capacity Factor | Power Factor |
| | 5 | 0.989 | 0.997 | 5 | 0.995 | 1.003 |
| | 10 | 0.979 | 0.994 | 10 | 0.991 | 1.006 |
| | 15 | 0.968 | 0.990 | 15 | 0.986 | 1.009 |
| | 20 | 0.958 | 0.987 | 20 | 0.982 | 1.011 |

FIG. 32

User Device Screen 11

Heat Gain Estimator for Lights, People, & Equipment

Zone 1 use [Select building use... ▼] Btu/hr-ft-° F

Size of Zone 1 floor area [ ] sf

Glass area is [ ▼] % of south wall

Average number of appliances in use:

Coffee brewer, Ceiling Fan, Toster, Waffle iron, Crock pot, Roaster, Washing machine, Sterilizer [ ▼]

Personal Computer, Printer-copier, Microwave, Hair dryer, Coffee urn, Dishwasher, Clothes dryer [ ▼]

Refrigerator or Freezer, Vending machine, Deep fryer, Griddle, Color Television, Hot Plate 2-units [ ▼]

Cooking range, Large copier [ ▼]

[SET Internal heat gain]

Table 18 — Heat Gain Estimator for Lights, People, & Equipment Zone 1-20

| User Selects | Parameter | Zone 1-20 | | | Average number of appliances in use | | | |
|---|---|---|---|---|---|---|---|---|
| | | Building | | Glass area | Coffee brewer | P C computer | Refrigerator | Large copier |
| | | Type | Use | % South wall | each | each | each | each |
| Drop-Down ↓ | | Office | Conference Room | 0 | 1 | 1 | 1 | 1 |
| | | Office | General Office | 5 | 2 | 2 | 2 | 2 |
| | | Office | Private - Executive | 10 | 3 | 3 | 3 | 3 |
| | | Office | Reception - Lobby | 15 | 4 | 4 | 4 | 4 |
| | | Retail | Auto Repair | 20 | 5 | 5 | 5 | 5 |
| | | Retail | Bank | 25 | 6 | 6 | 6 | 6 |
| | | Retail | Barber / Beauty Shop | 30 | 7 | 7 | 7 | 7 |
| | | Retail | Coctail Lounge - Bar | 35 | 8 | 8 | 8 | 8 |
| | | Retail | Department Store | 40 | 9 | 9 | 9 | 9 |
| | | Retail | Drug Store | 45 | 10 | 10 | 10 | 10 |
| | | Retail | Hotel - Bedroom | 50 | | 11 | | |
| | | Retail | Hotel - Conference Room | | | 12 | | |
| | | Retail | Hotel Lobby | | | 13 | | |
| | | Retail | Restaurant - Dining | | | 14 | | |
| | | Retail | Restaurant - Kitchen | | | 15 | | |
| | | Retail | Retail Store | | | 16 | | |
| | | Retail | Retail Storage | | | 17 | | |
| | | School/Public | Auditorium | | | 18 | | |
| | | School/Public | Classrooms | | | 19 | | |
| | | School/Public | Corridor | | | 20 | | |
| | | School/Public | Dining Area | | | | | |
| | | School/Public | Gymnasium | | | | | |
| | | School/Public | Laboratory | | | | | |
| | | School/Public | Library | | | | | |
| | | School/Public | Locker - Dressing Room | | | | | |
| | | School/Public | Theater | | | | | |
| | | School/Public | Vocational - Shop | | | | | |
| | | Health | Doctor Office | | | | | |
| | | Health | Fitness Center | | | | | |
| | | Health | Hospital Rooms | | | | | |
| | | Health | Laboratory - Medical | | | | | |
| | | Health | Nursing Home Rooms | | | | | |
| | | Health | Medical Clinic | | | | | |
| | | Health | Wards | | | | | |
| | | Residential | Dormitory | | | | | |
| | | Residential | Single Family | | | | | |
| | | Residential | Multi Family | | | | | |

FIG. 33

Table 19

| Table 19 | | | | | |
|---|---|---|---|---|---|
| Database | Internal Heat Gain | | | | |
| Code Selects | Building Type, Building use | | | | |
| Parameter | Type | Use | Lighting watts per sf | sf per person | Btu's per person |
| Drop-Down | Office | Conference Room | 1.6 | 22.5 | 210.0 |
| ↓ | Office | General Office | 1.3 | 150.0 | 255.0 |
| | Office | Private - Executive | 1.3 | 225.0 | 230.0 |
| | Office | Reception - Lobby | 1.0 | 150.0 | 315.0 |
| | Retail | Auto Repair | 1.2 | 150.0 | 565.0 |
| | Retail | Bank | 1.4 | 150.0 | 315.0 |
| | Retail | Barber / Beauty Shop | 1.0 | 150.0 | 230.0 |
| | Retail | Coctail Lounge - Bar | 1.1 | 22.5 | 315.0 |
| | Retail | Department Store | 2.0 | 90.0 | 315.0 |
| | Retail | Drug Store | 2.0 | 45.0 | 315.0 |
| | Retail | Hotel - Bedroom | 0.5 | 300.0 | 230.0 |
| | Retail | Hotel - Conference Room | 1.6 | 22.5 | 255.0 |
| | Retail | Hotel Lobby | 2.2 | 75.0 | 315.0 |
| | Retail | Restaurant - Dining | 1.1 | 22.5 | 255.0 |
| | Retail | Restaurant - Kitchen | 1.7 | 300.0 | 345.0 |
| | Retail | Retail Store | 2.0 | 45.0 | 315.0 |
| | Retail | Retail Storage | 0.6 | 450.0 | 565.0 |
| | School/Public | Auditorium | 2.1 | 10.5 | 210.0 |
| | School/Public | Classrooms | 1.6 | 30.0 | 230.0 |
| | School/Public | Corridor | 1.6 | 150.0 | 315.0 |
| | School/Public | Dining Area | 1.1 | 22.5 | 230.0 |
| | School/Public | Gymnasium | 1.0 | 75.0 | 230.0 |
| | School/Public | Laboratory | 1.5 | 150.0 | 345.0 |
| | School/Public | Library | 1.2 | 75.0 | 255.0 |
| | School/Public | Locker - Dressing Room | 0.9 | 52.5 | 315.0 |
| | School/Public | Theater | 2.1 | 10.5 | 210.0 |
| | School/Public | Vocational - Shop | 1.6 | 75.0 | 345.0 |
| | Health | Fitness Center | 1.0 | 75.0 | 635.0 |
| | Health | Hospital Rooms | 0.5 | 300.0 | 230.0 |
| | Health | Nursing Home Rooms | 0.5 | 300.0 | 230.0 |
| | Health | Doctor Office | 1.4 | 150.0 | 255.0 |
| | Health | Medical Clinic | 1.4 | 150.0 | 255.0 |
| | Health | Laboratory - Medical | 1.5 | 150.0 | 345.0 |
| | Health | Wards | 0.5 | 300.0 | 230.0 |
| | Residential | Dormitory | 0.5 | 150.0 | 230.0 |
| | Residential | Single Family | 0.5 | 620.0 | 230.0 |
| | Residential | Multi Family | 0.5 | 500.0 | 230.0 |

FIG. 34

User Device Screen 12 (without data)

| User Device Screen 12 ||||
|---|---|---|---|---|
| Simulation - Borehole Heat Exchanger Length & Electric Operating Cost |||||
| Climate Site<br>Building Type | Design Temp.<br>Air & Water | Building Btu<br>Loads - $Elec | Borehole -<br>Pipe - Grout | Ground<br>Resistance |

| SIMULATION | COOLING | HEATING | UNITS |
|---|---|---|---|
| BOREHOLE LENGTH - YR 10 | | | FEET |
| BOREHOLES | | | EACH |
| LENGTH PER BOREHOLE | | | FEET |
| LONG TERM GROUND EFFECT | | | °F |
| | | | |
| BOREHOLE LENGTH - YR 1 | | | FEET |
| | | | |
| DESIGN HEAT PUMP INLET | | | °F |
| DESIGN HEAT PUMP OUTLET | | | °F |
| | | | |
| TOTAL - BUILDING BTU LOAD | | | KBTU/HR |
| GEO - BUILDING BTU LOAD | | | KBTU/HR |
| GEO - HEAT PUMP CAPACITY | | | KBTU/HR |
| GEO - PEAK DEMAND | | | KW |
| GEO - FLOW RATE | | | GPM |
| GEO - ANNUAL EER \| COP | | | EER \| COP |
| GEO - ELEC OPERATING COST $ | | | $ YEAR |
| | | | |
| BENCHMARK HEAT PUMP INLET | | | °F |
| BENCHMARK EXCEEDS DESIGN | | | FEET |
| EXCESS LENGTH PAYOUT | | | YEARS |
| | | | |
| UNDISTURBED EARTH TEMP | | | °F |
| GROUND CONDUCTIVITY | | | BTU/HR-FT-F |
| GROUND DIFFUSIVITY | | | FT²/DAY |
| PIPE DIAMETER | | | INCH |
| BOREHOLE DIAMETER | | | INCH |
| GROUT CONDUCTIVITY | | | BTU/HR-FT-F |
| | | | |
| BOREHOLE RESISTANCE | | | HR-FT-F/BTU |
| | | | |
| OFFICE - HOURS OPEN | | | ANNUAL |
| BETWEEN BOREHOLES | | | FEET |
| GRID ACROSS LOOPFIELD | | | ROWS |
| GRID DOWN | | | COLUMNS |
| GROUND MOISTURE | | | % |

FIG. 35

User Device Screen 12a (without data)

| User Device Screen 12a ||||| 
| Simulation - Borehole Heat Exchanger Length & Electric Operating Cost |||||
| Climate Site Building Type | Design Temp. Air & Water | Building Btu Loads - $Elec | Borehole - Pipe - Grout | Ground Resistance |
| SIMULATION | COOLING | HEATING | | UNITS |
| BOREHOLE LENGTH - YR 10 | | | | FEET |
| BOREHOLES | | | | EACH |
| LENGTH PER BOREHOLE | | | | FEET |
| LONG TERM GROUND EFFECT | | | | °F |
| BOREHOLE LENGTH - YR 1 | | | | FEET |
| DESIGN HEAT PUMP INLET | | | | °F |
| DESIGN HEAT PUMP OUTLET | | | | °F |
| TOTAL - BUILDING BTU LOAD | | | | KBTU/HR |
| GEO - BUILDING BTU LOAD | | | | KBTU/HR |
| GEO - HEAT PUMP CAPACITY | | | | KBTU/HR |
| GEO - PEAK DEMAND | | | | KW |
| GEO - FLOW RATE | | | | GPM |
| GEO - ANNUAL EER \| COP | | | | EER \| COP |
| GEO - ELEC OPERATING COST $ | | | | $ YEAR |
| HYBRID - COOLING TOWER CAP. | | | | TONS |
| HYBRID - WATER FLOW RATE | | | | GPM |
| HYBRID - AMBIENT WET BULB | | | | °F |
| HYBRID - OPERATING HOURS | | | | YEAR |
| UNDISTURBED EARTH TEMP | | | | °F |
| GROUND CONDUCTIVITY | | | | BTU/HR-FT-F |
| GROUND DIFFUSIVITY | | | | FT²/DAY |
| PIPE DIAMETER | | | | INCH |
| BOREHOLE DIAMETER | | | | INCH |
| GROUT CONDUCTIVITY | | | | BTU/HR-FT-F |
| BOREHOLE RESISTANCE | | | | HR-FT-F/BTU |
| OFFICE - HOURS OPEN | | | | ANNUAL |
| BETWEEN BOREHOLES | | | | FEET |
| GRID ACROSS LOOPFIELD | | | | ROWS |
| GRID DOWN | | | | COLUMNS |
| GROUND MOISTURE | | | | % |

FIG. 36

User Device Screen 13
Benchmark Parameters

Benchmark Entering Water Temperature
Cooling [ 85 ▼ ] °F        Heating [ 45 ▼ ] °F Ground Loop Installed Cost [ 10.00 ▼ ] $ per ft Electric utility rate [ 0.10 ▼ ] $ per kW

Table 20
Benchmark Design Parameters

| User Selects Parameter | Benchmark Entering Water Temperature | | Ground Loop Installed Cost | Electric Utility rate |
|---|---|---|---|---|
| | Cooling °F | Heating °F | $/ft | kW |
| Drop-Down ↓ | 85 | 30 | 8.50 | 0.065 |
| | 86 | 31 | 9.00 | 0.070 |
| | 87 | 32 | 9.50 | 0.075 |
| | 88 | 33 | 10.00 | 0.080 |
| | 89 | 34 | 10.50 | 0.085 |
| | 90 | 35 | 11.00 | 0.090 |
| | 91 | 36 | 11.50 | 0.095 |
| | 92 | 37 | 12.00 | 0.100 |
| | 93 | 38 | 12.50 | 0.105 |
| | 94 | 39 | 13.00 | 0.110 |
| | 95 | 40 | 13.50 | 0.115 |
| | 96 | 41 | 14.00 | 0.120 |
| | 97 | 42 | 14.50 | 0.125 |
| | 98 | 43 | 15.00 | 0.130 |
| | 99 | 44 | 15.50 | 0.135 |
| | 100 | 45 | 16.00 | 0.140 |
| | | 46 | 16.50 | 0.145 |
| | | 47 | 17.00 | 0.150 |
| | | 48 | 17.50 | |
| | | 49 | 18.00 | |
| | | 50 | 18.50 | |
| | | | 19.00 | |
| | | | 19.50 | |
| | | | 20.00 | |
| | | | 20.50 | |
| | | | 21.00 | |

FIG. 37

User Device Screen 14

Hybrid Design Parameters

Hybrid Entering Water Temperature
Cooling: 105 °F

Condenser type: Forced Draft

Fan Size: 2.75 Hp

Fan Efficiency: 85.00 %

Pump Size: 0.50 Hp

Fan Efficiency: 85.00 %

— User Device Screen 14

Table 21 — Hybrid Design Parameters

| User Selects Parameter | Entering Water Cooling °F | Cooling Tower / Condenser Type name | Cooling Tower / Condenser Efficiency % | Cooling Tower / Condenser Fan Size hp | Pump Size hp |
|---|---|---|---|---|---|
| Drop-Down ↓ | 95 | Induced Draft | 70 | 0.50 | 0.25 |
| | 96 | Forced Draft | 75 | 0.75 | 0.50 |
| | 97 | Fluid | 80 | 1.00 | 0.75 |
| | 98 | | 85 | 1.25 | 1.00 |
| | 99 | | 90 | 1.50 | 1.25 |
| | 100 | | 95 | 1.75 | 1.50 |
| | 101 | | | 2.00 | 1.75 |
| | 102 | | | 2.25 | 2.00 |
| | 103 | | | 2.50 | 2.25 |
| | 104 | | | 2.75 | 2.50 |
| | 105 | | | 3.00 | 2.75 |
| | 106 | | | 3.25 | 3.00 |
| | 107 | | | 3.50 | |
| | 108 | | | 3.75 | |
| | 109 | | | 4.00 | |
| | 110 | | | 4.25 | |
| | | | | 4.50 | |
| | | | | 4.75 | |
| | | | | 5.00 | |

FIG. 38

HYBRID GEOTHERMAL HEAT PUMP DESIGN SIMULATION AND ANALYSIS

CROSS-REFERENCE TO RELATED APPLICATION

This application is a continuation-in-part (CIP) of U.S. Non-Provisional application Ser. No. 15/231,520 filed on Aug. 8, 2016, incorporated herein by reference in its entity, which is a CIP of U.S. Non-Provisional application Ser. No. 14/673,805 filed on Mar. 30, 2015, incorporated herein by reference in its entirety, which is a non-provisional of U.S. Provisional Application No. 61/971,716 filed on Mar. 28, 2014, incorporated herein by reference.

BACKGROUND

This section is intended to introduce the reader to aspects of art that may be related to various aspects of the present disclosure described herein, which are described and/or claimed below. This discussion is believed to be helpful in providing the reader with background information to facilitate a better understanding of the various aspects of the present disclosure described herein. Accordingly, it should be understood that these statements are to be read in this light, and not as admissions of prior art.

A geothermal heat pump or ground source heat pump (GHP) is a central heating and/or cooling system that transfers heat to or from the ground. The traditional heat and cooling equipment delivered from the manufacture uses air for cooling and heating operations. GHP systems can use the earth as a heat source in cold winter climates or as a heat sink in warm summer climates. This design takes advantage of the moderate temperatures in the ground to boost efficiency and reduce the operational costs of heating and cooling systems, and may be combined with HVAC systems and energy conservation systems. GHPs employ a heat exchanger in contact with the ground or groundwater to extract or dissipate heat. This component accounts for anywhere from a fifth to half of the total system cost, and would be the most cumbersome part to repair or replace. In conventional GHP systems, the heat exchanger unit is in fluid communication with a loop of tubing buried in the ground, commonly referred to as a ground loop. A variety of ground loop configurations can be used with geothermal heat pump systems. For "closed-loop" configurations, in which the ground loop provides a closed circuit for the circulating heat exchange fluid, two known configurations are commonly employed, namely horizontal closed-loop and vertical closed-loop configurations. In the horizontal closed-loop configuration, the ground loop is typically laid horizontally, or in a directionally drilled borehole, in a shallow trench dug into the ground adjacent to a building structure that is to be serviced by the geothermal heat pump system. In the vertical closed-loop configuration, the ground loop is typically placed in a 100 foot to 400 foot deep borehole formed in the ground adjacent to the building structure to be serviced by the GHP system. The heat exchanger unit must specifically be designed for the specific location and application. Correctly sizing the heat exchanger and loop configuration and design is necessary to assure long-term performance and energy efficiency of the whole system.

Even though geothermal heat pump equipment is know to be very energy efficient, sales in the United State have been limited to generally about 1.5% of the heating and cooling industry. One of the main causes for limited sales is the lack of knowledgeable people in the industry that know how to accurately design the in-ground heat exchanger required. Designing geothermal heat pump equipment for residential, commercial, and institutional buildings can be very complex especially for models that have a very high level of detail. GHP designers can easily be overwhelmed with the amount of information and variables for designing such GHP systems without the help of computer based design analysis and simulations.

Currently, there are many types of software programs that exist for in-ground vertical or horizontal loop geothermal heat pump design and simulation. However, these programs are largely ineffective, typically designed for residential applications (not commercial), provide a complex user interface, have limited or no internet/web based accessibility or connectivity, have slow computational speeds, require other third party front-end software for various calculations, and do not have up to date or real time data of geographical, weather, climate, soil, rock data, do not allow detailed parameters and multiple zones of a building design to be set (i.e. schedule/time for multiple building zones), do not allow for hybrid designs and comparisons (i.e. adding/removing cooling towers), do not provide accurate results that allow a designer to be confident in implementing the data in a real-world application, and the programs themselves are costly to develop, operate, distribute, and be adopted by commercial designers.

Hence, what is needed is a simple to use web-based geothermal heat pump design, simulation, and analysis program that can be accessed by users using any type of mobile or computing device, provides a simple to use interface, allows the user to run multiple design and analysis simulations, select from multiple heat pump manufacturers, automatically populate and gather geographical, building, and hourly weather data in real-time, allow the user to set exact and specific building parameters (such as a buildings schedule/operational hours for each zone within a building), automatically correct raw heat pump data into actual heat pump performance, and further provide actual cost basis, hybrid designs, operating costs, benchmark, and efficiency comparisons.

BRIEF SUMMARY

In one aspect of the disclosure described herein, an in-ground GHP design program (referred to hereinafter as "GHP application" or "GHP program") is provided for designing, analyzing, and simulating a model of a detailed building energy analysis, using an in-ground geothermal heat pump system. In one aspect of the disclosure described herein, the GHP design program can reliably and efficiently predict the fluctuations of the GHP equipment performance in small increments. This enables the determination of energy consumption and demand information on a specific and unique hourly schedule basis. More specifically, the small increment method here can be used to eliminate overly broad approximations by evaluating GHP performance that is specific to building dynamics, constants, and variables for all of the building individual zones and the building's hourly operating schedule.

In addition to building energy analysis and geothermal design applications, the small increment method of the disclosure described herein can be used for hybrid GHP systems, such as in combination with cooling towers. More specifically, in scenarios where cooling loads are very dominant, supplemental heat rejecters such as cooling towers can be used. Further, various operating strategies and conditions can be utilized in hybrid systems with the GHP design program of the disclosure described herein. For example, in order to reduce heat build-up in the ground, the GHP system can be simulated, modeled, and programmed to run during the winter, or consider running at night during the summer. In order to quantify the impact of various operating strategies on the in-ground heat exchanger size and operating costs, it is advantageous to utilize the GHP program of disclosure described herein for a GHP design model is advantageous since it can account for the hourly operating schedule and interaction between the in-ground heat exchanger and heat rejecter. For example, by modeling and simulating the use of supplemental heat rejecters (i.e. cooling towers) for cooling in building systems allows for a GHP design having smaller borehole fields, and thus reducing overall installation and operating costs, both in the near term and long term. Here, earth thermal degradation can be avoided by offsetting the annual load imbalance in the borehole field and the resulting long-term temperature rise.

In another aspect of the disclosure described herein, a method of simulating a ground geothermal heat pump design is provided. The method can include receiving location data, wherein the location data further includes climate data, receiving an operating schedule data for a building, receiving heating or cooling load condition data for the building, and calculating and determining the building's ground geothermal heat pump design borehole requirement, heat pump requirement, and a loop field configuration based on the location data, heating or cooling load condition data, and operating schedule data. The method can further include calculating and determining the building's electric operating cost based on the location data, heating or cooling load conditions data, and operating schedule data. Here, the building operating schedule data is comprised of operating hours for the building in a given year. In addition, the climate condition data can include temperature data for each hour of the year based on the location data or for a specified location. The method can further include receiving borehole data, wherein the borehole data can include one or more of: undisturbed earth temperature data, ground conductivity, ground diffusivity, grout conductivity, borehole diameter, pipe material, pipe diameter, and pipe configuration in the borehole.

The method can further include receiving zone data for one or more zones within the building. Here, the zone data can include one or more of: heat pump data, internal heat gain data, and maximum heating or cooling thermal loads. Here, the heat pump data can include one or more of: heat pump type, heat pump model, heat pump series, heat pump power, and heat pump capacity. The method can further include receiving an inlet water temperature data for the heat pump. In addition, the method can also include determining a hybrid design, wherein the hybrid design integrates with the ground geothermal heat pump design one or more of: a cooling tower, fluid cooler, chiller, boiler, furnace, hot water heater, and a secondary ground loop. The method can further include receiving heat pump model data and retrieving manufacturer performance data based on the heat pump model data, and standardizing performance data based on one or more of: the operating schedule data, an entering water temperature data, flow rate data, capacity data, power data, air temperature data, and air flow data. Here, the standardizing can be based on one or more iterations of the performance data. The method can also include determining the capacity of the heat pump based on the standardized heat pump performance data, and also simulating or modeling a benchmark comparison of another geothermal heat pump system having different heat pump data. The method can also include receiving internal heat gain data for the building, wherein the heat gain data can include heat generated from one or more of: lighting, persons, occupancy, appliances, electronics, heat dissipating devices, windows, and building type.

In another aspect of the disclosure described herein, a method of simulating a ground geothermal design is provided. Here, the method can include receiving location data, wherein the location data further comprises temperature data, receiving an operating schedule data for a building, associating or mapping the operating schedule data with the temperature data, receiving earth condition data, receiving maximum heating or cooling load condition data for the building, receiving internal heat gain data for the building, receiving a first heat pump data, wherein the first heat pump data includes inlet water temperature, receiving a second heat pump data, wherein the second heat pump data includes manufacturer heat pump performance technical data having heat pump flow rate, capacity, and power. The method further includes determining a third heat pump data, wherein the third heat pump data is at least partially based on iterating the first heat pump data with respect to the second heat pump data, wherein the third heat pump data includes calculated heat pump capacity and power. The method further includes calculating and modeling borehole length, total building load, and ground loop configuration for the ground geothermal design based on the location data, temperature data, operating schedule data, earth condition data, heating or cooling load condition data, heat gain data, and heat pump data.

In another aspect of the disclosure described herein, a computer program product embodied on a non-transitory computer readable medium for simulating an in-ground geothermal heat pump design is provided, wherein the computer program is implemented by one or more processors executing processor instructions, the computer program product including a first computer code for receiving location data, wherein the location data further comprises climate data, a second computer code for receiving an operating schedule data for a building, a third computer code for receiving heating or cooling load condition data for the building, and a fourth computer code for calculating and determining the building's ground geothermal heat pump design borehole requirement, heat pump requirement, and a loop field configuration based on the location data, heating or cooling load condition data, and operating schedule data.

In another aspect of the disclosure described herein, a method of simulating a ground geothermal heat pump system is disclosed. The method can include receiving a geographical location, receiving temperature data based on the geographical location, wherein the temperature data comprises a plurality of ambient temperature values for each of the 8760 hours in a year, receiving a building type; receiving an operating schedule for the building type, wherein the operating schedule is comprised of operating hours for the building type for one or more days in a week. The method can also include receiving one or more zones for the building type, receiving a geothermal heat pump system type for the one or more zones, receiving an amount to be directed to a supplemental cooling or heating component, receiving one or more internal heat conditions for each of the one or more zones, and receiving a block heating or cooling load condition for each of the one or more zones. In addition, the method can include determining a plurality of zone load conditions for each of the one or more zones from the block heating or cooling load condition, wherein the plurality of zone load conditions are determined for each of the ambient temperature values based on the operating hours in the operating schedule, and applying the internal heat conditions to the plurality of zone load conditions. Further, the method can include determining an event wherein the plurality of zone load conditions for each of the ambient temperature values based on the operating hours in the operating schedule are at least partially split between the geothermal heat pump system and the supplemental cooling or heating component, wherein the event is further based on the received amount to be directed to the supplemental cooling or heating component, and determining a first operation capacity for the geothermal heat pump system and a second operation capacity for the supplemental heating or cooling component.

The method can further include wherein the event is comprised of a calculated or pre-defined entering water temperature to the geothermal heat pump system. In addition, the event can be comprised of a calculated or pre-defined amount of heat transfer to the geothermal heat pump system. Further, the first operation capacity for the geothermal heat pump system comprises at least one of: a borehole length, number of boreholes, pipe length, or heat pump power capacity. The second operation capacity for the supplemental heating or cooling equipment can comprise at least one of: one or more of hours of operation for the cooling or heating units, or power capacity for the cooling or heating units. The method can also include determining a borehole requirement, wherein the borehole requirement is comprised of the number of boreholes and length per borehole. In addition, the method can include automatically adjusting the borehole requirement based on the amount to be directed to a supplemental cooling or heating component. Here, the supplemental heating or cooling component is comprised of one or more of: a cooling tower, fluid cooler, chiller, boiler, furnace, hot water heater, and secondary ground loop.

In another aspect of the disclosure described herein, a method of simulating a hybrid ground geothermal heat pump system is disclosed. Here, the method can include receiving a geographical location, receiving temperature data based on the geographical location, wherein the temperature data comprises a plurality of ambient temperature values for each of the 8760 hours in a year, receiving a building type, receiving an operating schedule for the building type, wherein the operating schedule is comprised of operating hours for the building type for one or more days in a week, and receiving one or more zones for the building type. The method can further include receiving a geothermal heat pump system type for the one or more zones, receiving an amount to be directed to a cooling or heating component comprised of at least of one of: a cooling tower, fluid cooler, chiller, boiler, furnace, hot water heater, or secondary ground loop. In addition, the method can also include receiving one or more internal heat conditions for each of the one or more zones, receiving a block heating or cooling load condition for each of the one or more zones, determining a plurality of zone load conditions for each of the one or more zones from the block heating or cooling load condition, wherein the plurality of zone load conditions are determined for each of the ambient temperature values based on the operating hours in the operating schedule. Further, the method can include applying the internal heat conditions to the plurality of zone load conditions, and determining a condition wherein the plurality of zone load conditions for each of the ambient temperature values based on the operating hours in the operating schedule are at least partially split between the geothermal heat pump system and the cooling or heating component, wherein the condition is further based on the received amount to be directed to the supplemental cooling or heating component. Also, the method can include determining a first operation capacity for the geothermal heat pump system and a second operation capacity for the heating or cooling component.

The method can further include wherein the condition can be comprised of a calculated or pre-defined entering water temperature to the geothermal heat pump system. In addition, the condition can be comprised of a calculated or pre-defined amount of heat transfer to the geothermal heat pump system. Here, the first operation capacity for the geothermal heat pump system comprises at least one of: a borehole length, number of boreholes, pipe length, or heat pump power capacity. Further, the second operation capacity for the supplemental heating or cooling equipment comprises at least one of: one or more of hours of operation for the cooling or heating units, or power capacity for the cooling or heating units. The method can further include determining a borehole requirement, wherein the borehole requirement is comprised of the number of boreholes and length per borehole. In addition, the method can include automatically adjusting the borehole requirement based on the amount to be directed to a supplemental cooling or heating component.

In another aspect of the disclosure described herein, a method of simulating a ground geothermal heat pump design is disclosed. Here, the method can include receiving a first array having a plurality of temperature data values each assigned to plurality of keys, receiving a second array having a plurality of heat pump data values each assigned to a plurality of keys, determining the last key in the first array having the highest temperature data value; receiving a first temperature input variable, defining a first variable to be the first temperature input variable, and determining if the first variable or the first temperature input variable is greater than or equal to the last key from the first array. The method can further include re-defining the first variable, wherein the re-defined first variable is the number one subtracted from the last key from the first array, subtracting the re-defined first variable from the last key in the first array and determining if the result is greater than or equal to zero, assigning a second variable with a key to a value from the second array having the same key, assigning a third variable with a key to a value from first array having the same key, assigning a fourth variable to a last value from the second array, and assigning a fifth variable to the last key from the first array. The method can further include interpolating or extrapolating the received first temperature input variable, the assigned second variable, the assigned third variable, the assigned fourth variable, and the assigned fifth variable to calculate a sixth variable.

The method can also include executing a loop operation, wherein the loop operation is comprised of re-assigning the last key from the first array with the highest temperature value that resulted in subtracting the re-defined first variable from the re-assigned last key not being greater than or equal to zero. In addition, the loop operation can further comprise assigning a last value from the second array with the highest heat pump value that resulted in subtracting the re-defined first variable from the re-assigned last key not being greater than or equal to zero. Here, the plurality of temperature data values in the first array are comprised of entering water temperatures. Further, the plurality of heat pump data values in the second array are comprised of heat pump capacity. In addition, the plurality of heat pump data values in the second array are comprised of heat pump power.

In another aspect of the disclosure described herein, a method of simulating a ground geothermal heat pump design is disclosed. Here, the method can include receiving a first array having a plurality of temperature data values each assigned to plurality of keys, receiving a second array having a plurality of heat pump data values each assigned to a plurality of keys, determining the last key in the first array having the highest temperature data value, and receiving a first temperature input variable. The method can further include defining a first variable to be the first temperature input variable, determining if the first variable or the first temperature input variable is greater than or equal to the last key from the first array, determining if the first temperature input variable is less than or equal to the value assigned to the starting key in the first array, and subtracting the first variable from the last key in the first array and determining if the result is greater than or equal to zero. The method can further include assigning a second variable with a key to a value from the second array having the same key, assigning a third variable with a key to a value from first array having the same key, assigning a fourth variable to a value from the second array, assigning a fifth variable to a value from the first array, and interpolating or extrapolating the received first temperature input variable, the assigned second variable, the assigned third variable, the assigned fourth variable, and the assigned fifth variable to calculate a sixth variable.

The method can further include executing a loop operation, wherein the loop operation is comprised of re-assigning the last key from the first array with the highest temperature value that resulted in subtracting the first variable from the re-assigned last key not being greater than or equal to zero. In addition, the loop operation can further comprise assigning a last value from the second array with the highest heat pump value that resulted in subtracting the first variable from the re-assigned last key not being greater than or equal to zero. Here, the plurality of temperature data values in the first array are comprised of entering water temperatures, and the plurality of heat pump data values in the second array can be comprised of heat pump capacity. In addition, the plurality of heat pump data values in the second array can be comprised of heat pump power.

In another aspect of the disclosure described herein, a method of simulating a ground geothermal heat pump design is disclosed. The method can include receiving a first array having a plurality of temperature data values each assigned to plurality of keys, receiving a second array having a plurality of heat pump data values each assigned to a plurality of keys, determining the last key in the first array having the highest temperature data value, receiving a first temperature input variable, defining a first variable to be the first temperature input variable, determining if the first variable or the first temperature input variable is greater than or equal to the last key from the first array, determining if the first temperature input variable is less than or equal to the value assigned to the starting in the first array, and re-defining the first variable, wherein the re-defined first variable is the number one added to the starting key from the first array. The can also include subtracting the re-defined first variable from the last key in the first array and determining if the result is greater than or equal to zero, executing a loop operation, wherein the loop operation is comprised of re-assigning the last key from the first array with the highest temperature value that resulted in subtracting the re-defined first variable from the re-assigned last key not being greater than or equal to zero, assigning a second variable with a key to a value from the second array having the same key, assigning a third variable with a key to a value from first array having the same key, assigning a fourth variable to a value from the second array, assigning a fifth variable to the re-assigned last key value from the first array, and interpolating or extrapolating the received first temperature input variable, the assigned second variable, the assigned third variable, the assigned fourth variable, and the assigned fifth variable to calculate a sixth variable.

The method can further include wherein the loop operation can further comprise assigning a last value from the second array with the highest heat pump data value that resulted in subtracting the re-defined first variable from the re-assigned last key not being greater than or equal to zero. In addition, the plurality of temperature data values in the first array are comprised of entering water temperatures, and the plurality of heat pump data values in the second array are comprised of heat pump capacity. The the plurality of heat pump data values in the second array can be comprised of heat pump power.

The above summary is not intended to describe each and every disclosed embodiment or every implementation of the disclosure. The Description that follows more particularly exemplifies the various illustrative embodiments.

BRIEF DESCRIPTION OF THE DRAWINGS

The following description should be read with reference to the drawings, in which like elements in different drawings are numbered in like fashion. The drawings, which are not necessarily to scale, depict selected embodiments and are not intended to limit the scope of the disclosure. The disclosure may be more completely understood in consideration of the following detailed description of various embodiments in connection with the accompanying drawings, in which:

FIG. 9 illustrates one non-limiting embodiment and example scenario for calculated and simulated cooling operating costs for one zone, incorporating the operating hours scheduled within each discreet temperature increment for the building in a given year.

FIG. 9A illustrates one non-limiting embodiment and example scenario for calculated and simulated heating operating costs for one zone, incorporating the operating hours scheduled within each discreet temperature increment for the building in a given year.

FIG. 10 illustrates one non-limiting embodiment and example scenario for calculated and simulated cooling operating costs for one zone for a GHP benchmark having no hybrid design, incorporating the hourly operating schedule within each discreet temperature increment for the building in a given year.

FIG. 11 illustrates one non-limiting embodiment and example scenario of a chart for calculated and simulated cooling operating costs for one zone for GHP design having a 20% hybrid design, incorporating the number of hours spent within each discreet temperature increment for the building in a given year.

FIG. 13 illustrates one non-limiting embodiment and example scenario for calculated and simulated cooling total building energy requirements (BTUs) for a GHP design having no hybrid design, incorporating the hourly operating schedule within each discreet temperature increment for the building in a given month and in a given year.

FIGS. 14 and 15 illustrate one non-limiting embodiment of detailed flow charts for processing and calculating the GHP design simulation and modeling.

FIG. 17 illustrates a detailed flow chart for one non-limiting embodiment for processing and calculating EER and COP data and one non-limiting embodiment for calculating and modeling a GHP hybrid design.

FIG. 18 illustrates one non-limiting embodiment for a user interface device display screen 12 of detailed simulation and model for a GHP design for both cooling and heating having no hybrid design and including GHP benchmark data.

FIG. 19 illustrates one non-limiting embodiment for a user interface device display screen 12*a* and user device screen 14*a* of detailed simulation and model for a GHP design for both cooling and heating and having a GHP hybrid design.

FIG. 22 illustrates one non-limiting embodiment of a user interface device display screen 2, one non-limiting embodiment of a user interface device display screen 3, and one non-limiting embodiment of sample data within a Table 2.

FIG. 23 illustrates one embodiment of non-limiting sample data within Table 3, and one embodiment of non-limiting sample data within a Table 4.

FIG. 24 illustrates one non-limiting embodiment of a user interface device display screen 4, and one non-limiting embodiment of sample data within a Table 5.

FIG. 25 illustrates one non-limiting embodiment of a user interface device display screen 5, and one non-limiting embodiment of sample data within a Table 6.

FIG. 26 illustrates one embodiment of non-limiting sample data within a Table 7, one embodiment of non-limiting sample data within a Table 8, and one non-limiting embodiment of sample data within a Table 9.

FIG. 27 illustrates one non-limiting embodiment of a user interface device display screen 6, and one non-limiting embodiment of sample data within a Table 10.

FIG. 28 illustrates one non-limiting embodiment of a user interface device display screen 7, and one non-limiting embodiment of sample data within a Table 11.

FIG. 29 illustrates one non-limiting embodiment of a user interface device display screen 8, and one non-limiting embodiment of a user interface display screen 9.

FIG. 30 illustrates one non-limiting embodiment of a user interface device display screen 10, one non-limiting embodiment of sample data within a Table 12, and one non-limiting embodiment of sample data within a Table 13.

FIG. 31 illustrates one non-limiting embodiment of sample data within a Table 14, and one non-limiting embodiment of sample data within a Table 15.

FIG. 32 illustrates one non-limiting embodiment of sample data within a Table 16, and one non-limiting embodiment of sample data within a Table 17.

FIG. 33 illustrates one non-limiting embodiment of a user interface device display screen 11, and one non-limiting embodiment of sample data within a Table 18.

FIG. 34 illustrates one non-limiting embodiment of sample data within a Table 19.

FIG. 35 illustrates one non-limiting embodiment of the user interface device display screen 12 without populated data.

FIG. 36 illustrates one non-limiting embodiment of the user interface device display screen 12*a* without populated data.

FIG. 37 illustrates one non-limiting embodiment of a user interface device display screen 13, and one non-limiting embodiment of sample data within a Table 20.

FIG. 38 illustrates one non-limiting embodiment of a user interface device display screen 14, and one non-limiting embodiment of sample data within a Table 21.

DETAILED DESCRIPTION

Figure 1:
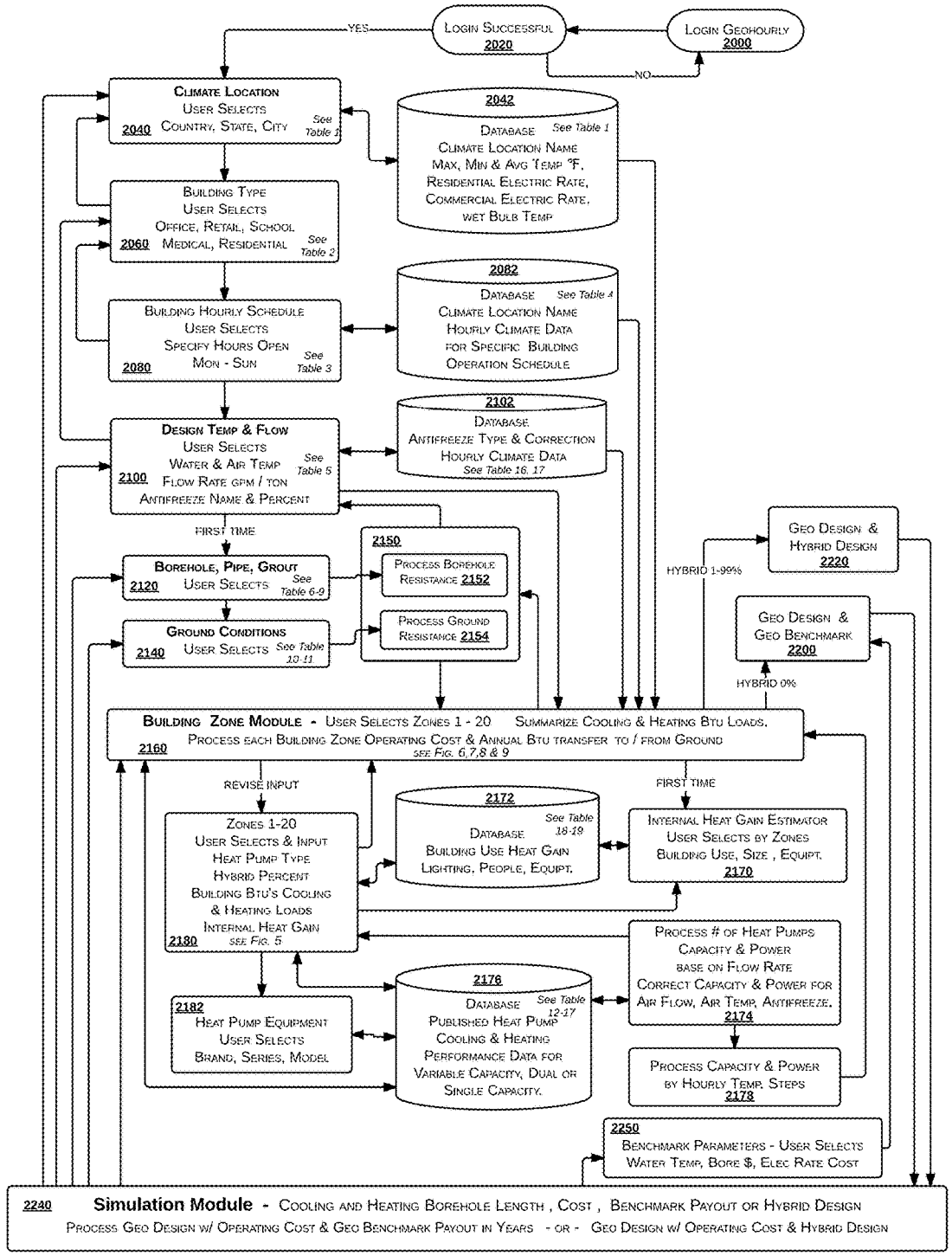
FIG. 1 illustrates one non-limiting embodiment of a flow chart diagram illustrating a process for simulating and modeling within the GHP application.

In the Brief Summary of the present disclosure above and in the Detailed Description of the Disclosure described herein, and the claims below, and in the accompanying drawings, reference is made to particular features (including method steps) of the disclosure described herein. It is to be understood that the disclosure of the disclosure described herein in this specification includes all possible combinations of such particular features. For example, where a particular feature is disclosed in the context of a particular aspect or embodiment of the disclosure described herein, or a particular claim, that feature can also be used, to the extent possible, in combination with and/or in the context of other particular aspects and embodiments of the disclosure described herein, and in the disclosure described herein generally. Further, it is contemplated within the scope of the disclosure described herein that certain processes, methods, and steps described herein may be performed in any order and may include all steps, some steps, or omit others.

The embodiments set forth below represent the necessary information to enable those skilled in the art to practice the disclosure described herein and illustrate the best mode of practicing the disclosure described herein. In addition, the disclosure described herein does not require that all the advantageous features and all the advantages need to be incorporated into every embodiment of the disclosure described herein.

Video displays may include devices upon which information may be displayed in a manner perceptible to a user, such as, for example, a computer monitor, cathode ray tube, liquid crystal display, light emitting diode display, touchpad or touch-screen display, and/or other means known in the art for emitting a visually perceptible output. Video displays may be electronically connected to a mobile device according to hardware and software known in the art.

In one implementation of the disclosure described herein, a display page may include information residing in the mobile device's memory, which may be transmitted from the mobile device over a network to a central center and vice versa. The information may be stored in memory at each of the mobile device, a data storage resided at the edge of the network, or on the servers at the central center. A server, computing device, or mobile device may receive non-transitory computer readable media, which may contain instructions, logic, data, or code that may be stored in persistent or temporary memory of the mobile device, or may somehow affect or initiate action by a mobile device. Similarly, one or more servers may communicate with one or more mobile devices across a network, and may transmit computer files residing in memory. The network, for example, can include the Internet, wireless communication network, or any other network for connecting one or more mobile devices to one or more servers.

Any discussion of a server, computing, or mobile device may also apply to any type of networked device, including but not limited to phones such as cellular phones (e.g., an iPhone®, Android®, Blackberry®, or any 'smart phone'), a personal computer, iPad®, server computer, or laptop computer; personal digital assistants (PDAs) such as a Palm-based device or Windows® CE device; a roaming device, such as a network-connected roaming device; a wireless device such as a wireless email device or other device capable of communicating wireless with a computer network; or any other type of network device that may communicate over a network and handle electronic transactions. Any discussion of any mobile device mentioned may also apply to other devices for operating, processing, using, or executing the GHP application.

On a server, computing, or mobile device, the display page may be interpreted by software residing on a memory of the device, causing the computer file to be displayed on a video display in a manner perceivable by a user. The display pages described herein may be created using a software language known in the art such as, for example, the hypertext mark up language ("HTML"), the dynamic hypertext mark up language ("DHTML"), the extensible hypertext mark up language ("XHTML"), the extensible mark up language ("XML"), Java, C/C#/C++, or another software language that may be used to create a computer file displayable on a video display in a manner perceivable by a user. Any computer readable media with logic, code, data, instructions, may be used to implement any software or process flow or steps or methodology. Where a network comprises the Internet, a display page may comprise a webpage of a type known in the art. Further, the computing device can operate with or work in conjunction with any content management software (CMS) or customer relations software (CRM) which can include but not limited to WordPress, any Java based software, Microsoft ASP.NET software, Perl based software, PHP based software, Python based software, Ruby on Rails based software, ColdFusion Markup Language (CFML), or other Software as a Service (SaaS) based software.

A display page according to the disclosure described herein may include embedded functions comprising software programs stored on a memory, for example, Cocoa, VBScript routines, JScript routines, JavaScript routines, Java applets, ActiveX components, ASP.NET, AJAX, PHP, Flash applets, Silverlight applets, or AIR routines. A display page may comprise well-known features of graphical user interface technology, for example, frames, windows, tabs, scroll bars, buttons, icons, menus, fields, and hyperlinks, and well-known features such as a touchscreen interface. Pointing to and touching on a graphical user interface button, link, icon, menu option, or hyperlink also is known as "selecting" the button, link, icon, option, or hyperlink. Additionally, a "point and gesture" interface may be utilized, such as a hand-gesture driven interface. Any other interface for interacting with a graphical user interface may be utilized, such as haptic feedback interfaces. A display page according to the disclosure described herein also may incorporate multimedia features.

Phrases and terms similar to "software", "application", and "firmware" may include any non-transitory computer readable medium storing thereon a program or algorithm, which when executed by a computer, causes the computer to perform a method, process, or function.

Phrases and terms similar "network" may include one or more data links that enable the transport of electronic data between computer systems and/or modules. When information is transferred or provided over a network or another communications connection (either hardwired, wireless, or a combination of hardwired or wireless) to a computer, the computer uses that connection as a computer-readable medium. Thus, by way of example, and not limitation, computer-readable media can also comprise a network or data links which can be used to carry or store desired program code means in the form of computer-executable instructions or data structures and which can be accessed by a general purpose or special purpose computer.

Phrases and terms similar to "portal" may include an intranet page, internet page, locally residing software or application, or digital presentation for a user of the present disclosure described herein. The portal may also be any graphical user interface for accessing various modules, features, options, and/or attributes of the present disclosure described herein. For example, the portal can be a web page accessed with a web browser, mobile device application, or any application or software residing on a computing device.

Figure 1A:
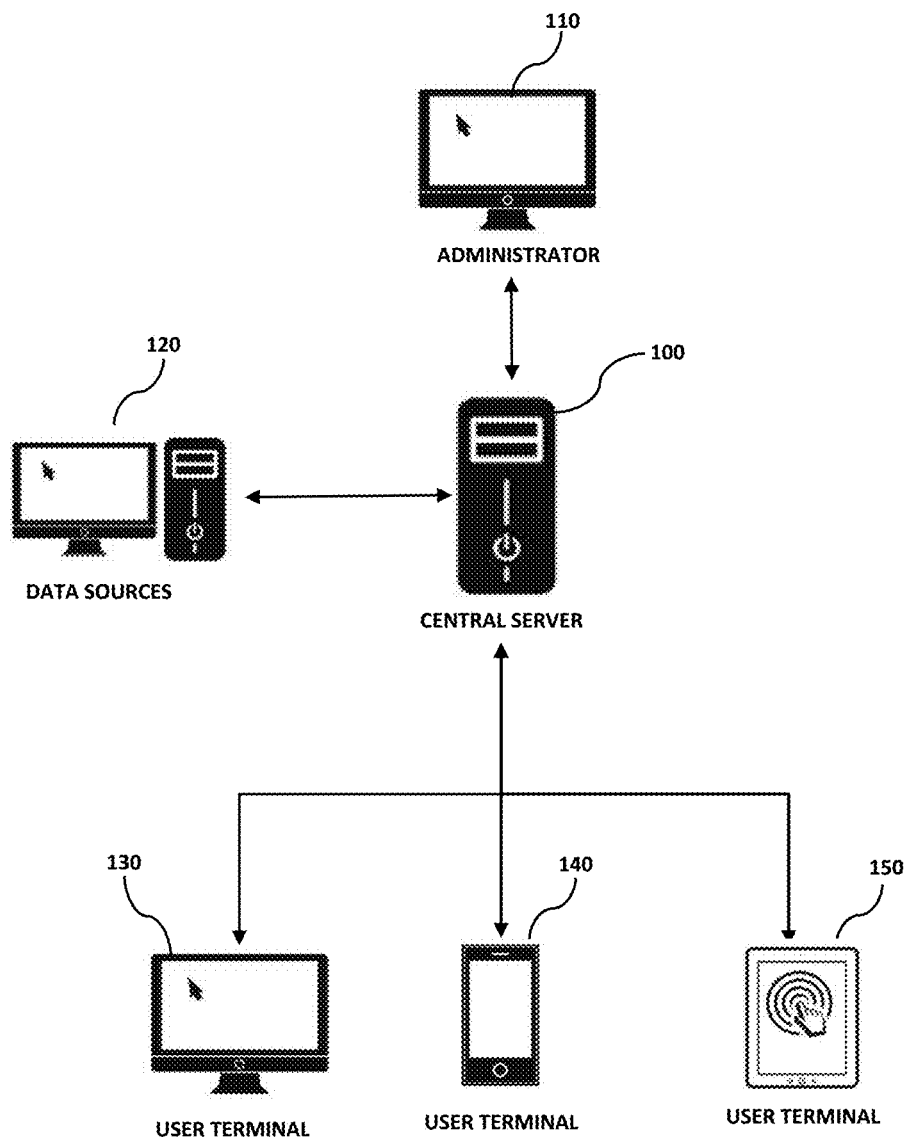
FIG. 1A illustrates one non-limiting embodiment of a general network architecture system for the GHP application.

FIG. 1A illustrates an overview diagram of one non-limiting embodiment of the in-ground GHP design program (referred to hereinafter as "GHP application" or "GHP program") of the disclosure described herein for designing, analyzing, modeling, and simulating an in-ground GHP system, including a ground loop design and simulation. The GHP application system can include one or more central servers 100 or computing devices in bi-directional communication with one or more administrator 110, data source 120, user terminal 130, user terminal 140, and user terminal 150. Here, in one embodiment, central server 100 can have the GHP application residing thereon, wherein any users of users 130-150 can access and interact with from their computing device via a network, using one or more portals (such as a web browser). Here, terminals 130-150 can have various access levels, privileges, and functionalities within the GHP application, and can also share data among each other or with server 100. It is contemplated within the scope of the disclosure described herein that there may be any number of terminals or clients having various access privileges and functionalities within GHP application network. Administrator 110 can have various access functionalities to the GHP application residing on server 100, for example, modifying various parameters and settings of the GHP application and adding/deleting/editing users of the GHP application. Server 100 can further communicate with one or more data sources, such as data source 120, for either download/uploading third party data from one or more servers. For example, this data can include but is not limited to: geographic data, climate data, weather data, environmental data, building data, location data, heat pump performance data, heat pump technical data, statistical data, ground data, soil data, piping data, HVAC data, HVAC device data, HVAC component data, efficiency data, tool data, heat pump/exchanger data, manufacturer data, and geothermal design data, among others.

FIG. 1 illustrates a general overview of a flowchart for one embodiment of the GHP application. For example, at step 2000, a user can visit a portal for the GHP application and be prompted to login or register with the GHP application network. If the user is not yet a registered user, then they can create a user profile having a username and password. Once registered, the user can enter their username and password for authentication with the GHP application. If authentication is successful at step 2020, then the process can proceed to step 2040. At step 2040, the user can select one or more geographical or location data for a building design site. Here, the location data can be retrieved from anywhere in the world, or any map data available on Google® or online mapping or geographical service and the data can be retrieved from, read from, saved to, or written to database 2042. Here, this geographical or location data can include weather data, temperature data, temperature profile data, climate data, environmental data, soil data, borehole data, ground condition, earth related data, and statistical data, among others. It is contemplated within the scope of the disclosure described herein that the GHP application can retrieve this from a database which can be residing locally on a server or retrieve this data from third party source either in real-time or previously downloaded at another time. Once geographical data from step 2040 has been received, then the process can proceed to step 2060. At step 2060, the user can be prompted to either manually input or select one or more types of buildings that the user will be designing. For example, these can include commercial, residential, house, office, retail, school, warehouse, high-rise, mid-rise, condominium, single family home, townhome, building capacity, building dimensions, building size, among others. The user also has the option to go back to step 2040 to make any changes. Once a building type data is received, then the process can then proceed to step 2080.

At step 2080, the user can be prompted to manually input or select operating schedule data for the building, which can be retrieved from, read from, written to, or saved to database 2082. For example, the operating schedule data can include but is not limited to operating months/days/hours/minutes, open business months/days/hours/minutes, closed months/days/hours/minutes, peak or off peak months/days/hours/minutes. In addition, the schedule data can be provided in database of the GHP application or retrieved via network from one or more remote sources. Once the operating schedule data is received by the GHP application, the process can then proceed to step 2100. At anytime, the user also has the option to go back to step 2080. At step 2100, the user can manually input or select design temperature and flow rate data (GPM/ton) for the building design which can be retrieved from, read from, saved to, or written to database 2102. Alternatively, the design temperature and/or flow rate data can be automatically pre-populated by the GHP application based on the prior received location and climate data. The building design temperature and flow rate data can include but is not limited to: design entering water and air temperatures for heating and cooling, thermostat inside of building for heating and cooling, flow rate (GPM/ton), type/quantity of antifreeze additive, and circulating water freeze point, among others. Once the building design temperature and flow rate data is received, the process can proceed to step 2120. At anytime, the user also has the option to go back to step 2100.

In addition, prior to proceeding to step 2120, the process can automatically detect or ask the user if this is the first time they are inputting the design parameters of step 2100. If this is the first time, then the process can proceed to step 2120, if not, then the process can automatically direct the user to step 216. Alternatively, the user can manually move to step 2160 or proceed to step 2120. At step 2120, the user can select or manually input borehole and grout data for the building design, including but not limited to: borehole diameter, HDPE pipe diameter, HDPE resin, SDR ratio, ground conductivity, and configurations for u-tube piping in the boreholes, among others. Once the borehole and grout data is received by the GHP application, then the process can then proceed to step 2140. At step 2140, the user can manually input or select ground conditions, such as ground thermal resistance data. The ground conditions can include but is not limited to: ground conductivity, ground diffusivity, thermal resistance, undisturbed earth temperature, ground density, ground moisture, long term ground effect forecast years, distance between boreholes, and loopfield grid layout, among others. Once the ground conditions or ground thermal resistance data is received at step 2140, then the process can process all prior inputted/selected and received data in combination with the borehole resistance data at step 2152 and ground resistance data at step 2154 and direct the user to the building zone module at step 2160, wherein the user can select or input data for individual zones 2180. Alternatively, the user may manually select to go to building zone module step 2160.

At step 2160, the user can be presented with a building zone module hub, page, or portal, wherein one or more of the aforementioned user selected data and/or calculated and computer data can also be presented to the user for review, selection, or input. Further the building zone module 2160 allows the user to enter, select, and input a variety of attributes related to a zone within the building. Here, zones can be a floor, room, open space, closed space, or any area in or around the building. For example, the building zone module data can include, but is not limited to: individual zone display loads, type of zone area (i.e. general office, conference, utility room, etc.), square footage of the zone, heat pump type/number, zone capacity, and electric operating costs, among others. Further, there can be any number of independent zones, such as from 1-1,000 zones. If this is the first time that the user is inputting data for a particular zone, then they can automatically be directed to step 2170.

At step 2170, the user may input or select the internal heat gain data or accept the estimated heat gain data generated by the GHP application. Heat gain data can include but is not limited to: heat gain parameters such heat generated from light, people, number and type of appliances, electronics, and heat dissipating devices in use, percentage of area comprised of windows/glass, type of building and use, lighting wattage/square footage, square footage occupied per person, and BTUs per person, among others. Once the internal heat gain data is received at step 2170, then the process will go step 2180, via module 2160.

At step 2180, which can be performed within the building zone module portal 2160, the user can optionally revise prior input (such as prior heat gain parameters from step 2170) or enter new input for the zones in addition to inputting or selecting various other parameters, including but not limited to type of zone, square footage of the zone, heat pump type, make, or model, a hybrid design percentage, the building zone's current or anticipated peak/block cooling and heating loads, and the building zone's internal heat gain parameters such heat generated from light, people, number and type of appliances, electronics, and heat dissipating devices in use, percentage of area comprised of windows/glass, type of building and use, lighting wattage/square footage, square footage occupied per person, and BTUs per person, among others. Once the parameters are selected or inputted, then the process can proceed back to step 2160.

More specifically, at step 2182, which can also be within the building zone module portal, the user can input and select one or more types of heat pumps for the selected zone, and the GHP application can later determine and simulate the quantity of the selected heat pumps are required for the GHP design and at what operating capacity they are to run, such as part, full, or variable capacity. The heat pump types can be include the brand, model, and series, wherein the model or series can indicate the heat pump's capacity/tonnage, among others, and wherein the brands can be from a variety of manufacturers including but not limited to Carrier®, Bosch®, ClimateMaster®, DaikinApplied®, FHP_mfg, GeoComfort®, GeoExcel®, HydronModule®, Tetco®, WaterFurnace®, among others. Further, the technical specifications and performance data for each heat pump type, model, and series can be saved and retrieved from one or more tables within database 2176. Further, the heat pump technical and performance data within database 2176 can be also be automatically updated when new heat pump types and/or performance data is available. The heat pump performance data can include but is not limited to size, power, capacity, flow rate, airflow data, entering water temperatures, air temperatures, anti-freeze type, and freeze points, among others. More specifically, the heat pump performance data can include minimum and suggested/recommended loop flow rate for capacity (BTU/hr) and power (kW) over a range or increments of entering water temperatures for cooling (i.e. 60, 70, 80, 90, and 100 deg. F.) and heating (i.e. 30, 40, 50, and 60 deg. F.) for heating. Further, the aforementioned published heat performance data is later standardized and corrected by the GHP application for motor type, airflow, air temperature, anti-freeze type, and freeze points based on the GHP design parameters for the building's zone, which will be described in more detailed in the disclosure described herein.

Still referring to step 2182, the user is prompted or required to input or select a maximum or peak/block BTU heating and cooling loads for the selected zone, more specifically, the maximum or peak load conditions for the heat pump(s). In addition, the user can input or select an internal average heat gain. Alternatively, the GHP application can provide an estimated heat gain value for the individual selected zone that is based on prior received data about the building, zone, and GHP design. Further, it is noted that the internal heat gain values should be entered independently of the heating and cooling loads. The entered and received maximum heating, cooling, and internal heat gain parameters are then written and saved to database 2172, where they will be retrieved by the GHP application for further processing.

Referring back to step 2180, the previously received zone data can be stored to and/or retrieved from tables within database 2172, wherein step 2180 can also store data to and/or retrieve data from database 2176 and further send this data to step 2174 and 2178 for processing (or back to zone module 2160), wherein the processed data of steps 2174 and 2178 can be transmitted back to the building zone module at step 2160, thereby providing updated GHP design data for the selected zone. Regarding hybrid design, the user has the option of running a hybrid GHP design simulation. If the hybrid design simulation selected from the building zone module, such as 1%-99% of the GHP system design being hybrid, then the GHP application can calculate and simulate a hybrid design at step 2220 and present the hybrid design data model and simulation at step 2240. Alternatively, if no hybrid design is selected (0% hybrid) then the process can calculate and simulate benchmark parameter design parameters entered at step 2250 and model at step 2200 and present this data to the simulation and model step 2240. Here, it is contemplated within the scope of the disclosure described herein that the hybrid design can be for heating or cooling. For example, for hybrid cooling, one or more of a cooling tower, fluid cooler, condenser, or chiller, alone or in combination, may be incorporated into the GHP simulation. For hybrid heating, a boiler, furnace, hot water heater, or secondary ground loop, alone or in combination, may be incorporated into the GHP simulation. Here, the one or more hybrid heating or cooling apparatuses can be activated at a pre-defined operating schedule or pre-set temperature threshold, when a maximum heat pump load is reached, or when an entering water temperature threshold is reached, or combination of the one or more aforementioned conditions. Here, the hybrid apparatuses can work in combination, and/or simultaneously, with the GHP heat pumps and system, thereby handling a percentage of the overage load/capacity that has exceeded the threshold maximum load/capacity for the ground loop.

Regarding step 2250, the user can optionally select or manually input benchmark or comparison data at step 2250, including but not limited to benchmark inputting or selecting entering water temp for cooling and heating, a cost for ground loop or borehole installation, and utility electric rate, among others. Once the benchmark data is received at step 2250, then process can proceed to step 2200 and subsequently step 2240 for simulating and modeling the GHP system with the benchmark data. Alternatively, if the user selects the previously aforementioned hybrid design (step 2220), then the user can select or input various hybrid design parameters including but not limited to the type of hybrid apparatus (i.e. cooling tower, fluid cooler, chiller, boiler, furnace, water heater, etc.) including its brand and model, hybrid entering water temperature, condenser type, fan size, fan efficiency, pump size, and pump efficiency, among others. Once the hybrid design data is received, the process can then proceed to step 2240 for modeling and simulating the GHP system having a hybrid design, such as a GHP system in combination with one or more cooling or heating systems, as previously described.

At simulation and modeling step 2240, the user can be presented with one or more portals, user interfaces, or screens for illustrating one or more models and simulations based on the computations and/or calculations performed using the one or more user selected data in one or more of steps 2040-2220. For example, the simulation data can include but is not limited to borehole length, borehole length for a 5-25 year period, number of boreholes, length per borehole, long term ground effect, borehole length for a 1 year period, design heat pump inlet, design heat pump outlet, all zones building Btu load, total heat pump capacity, hybrid design data, all zones peak demand, all zones flow rate, annual EER/COP, electric operating costs, benchmark heat pump inlet, excess length, excess length payout, undisturbed earth temperature, ground conductivity, ground diffusivity, pipe diameter, borehole diameter, grout conductivity, borehole resistance, ground moisture, building operational schedule/hours, distance between boreholes, grid across field, and grid down, among others. In addition, once at step 2240, the user further has the option to go back to any one or more of steps 2040, 2060, 2080, 2100, 2120, 2140, 2160, 2170, 2180, 2182, 2200, 2200, and 2250, among others, in order to modify, add, or remove selections or data, thus instantly, simultaneously, or in real-time modifying and updating the design simulation at step 224. For example, in one embodiment, all of the portals or screen for steps 2040, 2060, 2080, 2100, 2120, 2140, 2160, 2170, 2180, 2182, 2200, 2200, 2250, and 2240 can be presented to the user on one display screen, tab, page, web page, or user interface wherein the user can move, scroll, or swipe up, down, left, or right in order to simply switch from one portal or screen to another, thus allowing the user to run several simulations without much effort in a simple and easy use user interface.

Figure 2:
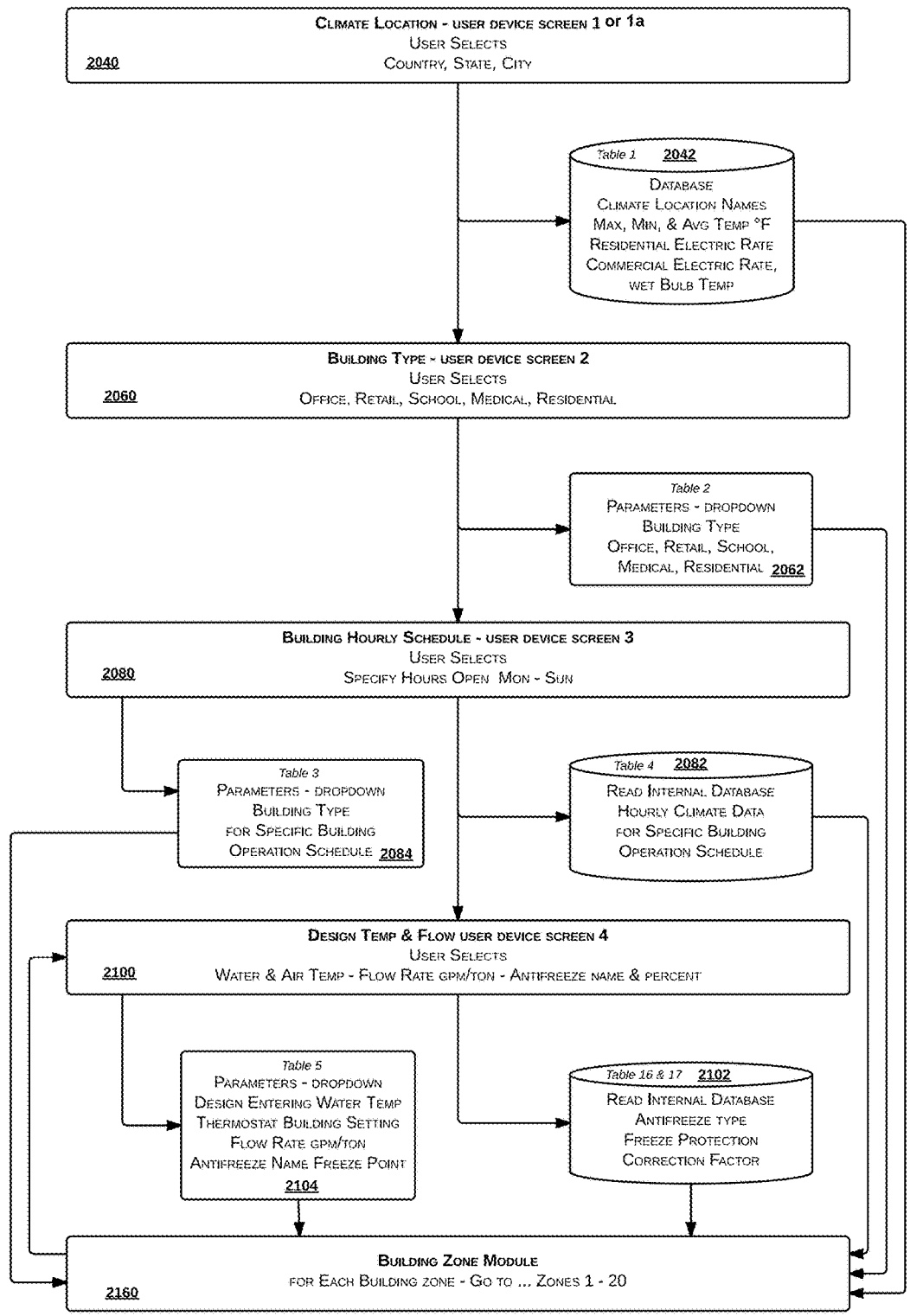
FIG. 2 illustrates a more detailed flow chart diagram of the embodiment of FIG. 1, further illustrating the transmitting to and/or reading of received data from various databases and to and from building zone module 2160.

FIG. 2 illustrates a more detailed flow chart diagram of the embodiment of FIG. 1, further illustrating the transmitting to and/or reading of data from databases 2042, 2062, 2082, and 2102 to and from zone summary portal 2160. In addition, FIG. 2 also further illustrates the transmitting to and/or reading of user selected data from data selection input portals 2062, 2084, and 2104 to and from building zone module portal 2160 for each zone within the building.

Figure 3:
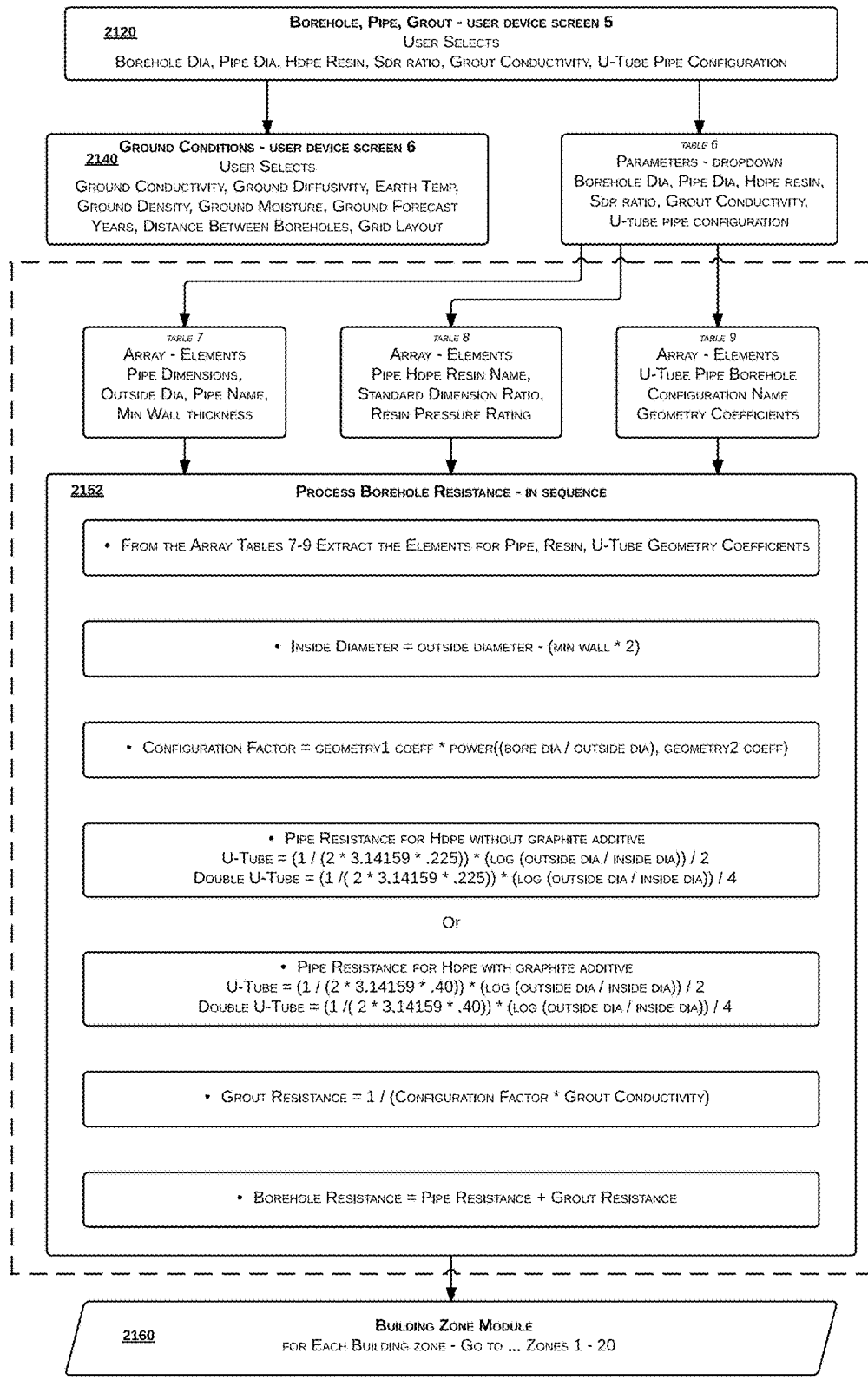
FIG. 3 illustrates a more detailed flow chart diagram of FIG. 1, further illustrating the process for processing and calculating borehole resistance at step 2152.

FIG. 3 illustrates a more detailed flow chart diagram of FIG. 1, further illustrating the process for processing and calculating borehole resistance at step 2152. More specifically, once borehole grout and ground condition data is received at steps 2120 and 2140, the process of the GHP application can extract data from a plurality of array tables, such as Tables 7, 8, 9 (which receive data from table 6), and received from steps 2120 and 2140. Here, at step 2152, for the borehole resistance data, the process will begin by extracting elements and values for the pipe, resin, u-tube geometry coefficients. Next, the process can set inside pipe diameter data variable (Inside Diameter=outside diameter−(min wall*2)), and a configuration factor variable (Configuration Factor=geometry1 coeff*power((bore dia/outside dia), geometry2 coeff)). Next, the pipe resistance data using high-density polyethylene (HDPE) for a single u-tube (U-Tube=(1/(2*3.14159*0.40))*(log (outside dia/inside dia))/2) and double-u tube configurations (Double U-Tube=(1/(2*3.14159*0.40))*(log (outside dia/inside dia))/4) will be set with graphite data or without graphite additive. Next, the process will set the grout resistance variable (Grout Resistance=1/(Configuration Factor*Grout Conductivity)). Finally, the process can then add the calculated pipe resistance and grout resistance data in order to set a borehole resistance variable (Borehole Resistance=Pipe Resistance+Grout Resistance). The calculated borehole resistance variable and data can be then be sent to the building zone module 2160.

Figure 4:
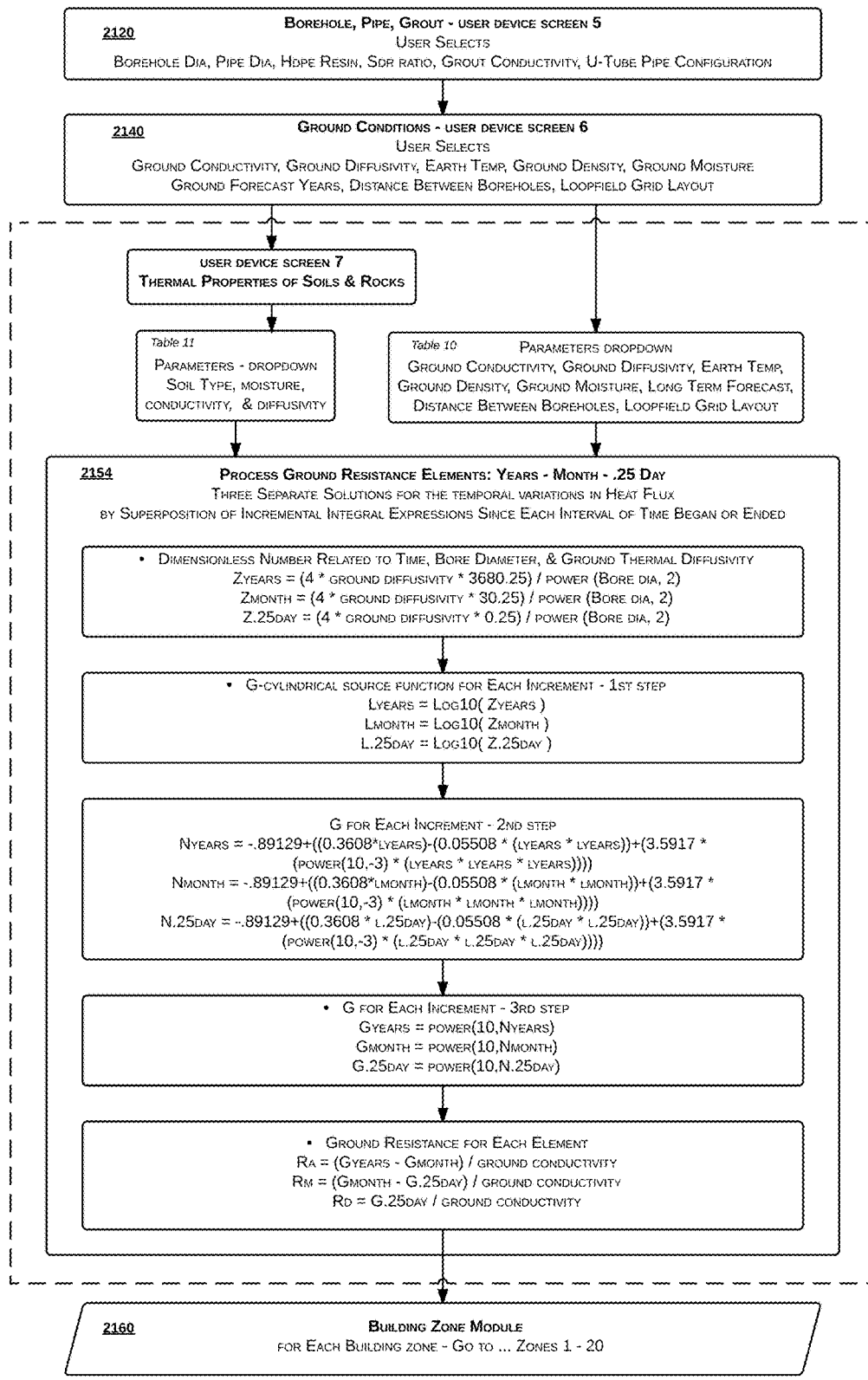
FIG. 4 illustrates a more detailed flow chart diagram of FIG. 1, further illustrating the process for processing and calculating ground resistance at step 2154.

FIG. 4 illustrates a more detailed flow chart diagram of FIG. 1, further illustrating the process for processing and calculating ground resistance at step 2154. More specifically, once borehole grout and ground condition data is received at steps 2120 and 2140, the process of the GHP application can extract data from one or more array tables, such as Tables 10 and 11, and received data from steps 2120 and 2140. More specifically, the process will calculate ground resistance elements or variables years, months, and ¼ of a day for three separate solutions for the temporal variations in heat flux by superposition of incremental integral expressions for when each interval of the time elements began or ended. First, a dimensionless value or number can be calculated related to time, bore diameter, and ground thermal diffusivity; (Zyears=(4*ground diffusivity*3680.25)/power (bore dia, 2); Zmonth=(4*ground diffusivity*30.25)/power (bore dia, 2)); Z.25 day=(4*ground diffusivity*0.25)/power (bore dia, 2)). Next, G-cylindrical value for each increment at first step is calculated and set; (Lyears=Log 10(Zyears); L month=Log 10(Zmonth); L.0.25 day=Log 10(Z.25 day)). Next, a Gvalue for each increment is calculated and set at a second step; (Nyears=−0.89129+((0.3608*Lyears)−(0.05508*(Lyears*Lyears))+(3.5917*(power(10,−3)*(Lyears*Lyears*Lyears)))); Nmonth=−0.89129+((0.3608*Lmonth)−(0.05508*(Lmonth*Lmonth))+(3.5917*(power(10,−3)*(Lmonth*Lmonth*Lmonth)))); N.25 day=−0.89129+((0.3608*L.25 day)−(0.05508*(L.25 day*L.25 day))+(3.5917*(power(10,−3)*(L.25 day*L.25 day*L.25 day))))). Then, a G value for each increment is calculated and set at a third step is set; (Gyears=power(10,Nyears) Gmonth=power(10,Nmonth)G.25 day=power(10,N.25 day)). Finally, ground resistance value are calculated and set for the prior calculated data and elements; (Ra=(Gyears−Gmonth)/ground conductivity; Rm=(Gmonth−G.25 day)/ground conductivity; Rd=G.25 day/ground conductivity). The processed and calculated ground resistance values are then sent to the building zone module 2160.

Figure 5:
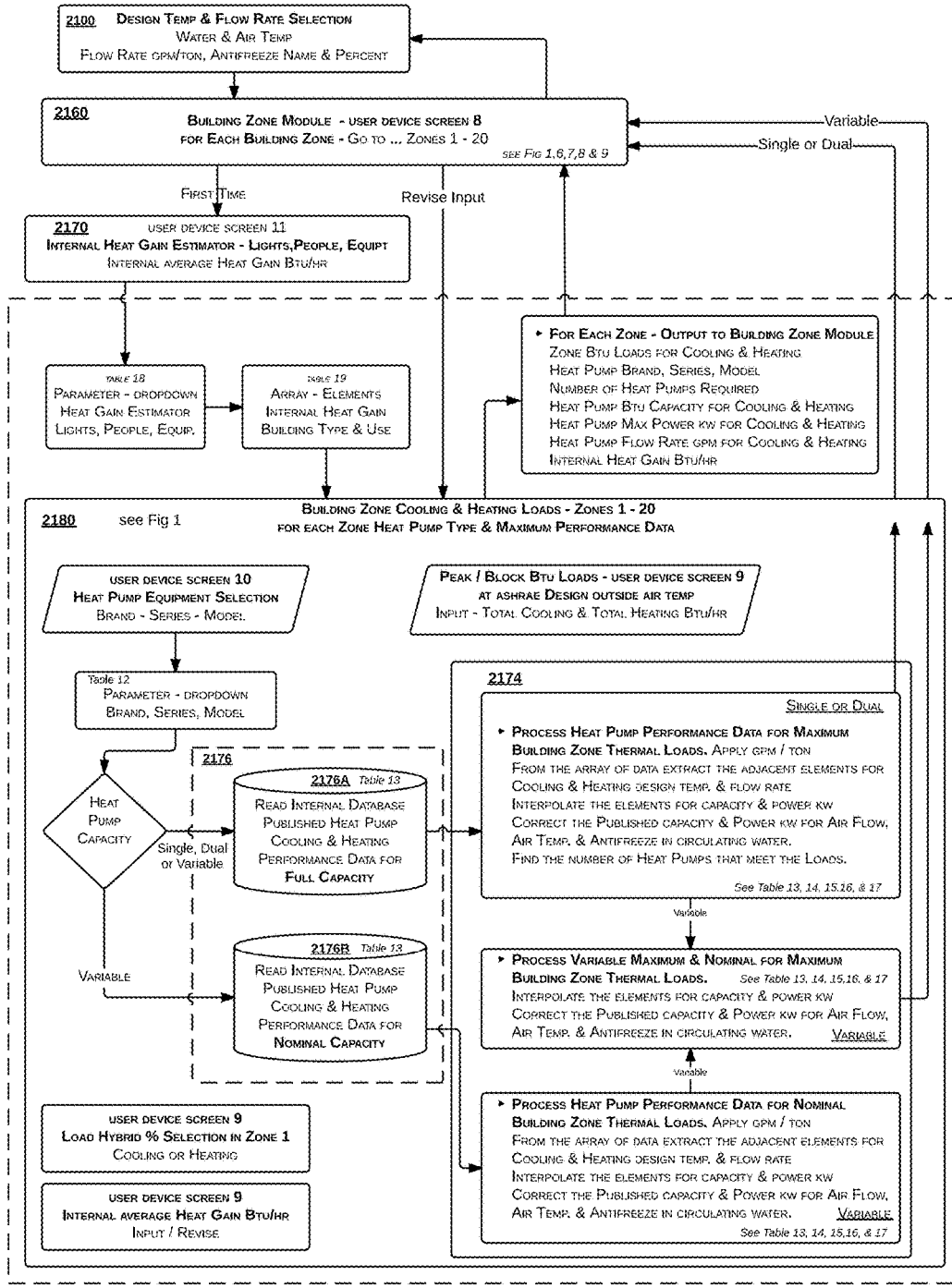
FIG. 5 illustrates a more detailed flow chart diagram of FIG. 1, further illustrating the process for inputting the building cooling and heating loads for each zone at step 2180.

FIG. 5 illustrates a more detailed flow chart diagram of FIG. 1, further illustrating the process for inputting the maximum peak/block building cooling and heating loads for each zone at step 2180. More specifically, step 2180, which can be performed within the building zone module 2160, can receive the internal heat gain data and heat pump equipment data. Here, the process can determine if the received heat pump equipment data is a single, dual, or variable capacity heat pump and standardizing/iterating the manufacturer published performance data for the various capacity heat pumps based on cooling and heating inlet temperatures and flow rate. Here, if the heat pump is a single or dual capacity, then the heat pump performance data within database 2176, and more specifically database 2176A for full capacity operation will be retrieved. The performance data will then be processed for the received maximum peak/block heat pump load for that particular zone.

Still referring to FIG. 5, the description for the processing and heat pump performance data and standardizing flow rate for GPM/ton for single or dual capacity or stage heat pump at full capacity can include the following process: Applying GPM/ton from a table array of data and extract the adjacent elements for Cooling & Heating design temperature and flow rate; then interpolating the elements for capacity and power (kW) and correcting the manufacturer published capacity and power (kW) data for air flow, air temperature, antifreeze in circulating water; and finding the number of heat pumps that meet the loads. Here, Tables 13, 14, 15, 16, and 17 show sample data, elements, and units for the heat pump data retrieved from a database, such as database 2176, for the aforementioned heat pump performance, correction, and standardization process. Once the standardized or corrected single or dual capacity heat pump at full capacity data is processed for the maximum load, then it can be sent back to the building zone module 2160.

Still referring to FIG. 5, if a variable capacity heat pump data is received, then the heat pump performance data for full capacity will be retrieved from database 2176A and calculated similar to how it was performed for the dual or single capacity heat pump (as described previously) to obtain a variable maximum capacity data. In addition, the heat pump performance data for nominal capacity will be retrieved from database 21768 and calculated to obtain a variable nominal capacity data, and more specifically, an embodiment for the obtaining the variable nominal capacity data in one embodiment can include the following process: Applying GPM/ton from a table array of data and extract the adjacent elements for Cooling & Heating design temperature and flow rate; then interpolating the elements for capacity and power (kW) and correcting the manufacturer published capacity and power (kW) data for air flow, air temperature, antifreeze in circulating water.

Still referring to FIG. 5, once the variable maximum and variable nominal data is calculated, these data sets will then be interpolated/iterated to obtain another set of data that includes corrected and standardized heat pump performance data, such as capacity and power. Here, Tables 13, 14, 15, 16, and 17 show sample data, elements, and units for the heat pump data retrieved from a database, such as database 2176, for the aforementioned heat pump performance, correction, and standardization process. Here, once the variable capacity is interpolated for the variable full capacity (maximum) and nominal capacity (nominal) for the maximum load, then the standardized data can be sent back to the building summary module 2160. For a more detailed process flow chart for processing the heat pump performance data for the maximum load and standardize the flow rate for GPM/ton we can refer to FIGS. 5A and 5B, wherein FIGS. 5A and 5B will later be described in detail in the disclosure described herein.

Here, in one embodiment, the GHP application process must perform the heat pump performance correction and standardization processes for a maximum peak/block heat pump load for the particular zone first before running the same process again (performing the heat pump performance, correction, and standardization) according to the hourly building operating schedule data in order to obtain the most accurate data, which will be described later in the disclosure described herein. However, it is contemplated within the scope of the disclosure described herein that heat pump performance correction and standardization processes can also be incorporated in lieu of or in combination with the aforementioned processes.

Figure 5A:
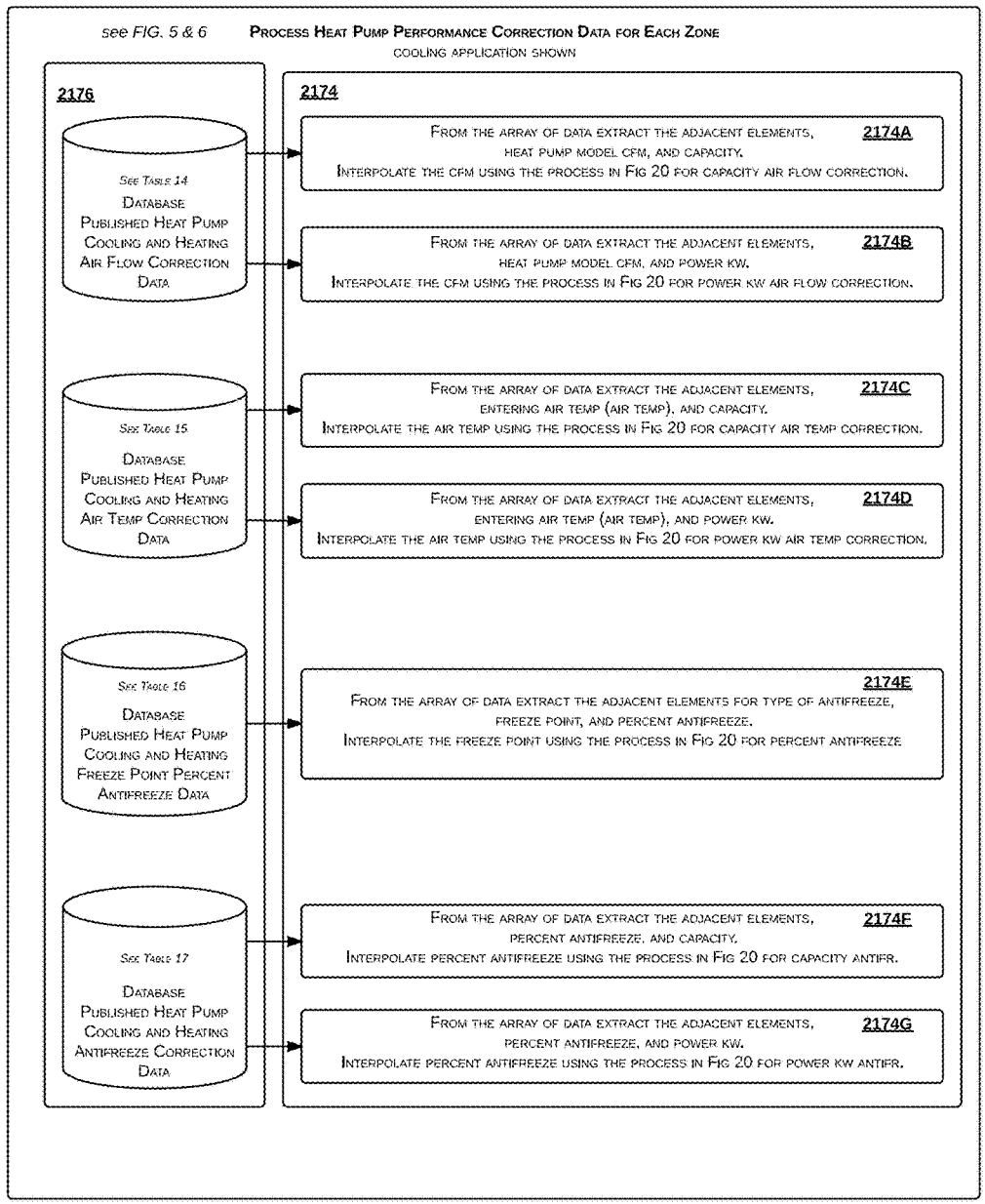
FIG. 5A illustrates a more detailed flow chart diagram of FIG. 5, further illustrating one non-limiting embodiment for processing, standardizing, and correcting individual zone heat pump performance data for a GHP design.
Figure 5B:
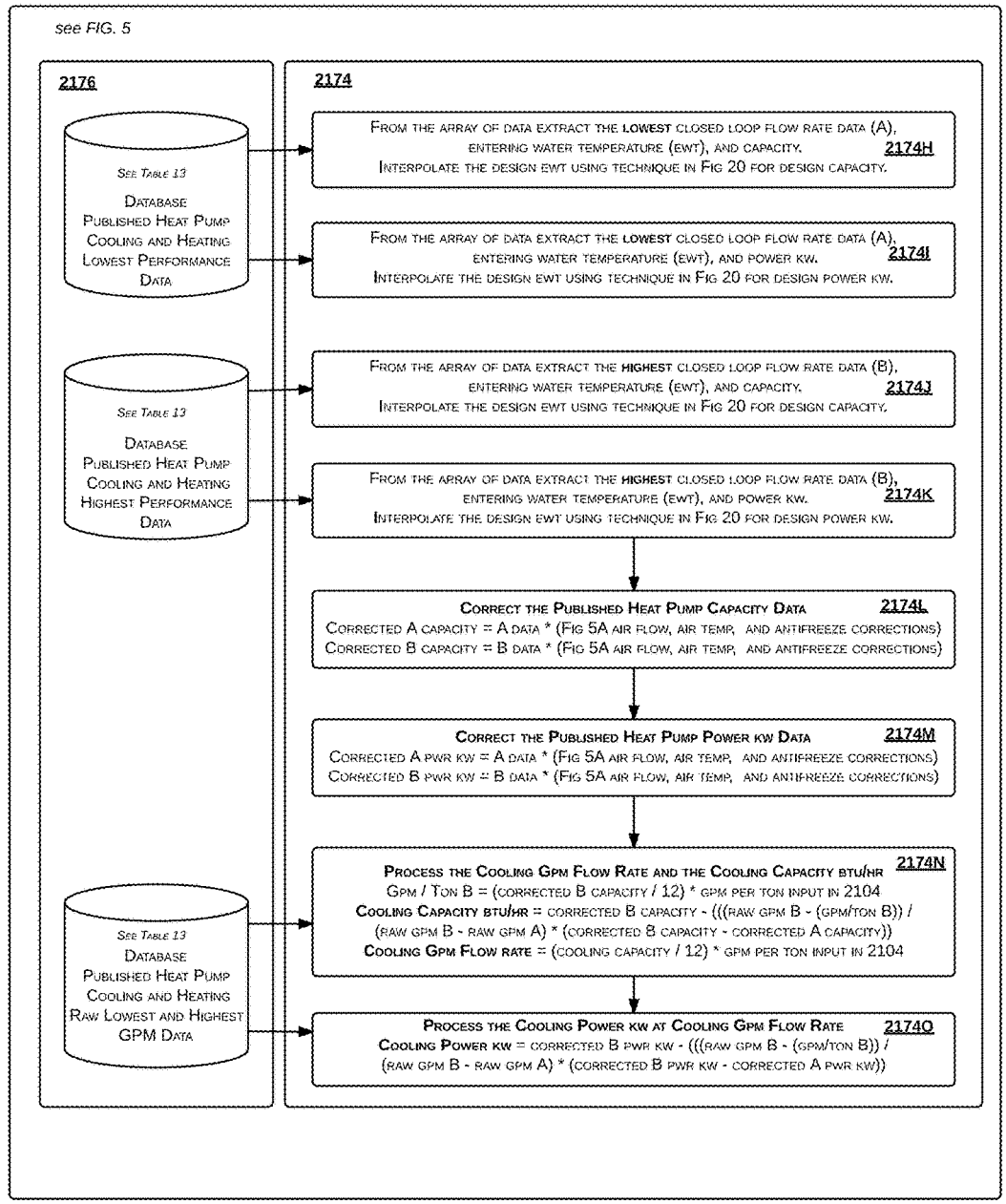
FIG. 5B further illustrates the embodiments of FIGS. 5 and 5A flow chart for processing individual zone heat pump performance for maximum building zone thermal loads and standardizing the flow rate.
Figure 6:
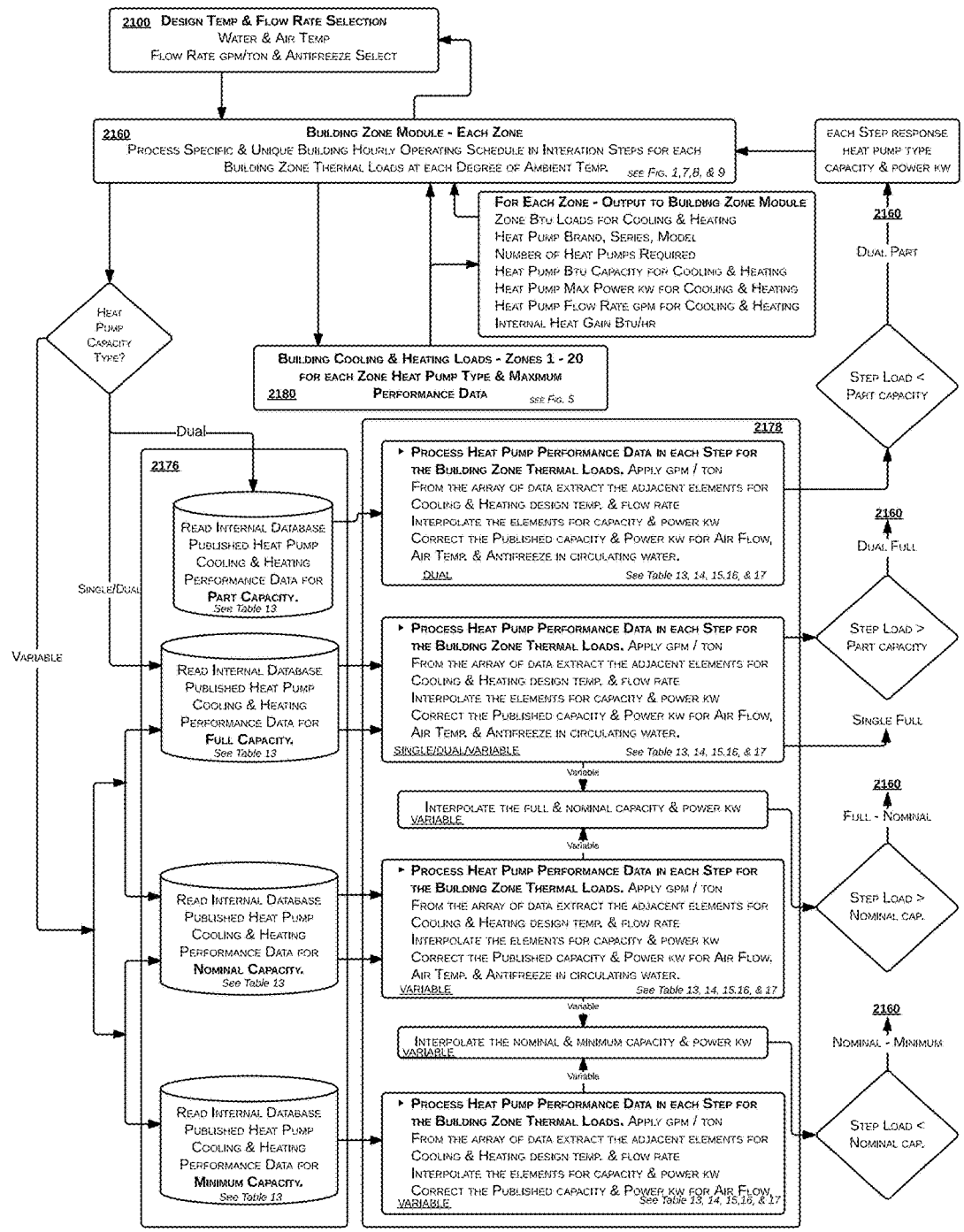
FIG. 6 illustrates a more detailed flow chart diagram of FIG. 1, further illustrating the process for calculating heat pump capacity and demand data at step 2178.
Figure 6A:
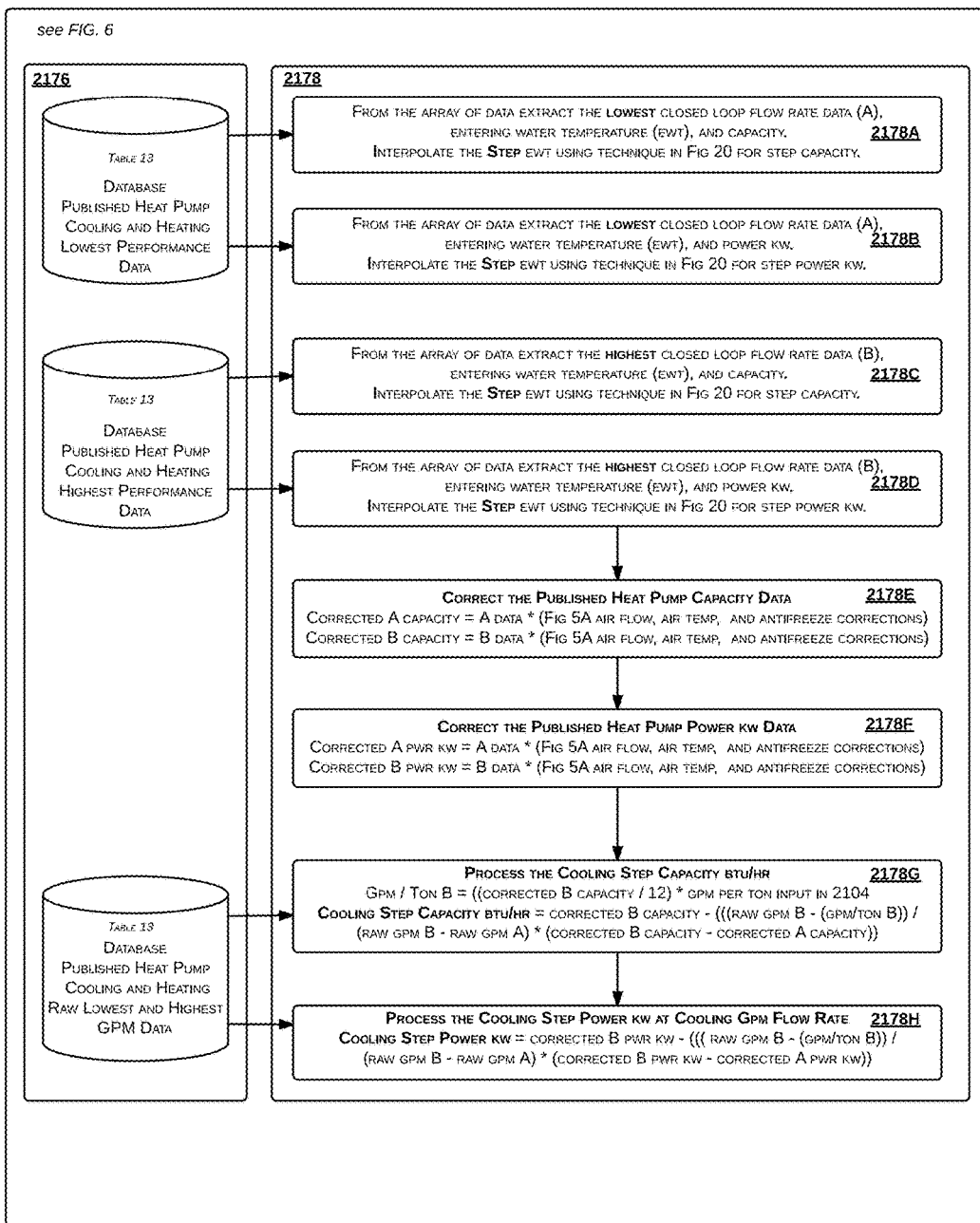
FIG. 6A illustrates one non-limiting embodiment of a flow chart for processing, standardizing, and correcting individual zone heat pump performance data in each step for the building zone thermal loads, further based on FIG. 6.

FIG. 6 illustrates a more detailed flow chart diagram of FIG. 1, further illustrating the process for calculating heat pump capacity and demand data at step 2178, and more specifically an iteration process for calculating, normalizing, standardizing, or correcting the heat pump performance data in each step for the building zone thermal loads based on the hourly building operating schedule data. The process flow illustrated in FIG. 6 follows a similar methodology as illustrated in FIGS. 5, 5A, and 5B, with the exception of the processing of the heat pump data for each iteration step for the hourly building operating schedule data and additional processing for variable capacity heat pumps. In addition, FIG. 6A illustrates a more detailed flow chart process for the embodiment illustrated in FIG. 6, wherein FIG. 6A will later be described in detail in the disclosure described herein.

Referring to FIG. 6, once the heat pump data has been processed, standardized, and corrected using the maximum load data (FIGS. 5, 5A, 5B), then at FIG. 6 the GHP application process will again determine which heat pump capacity was selected by the user, or received by the GHP application, and whether the received heat pump data is a single, dual, or variable speed. The process will retrieve corresponding heat pump data from database 2176. More specifically, if a single capacity heat pump is selected, then full capacity data will only be retrieved from database 2176, and the process proceed to step 2178, wherein the heat pump performance data is processed, corrected, and standardized for full capacity at each step for each hourly building operating schedule data for an individual zone. If a dual speed or dual capacity heat pump is selected, then full capacity and part capacity data are retrieved from database 2176 and the process proceeds to step 2178, wherein the heat pump performance data is processed, corrected, and standardized for part capacity at each step for each hourly building operating schedule data for an individual zone. More specifically, each iteration step is calculated and for each iteration step load (i.e. the zone BTU/hr) if the calculated step load value is less than the part capacity value, then the process will send the calculated step load value to the building zone module 2160 for the heat pump operating at part capacity. If the calculated step load value is greater than the party capacity, then the calculated step load value is sent to the building zone module 2160 for the heat pump operating and full capacity.

Still referring to FIG. 6, if a variable capacity heat pump is selected, then full capacity, nominal capacity, and minimum capacity data is retrieved from database 2176, and the process will then proceed to step 2178, wherein the full capacity, nominal capacity, and minimum capacity data is iterated, interpolated, and standardized. More specifically, the process can first interpolate/iterate the full and nominal heat pump capacity and power (kW) data. The process can then determine if the calculated step load value is greater than the nominal capacity value and send the heat pump data for full and nominal capacity to building zone module 2160 for each calculated step data for each hourly building operating schedule for the heat pump operating at full and nominal capacity. Further, the process can interpolate and iterate the nominal and minimum heat pump capacity and power (kW) data. The process can then determine if the calculated step load value is less than the interpolated nominal and minimum capacity value and send the heat pump data for nominal minimum capacity to building zone module 2160 for each calculated iteration step data for each hourly building operating schedule for the heat pump operating at nominal and minimum conditions.

Figure 7:
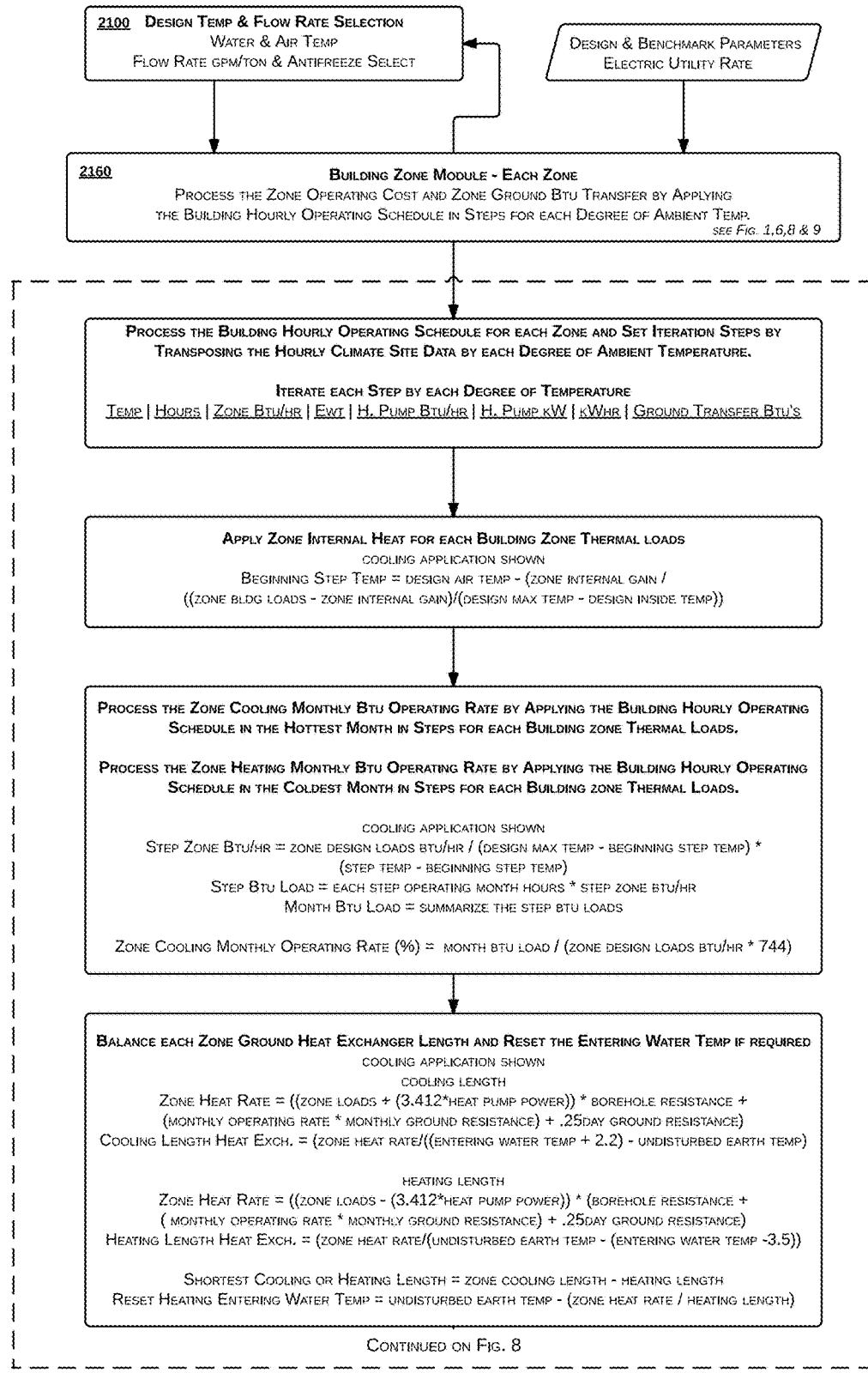
FIG. 7 illustrates a more detailed flow chart diagram of FIG. 1, further illustrating the process for calculating the zone monthly operating rate and process the building hourly operating schedule.

FIG. 7 illustrates a more detailed flow chart diagram of FIG. 1, further illustrating the process for calculating the zone monthly operating rate and processing the building hourly operating schedule. More specifically, the GHP application will process the building hourly operating schedule for each zone and set iteration steps by transposing the received hourly climate data by each degree of ambient temperature, wherein the process will iterate each step by each degree of temperature. Here, the process will start by applying internal heat gain for each building zone thermal loads (Beginning Step Temp=design air temp-(zone internal gain/((zone bldg loads-zone internal gain)/(design max temp-design inside temp))). Next, the process can process/calculate either or both the heating and cooling monthly BTU operating rate by applying the building hour operating schedule data for the hottest/warmest month (for cooling design/mode) and the coldest month (for heating design/mode) in steps for each zone of the building, or building zone thermal load, which in one embodiment for a cooling design can include: Step Zone Btu/hr=zone design loads btu/hr/(design max temp-beginning step temp)*(step temp-beginning step temp); Step Btu Load=each step operating month hours*step zone btu/hr; Month Btu Load=summarize the step btu loads; Zone Cooling Monthly Operating Rate (%)=month btu load/(zone design loads btu/hr*744).

Still referring to FIG. 7, the process can then proceed to balance each zone ground heat exchanger length and reset the entering water temperature if required. In one embodiment for a cooling design, the calculation can include: Zone Heat Rate=((zone loads+(3.412*heat pump power))*borehole resistance+(monthly operating rate*monthly ground resistance)+0.25 day ground resistance); Cooling Length Heat Exch.=(zone heat rate/((entering water temp+2.2)-undisturbed earth temp) heating length; Zone Heat Rate= ((zone loads-(3.412*heat pump power))*(borehole resistance+(monthly operating rate*monthly ground resistance)+0.25 day ground resistance); Heating Length Heat Exch.= (zone heat rate/(undisturbed earth temp-(entering water temp-3.5)); Shortest Cooling or Heating Length=zone cooling length-heating length; Reset Heating Entering Water Temp=undisturbed earth temp-(zone heat rate/heating length). The process continues on FIG. 8 further illustrating the process for calculating the zone monthly operating rate and processing the building hourly operating schedule, and BTUs transferred to and from the ground.

Figure 8:
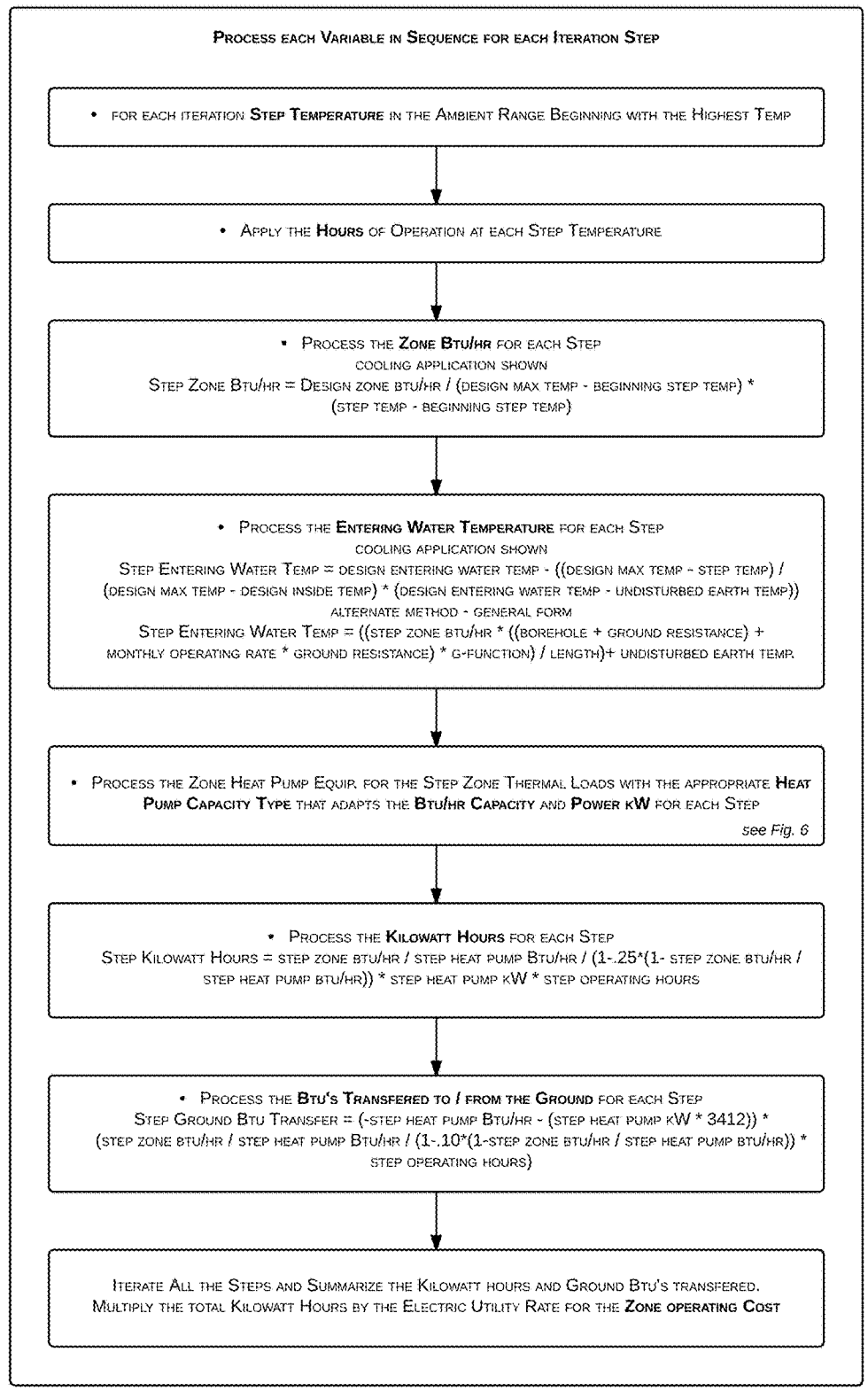
FIG. 8 illustrates a flow chart diagram continuation of FIG. 7, further illustrating the process for calculating the zone operation cost and BTUs transferred to and from the ground.

Referring now to FIG. 8, for each iteration step temperature in the ambient range beginning with the highest temperature, the process applies the hours of the operating schedule data at each step temperature. Next, the process will calculate the zone (BTU/hr) for each step, wherein in one embodiment for a cooling design can include: Step Zone Btu/hr=Design zone btu/hr/(design max temp-beginning step temp)*(step temp-beginning step temp). Next the process will calculate the entering water temperature for each step, wherein in one embodiment for a cooling design can include: Step Entering Water Temp=design entering water temp-((design max temp-step temp)/(design max temp-design inside temp)*(design entering water temp-undisturbed earth temp)); or an alternate method-general form including Step Entering Water Temp=((step zone btu/hr* ((borehole+ground resistance)+monthly operating rate*ground resistance)*g-function)/length)+undisturbed earth temp. Next, the process will calculate the zone heat pump equipment for the step zone thermal loads with the appropriate heat pump capacity type that adapts the BTU/hr capacity and Power (kW) for each step. Next, the process will calculate the kilowatt hours for each step, wherein in one embodiment for a cooling design can include: Step Kilowatt Hours=step zone btu/hr/step heat pump Btu/hr/(1- .25*(1-step zone btu/hr/step heat pump btu/hr))*step heat pump kW*step operating hours. The process will then proceed to calculate the BTUs transferred to and from the ground for each step, wherein in one embodiment for a cooling design can include: Step Ground Btu Transfer=(-step heat pump Btu/hr-(step heat pump kW*3412))*(step zone btu/hr/step heat pump Btu/hr/1-.10*(1-step zone btu/hr/step heat pump btu/hr))*step operating hours). Finally, the process will iterate all the steps and summarize the kilowatt hours and ground BTUs transferred to and from the ground and multiply the total kilowatt hours by the electric utility rate for the zone operating cost, wherein this data is sent to the simulation module/portal or simulation step 2240.

FIG. 9 illustrates one example scenario and output/simulation for calculated and simulated cooling operating costs for one zone and FIG. 9A for heating, both incorporating the operating hours scheduled within each discreet temperature increment for the building in a given year. More specifically, FIGS. 9 and 9A illustrate one scenario with sample data for one location with its corresponding climate data and having pre-defined building operating hours, building type, design temperatures and flow rate, borehole/pipe data, ground conditions, heat pump data, and thermal heating/cooling loads, among others. Further, this scenario illustrates simulated data for a non-hybrid cooling mode GHP design simulation. More specifically, the output includes the total operating zone operating cost and BTUs transferred to the ground for one year based on the received user inputted GHP design and calculated values with respect to FIGS. 1-8 and 20 and previously described processes within the disclosure described herein.

FIG. 10, illustrates one example scenario for calculated and simulated output for cooling operating costs for one zone for a GHP benchmark having no hybrid design, incorporating the hourly operating schedule within each discreet temperature increment for the building in a given year, wherein the GHP benchmark output data of FIG. 10 can be compared to the GHP design output of FIG. 9. Here, in one embodiment, the GHP benchmark output can be simulated using a different entering water temperature with respect to the GHP design entering water temperature. When comparing the output of FIG. 9 with FIG. 10, the GHP design total zone operating cost does not fluctuate much with respect to the GHP benchmark total zone operating cost, even though the entering water temperature for the GHP design is higher than the entering water temperature for the GHP benchmark. This illustrates that the GHP design simulation has about the same or substantially the same efficiency than the GHP benchmark having lower entering water temperature but with significant change in excess borehole pipe length for the GHP benchmark, further illustrating that a variation in enter water temperature does not have much of an effect on the GHP efficiency and in fact the GHP design will require much less borehole/piping length than the GHP benchmark (see FIG. 18), thus reducing the overall cost of the GHP design with respect to the GHP benchmark.

FIG. 11 illustrates one example scenario for calculated and simulated cooling operating costs for one zone for GHP design having a 20% hybrid design, incorporating the hourly building operating schedule data for each discreet temperature increment for the building in a given year. In particular, the output of FIG. 11 differs from that of FIG. 9, in that a percentage of the GHP design is hybrid. In this example, up to 20% of the load for the GHP system is transferred to a cooling tower. For example, once a pre-defined or pre-set threshold is met, such as temperature, zone BTU/hr, or enter water temperature, the GHP design can initiate the hybrid apparatus (in this case the cooling tower) to handle the excess load. In the example out of FIG. 11, the GHP design initiates the hybrid apparatus (cooling tower) when the ambient or outside temperature reaches 95 degrees Fahrenheit and the GHP design ground loop system has reached its maximum design load of 273,600 BTUs/hr for that zone, wherein the GHP heat pump system will continue to operate with the cooling tower handling the load over 273,600 BTUs/hr in each iteration step.

Figure 12:
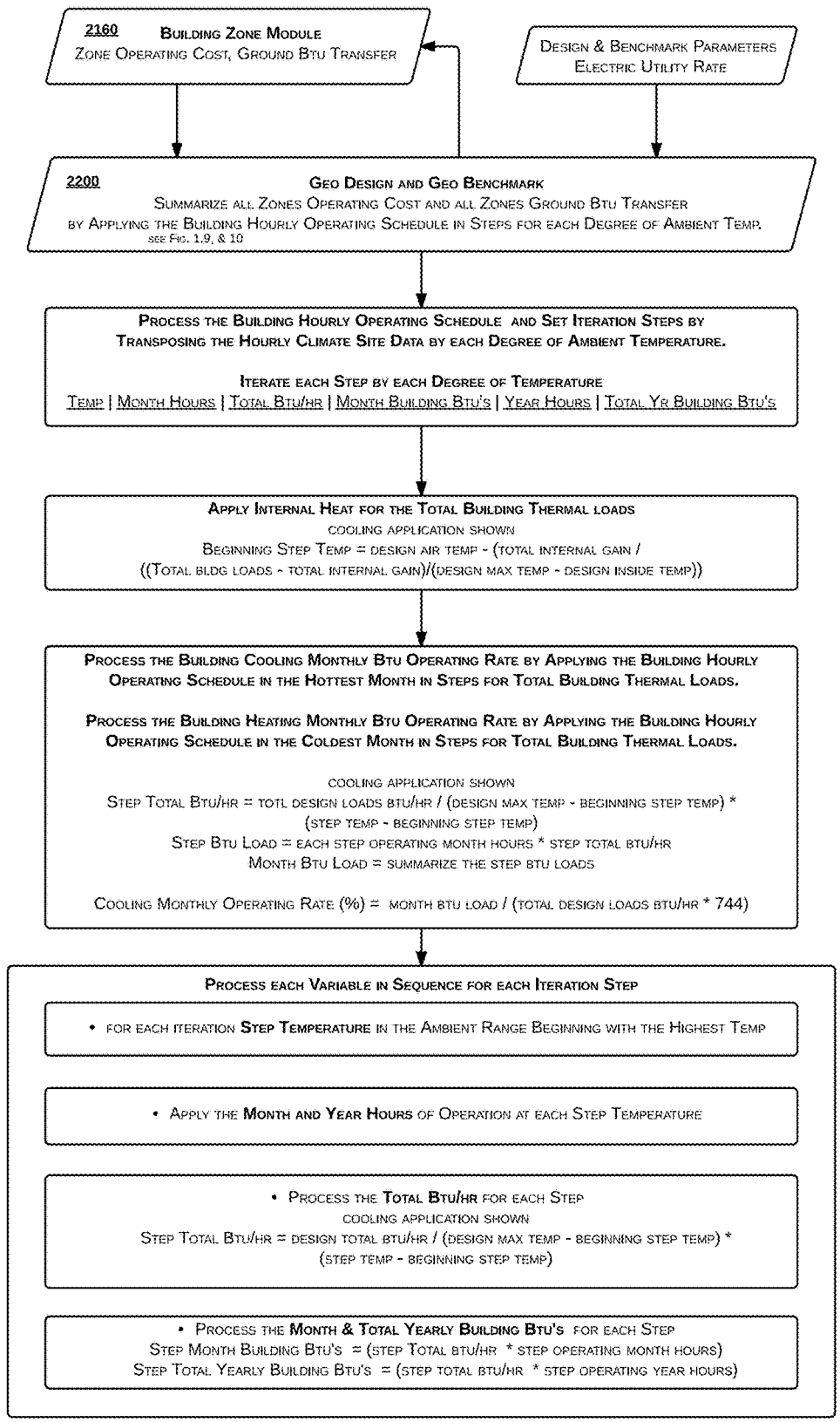
FIG. 12 further illustrates a flow chart diagram of the process for calculating the total building's monthly operating rate and process the building's hourly operating schedule for each iteration step.

FIG. 12 further illustrates the process for calculating the total building's monthly operating rate and process the building's hourly operating schedule for each iteration step. More specifically, FIG. 12 follows a similar process and methodology as FIG. 9 for the zones, whereas FIG. 12 illustrates a process for calculating the total or entire building's monthly operate based on the calculated, simulated, and outputted GHP design and the total year building BTUs.

FIG. 13 illustrates one example scenario of output for a total building's calculated and simulated cooling total building energy requirements (BTUs) for a GHP design having no hybrid design, incorporating the hourly operating schedule data within each discreet temperature increment for the building in a given month and in a given year.

Figure 14:
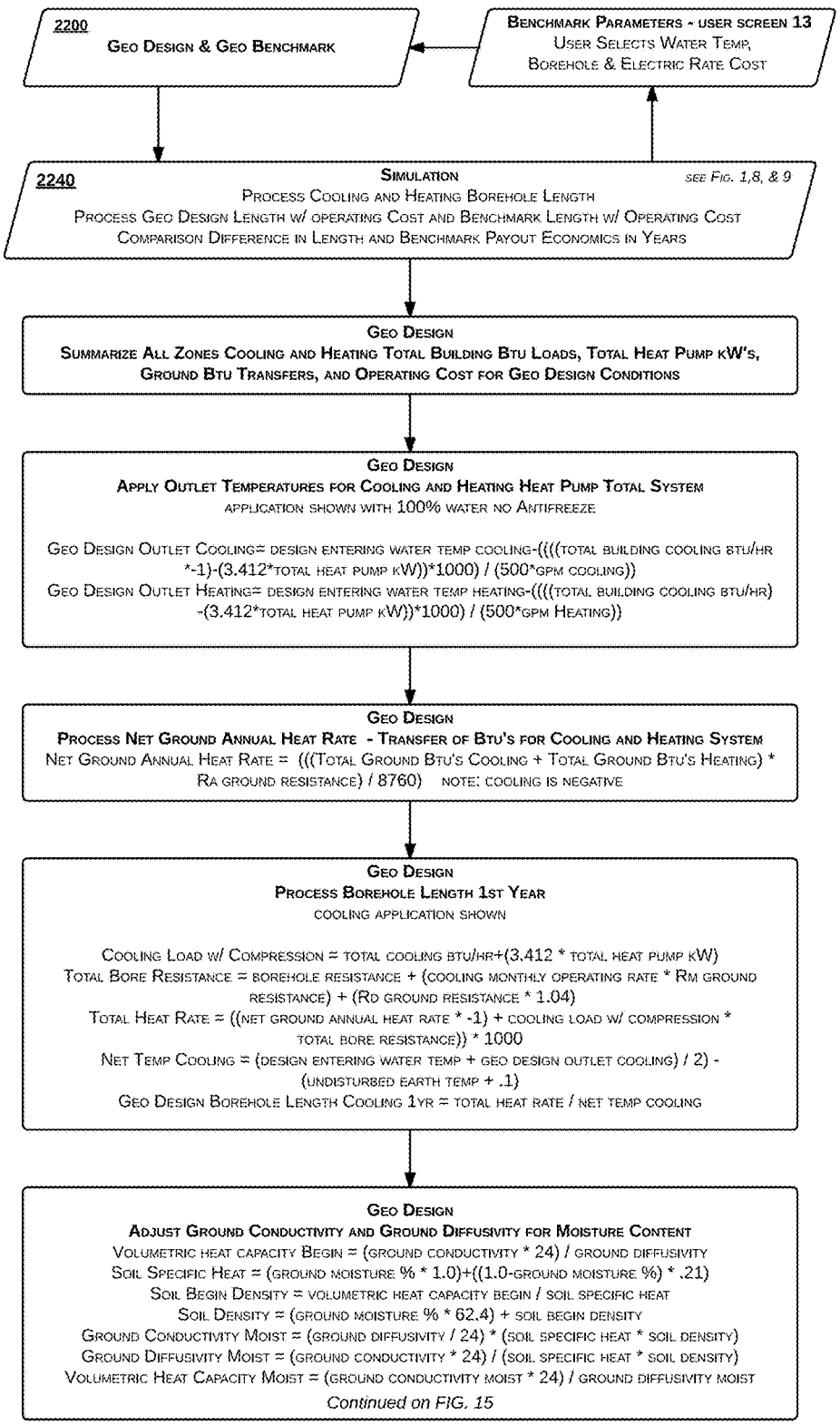
Figure 16:
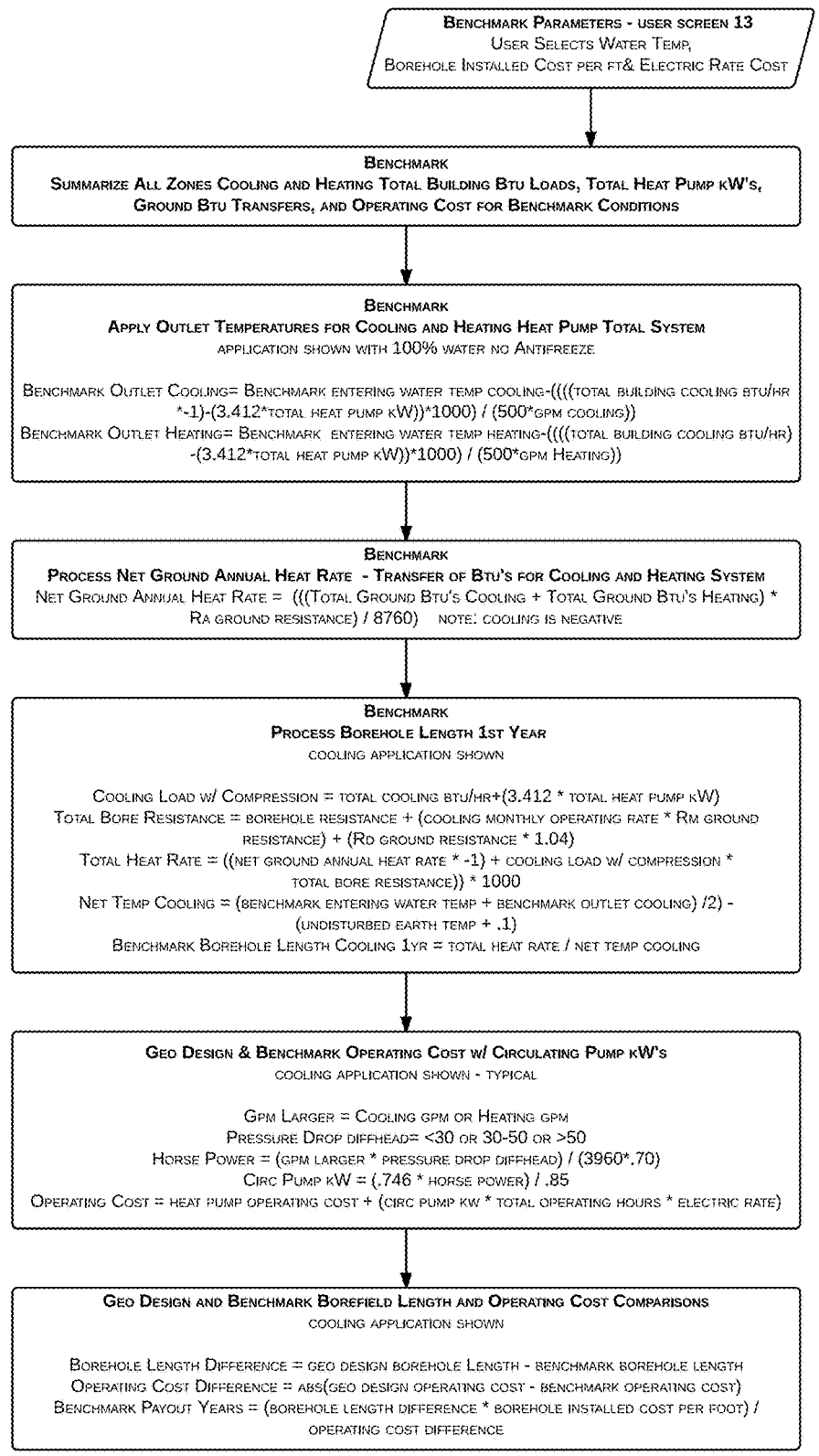
FIG. 16 illustrates one non-limiting embodiment of a detailed flow chart for processing and calculating a GHP benchmark simulation and modeling.

FIGS. 14, 15, and 16 illustrate detailed flow charts for processing and calculating the GHP design and benchmark of step 2200 for simulation and modeling. More specifically, FIGS. 14 and 15 are for a GHP design and FIG. 16 is for a GHP benchmark design. Referring now to FIG. 14, one embodiment for simulating at step 2240 additional parameters for the GHP design, such as borehole lengths and payouts, among others, can begin by applying and calculating the heat pump's outlet temperatures for a total system heat pump cooling and heating. Here, in one embodiment for a design with 100% water and no antifreeze the calculation can include: Geo Design Outlet Cooling=design entering water temp cooling−((((total building cooling btu/hr*−1)−(3.412*total heat pump kW))*1000)/(500*gpm cooling)); Geo Design Outlet Heating=design entering water temp heating−((((total building cooling btu/hr)−(3.412*total heat pump kW))*1000)/(500*gpm Heating)). Next, the process can include calculating a borehole length for the first year. In one embodiment for a cooling design the calculation can include: Cooling Load w/Compression=total cooling btu/hr+(3.412*total heat pump kW); Total Bore Resistance=borehole resistance+(cooling monthly operating rate*Rm ground resistance)+(Rd ground resistance*1.04); Total Heat Rate=((net ground annual heat rate*−1)+cooling load w/compression*total bore resistance))*1000; Net Temp Cooling=(design entering water temp+geo design outlet cooling)/2)−(undisturbed earth temp+0.1); Geo Design Borehole Length Cooling 1 yr=total heat rate/net temp cooling. Next, the process will calculate adjusting the ground conductivity and ground diffusivity for moisture content. In one embodiment, the calculation can include: Volumetric heat capacity Begin=(ground conductivity*24)/ground diffusivity; Soil Specific Heat=(ground moisture %*1.0)+((1.0−ground moisture %)*0.21); Soil Begin Density=volumetric heat capacity begin/soil specific heat; Soil Density=(ground moisture %*62.4)+soil begin density; Ground Conductivity Moist=(ground diffusivity/24)*(soil specific heat*soil density); Ground Diffusivity Moist=(ground conductivity*24)/(soil specific heat*soil density); Volumetric Heat Capacity Moist=(ground conductivity moist*24)/ground diffusivity moist. The process will then continue on FIG. 15.

Referring to FIG. 15, the process will continue from FIG. 14 by calculating the long term temperature ground effect. In one embodiment, this calculation can include: Net Ground Btu/hr Annual=(Total Ground Btu's Cooling+Total Ground Btu's Heating)/8760*1000; Boreholes_Each_fit=Design Borehole Length 1 yr/Boreholes_Each; Top_Exposure=1−((Borehole_Each_ft−15)/Borehole_Each_ft); Borefield Layout Exposure=(grid across*2)+(grid down*2); Across Exposure=(grid down)*(grid across+1); Down Exposure=(grid across)*(grid down+1); All_Exposures=((Borefield Layout Exposure/(Across Exposure+Down Exposure))−Top_Exposure); Percent Interference=1−All_Exposures. Next, the process will calculate the long term thermal interference between adjacent boreholes (first step). In one embodiment, this calculation can include: Relate Diffusivity, Time, and Distance to the Borehole−Three radii of earth 5 ft thick; Radiusring1=Distance Between Boreholes/2; Radiusring2=radius1+5Radiusring3=radius2+5; Radiusring4=Radius3+5; Ringsq1=(radiusring2*radiusring2)−(radiusring1*radiusring1); Ringsq2=(radiusring3*radiusring3)−(radiusring2*radiusring2); Ringsq2=(radiusring4*radiusring4)−(radiusring3*radiusring3); Radius1avg=(radiusring1+radiusring2)/2; Radius2avg=(radiusring2+radiusring3)/2; Radius3avg=(radiusring3+radiusring4)/2. Next the process will calculate a temperature delta for each radius or radii (second step), wherein the calculation can be an integral expression. In one embodiment, which is typical for each radii, this calculation can include: Xfunction=Radius1avg/(2*sqrt(ground diffusivity moist*ground forecast years*365)); lexpression=(2.303*log 10(1/xfunction)+(power(xfunction,2)/2)−(power(xfunction,4)/8)−0.2886; Delta Temp Ring1=(net ground btu/hr annual*lexpression)/(2*3.14159*ground conductivity moist*geo design borehole length 1 yr).

Still referring to FIG. 15, the process will then calculate heat storage for each hollow cylinder (third step). In one embodiment, this calculation can include: Heat Storage Ring1=(3.14159*ringsq1)*delta temp ring1; Heat Storage Ring2=(3.14159*ringsq2)*delta temp ring2; Heat Storage Ring3=(3.14159*ringsq3)*delta temp ring3; Heat Storage Total=heat storage ring1+heat storage ring2*heat storage ring3; Temp Penalty=(heat storage total/(distance between borehole^2))*Percent Interference*−1. Next, the process will calculate and model/simulate the borehole length for heating and cooling designs based on a 10 year model. In one embodiment for a cooling design, this calculation can include: Cooling Load w/Compression=total cooling btu/hr+(3.412*total heat pump kW); Total Bore Resistance=borehole resistance+(cooling monthly operating rate*Rm ground resistance)+(Rd ground resistance*1.04); Total Heat Rate=((net ground annual heat rate*−1)+cooling load w/compression*total bore resistance))*1000; Net Temp Cooling=(design entering water temp+geo design outlet cooling)/2)−(undisturbed earth temp+temp penalty); Geo Design Borehole Length Cooling 10 yr=total heat rate/net temp cooling. However, it is contemplated within the scope of the disclosure described herein that any number of years may also be used for simulating and calculated the borehole length, such as from 1-50 years.

FIG. 16 illustrates a similar process flow methodology for calculating and simulating a GHP benchmark using benchmark parameters, such as benchmark entering water temperature. More specifically, the process can begin by applying and calculating outlet temperatures for heating and cooling for the total heat pump system. In one embodiment for a benchmark with 100% water and no anti-freeze, this calculation can include: Benchmark Outlet Cooling=Benchmark entering water temp cooling−((((total building cooling btu/hr*−1)−(3.412*total heat pump kW))*1000)/(500*gpm cooling)); Benchmark Outlet Heating=Benchmark entering water temp heating−((((total building cooling btu/hr)−(3.412*total heat pump kW))*1000)/(500*gpm Heating)). Next, the process can calculate ground annual heat rate, which can be based on the transfer of BTUs for a cooling and heating GHP system. In one embodiment, the calculation can include: Net Ground Annual Heat Rate=(((Total Ground Btu's Cooling+Total Ground Btu's Heating)*Ra ground resistance)/8760). Here, it is noted that the total ground BTU for cooling is a negative value. Next, the process can then calculate the borehole length for a first year model or simulation of the GHP benchmark. In one embodiment for a cooling benchmark design, this calculation can include: Cooling Load w/Compression=total cooling btu/hr+(3.412*total heat pump kW); Total Bore Resistance=borehole resistance+(cooling monthly operating rate*Rm ground resistance)+(Rd ground resistance*1.04); Total Heat Rate=((net ground annual heat rate*−1)+cooling load w/compression*total bore resistance))*1000; Net Temp Cooling=(benchmark entering water temp+benchmark outlet cooling)/2)−(undisturbed earth temp+0.1); Benchmark Borehole Length Cooling 1 yr=total heat rate/net temp cooling.

Still referring to FIG. 16, the process will finally then calculate both a GHP design and GHP benchmark operating cost with one or more circulating pump power (kW). In one embodiment for a cooling design and benchmark, this calculation can include: Borehole Length Difference=geo design borehole Length−benchmark borehole length; Operating Cost Difference=abs(geo design operating cost−benchmark operating cost); Benchmark Payout Years=(borehole length difference*borehole installed cost per foot)/operating cost difference.

FIG. 17 illustrates a detailed flow chart for processing and calculating EER and COP data and GHP hybrid design of step 2220. In particular, in one embodiment, the EER (Energy Efficiency Ratio) and COP (Coefficient of Performance) data calculation can include the following: Annual EER=total year building cooling btu's/(total building cooling kw hours+(pump kw/hr*total hours cooling)); Annual COP=total year building heating btu's/(3.412*(total building heating kw hours+(pump kw/hr*total hours heating))).

Still referring to FIG. 17, a process for modeling and simulating the GHP design using a hybrid design will now be discussed. The process can begin by evaluating the hybrid percentage inputted by the user and received by the GHP application, such as from 1%-99% of the GHP system being hybrid. Next, the process will calculate the heating and cooling BTU/hr for each zone by taking into account the hybrid percentage (Geo Zone Btu/hr=total zone btu/hr*(1.0−hybrid percent)). Next, within building zone module 2160, the process will calculate the building operating hours schedule data in steps for each zone's thermal loads at each degree of outside ambient temperature for the received climate and site location data. Here, for each iteration step, the process is the same as discussed with respect to FIGS. 6, 7, 8, and results from the output of FIG. 11. Here, each iteration step comprises determining if a step zone load BTU/hr is greater than a Geo or GHP (ground loop) design zone load BTU/hr (Step Zone Btu/hr>Geo Zone Btu/hr) and if the false then the step zone load BTU/hr calculated will be used. If true, then Zone Btu/hr is set to equal Geo Zone Btu/hr and Hybrid Hours is set to equal step hours.

Still referring to FIG. 17, a hybrid cooling capacity and hybrid heating capacity are calculated. For hybrid cooling capacity, in one embodiment, this calculation can include: Cooling Tower Capacity=(total building cooling Load−total geo load)*1.25; or a Fluid Cooler Capacity=(total building cooling Load−total geo load); Cooling gpm=(hybrid cooling capacity*1000)/(500*(outlet temp−inlet Temp)); Design Wet Bulb Temp=from table 1; operating hours=summarize hybrid hours. For hybrid heating capacity, in one embodiment, this calculation can include: Hybrid Heating Capacity=(total building Heating load−total geo load); Water Flow Rate=heating gpm; operating hours=summarize hybrid hours. Once the hybrid data is calculated for each degree of ambient temperature according to the building operating schedule, then the data can be sent to the simulation module 2240 for simulating/modeling the GHP design with a hybrid system. As an example, FIG. 11 illustrates one scenario of output data for a GHP design with a hybrid system (20% hybrid). FIG. 19 also illustrates an simulation/model output and portal for GHP design with a hybrid system (25% hybrid).

FIG. 18 illustrates one embodiment for a user interface display of detailed simulation and model for one example scenario of a GHP design for both cooling and heating having no hybrid design and including benchmark data. More specifically, the GHP design simulation and model can include cooling and heating data for parameters and properties including but not limited to: borehole length at 10 years; number of boreholes required or recommended; length of the boreholes; long term ground effect; borehole length at one (1) year; design heat pump inlet and outlet water temperatures; total building BTU loads; GHP design Building BTU load; GHP design heat pump capacity; GHP design peak demand; GHP design flow rate; GHP design annual EER and COR; GHP design annual electric operating cost; GHP benchmark heat pump entering water inlet and outlet temperatures; how much GHP benchmark exceeds GHP design based on the extra piping required for the GHP benchmark; excess feet payback period; ground conditions; undisturbed earth temperature; ground conductivity data; ground diffusivity data; pipe diameter; borehole diameter; grout conductivity; borehole resistance; building hourly operating schedule data for the year; ground moisture data; distance or spacing between boreholes; grid layout across borefield (rows); and grid down (columns). For a hybrid GHP design simulation, as shown in FIG. 19, the simulation model output can additionally include hybrid relevant information including but not limited to: cooling tower capacity; water flow rate; design wet bulb 0.4%; and operating hybrid system operating hours.

Figure 20:
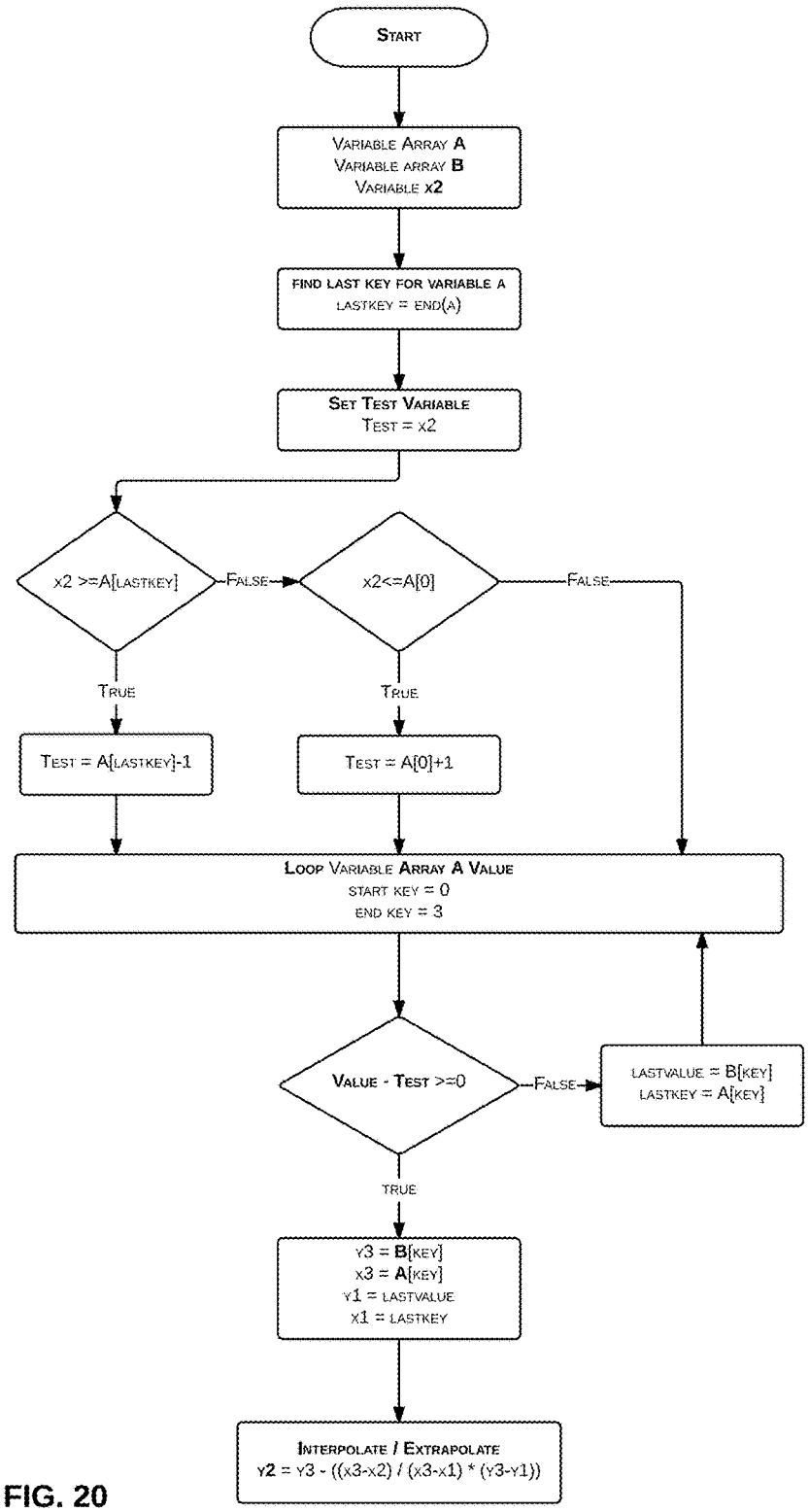
FIG. 20 illustrates one non-limiting embodiment of a flow chart for a process of extracting array elements and processing universal interpolation and extrapolation data.

Referring back to FIGS. 5A, 5B, and 6A, which can be read in relation to FIG. 20, will be described in more detail. More specifically, FIG. 20 illustrates a process flow for the interpolation and extrapolation of data with respect to the discussion of FIGS. 5, 5A, 5B, 6, and 6B. Further, FIGS. 20A, 20B, and 20C each illustrate example scenario flowcharts and non-limiting embodiment for the interpolation and extrapolation method of FIG. 20.

Referring now to FIG. 5A, which is a further illustration of FIG. 5 for processing heat pump correction data for each zone, within step 2174, the process can at step 2174A retrieve from database 2176 a table array of data (such as Table 14) of airflow correction data and extract the adjacent elements by heat pump model CFM and capacity and interpolate the CFM using the process in FIG. 20 for capacity air flow correction. At step 2174B, the process can retrieve from database 2176 a table array of data (such as Table 14) of airflow correction data and extract the adjacent elements by heat pump model CFM and kW and interpolate the CFM using the process in FIG. 20 for power (kW) air flow correction. At step 2174C, the process can retrieve from database 2176 a table array of data (such as Table 15) of air temperature correction data and extract the adjacent elements by entering air temp and capacity and interpolate the air temp using the process in FIG. 20 for capacity air temp correction. At step 2174D, the process can then retrieve from database 2176 a table array of data (such as Table 15) of air temperature correction data and extract the adjacent elements by entering air temp and power (kW) and interpolate the air temp using the process in FIG. 20 for power (kW) air temp correction. At step 2174E, the process can then retrieve from database 2176 a table array of data (such as Table 16) of freeze point percent antifreeze data and extract the adjacent elements for type of antifreeze by percent antifreeze from freeze point and interpolate the freeze point using the process in FIG. 20 for percent antifreeze. At step 2174F, the process can then retrieve from database 2176 a table array of data (such as Table 17) of antifreeze correction data and extract the adjacent elements by percent antifreeze and capacity and interpolate the percent antifreeze using the process in FIG. 20 for capacity antifreeze. At step 2174G, the process can then retrieve from database 2176 a table array of data (such as Table 17) of antifreeze correction data and extract the adjacent elements by percent antifreeze and power (kW) and interpolate percent antifreeze using the process in FIG. 20 for power (kW) and antifreeze correction.

Referring now to FIG. 5B, which is a further illustration of FIG. 5 for processing heat pump performance data for maximum thermal loads for each and standardizing the flow rate in GPM/ton, for a cooling GHP design. Here, within step 2174, at step 2174H, the process can retrieve from database 2176 a table array of data (such as from Table 13) of lowest performance data and extract the lowest closed loop flow rate data (A) entering water temperature (EWT), and capacity and interpolate the design EWT using the methodology of FIG. 20 for design capacity. At step 2174I, the process can retrieve from database 2176 a table array of data (such as from Table 13) of lowest performance data and extract the lowest closed loop flow rate data (A), entering water temperature (EWT), and power (kW) and interpolate the design EWT using the methodology technique of FIG. 20 for design power (kW). At step 2174J, the process can then retrieve from database 2176 a table array of data (such as Table 13) of highest performance data and extract the highest closed loop flow rate data (B) entering water temperature (EWT) and capacity and interpolate the design EWT using the methodology of FIG. 20 for design capacity. At step 2174K, the process can then retrieve from database 2176 a table array of data (such as from Table 13) of highest performance data and extract the highest closed loop flow rate data (B) entering water temperature (EWT) and power (kW) and interpolate the design EWT using the methodology of FIG. 20 for design power (kW).

Still referring to FIG. 5B, based on the prior calculated and interpolated data, the process will then correct the published heat pump capacity and power data. More specifically, at step 2174L, the process will correct and standardize the published heat pump capacity data using in one embodiment the following calculation: Corrected A capacity=A data*(FIG. 5A air flow, air temp, and antifreeze corrections); Corrected B capacity=B data*(FIG. 5A air flow, air temp, and antifreeze corrections). At step 2174M, the process will then correct and standardize the published heat pump power (kW) data using in one embodiment the following calculation: Corrected A pwr kw=A data*(FIG. 5A air flow, air temp, and antifreeze corrections); Corrected B pwr kw=B data*(FIG. 5A air flow, air temp, and antifreeze corrections).

Still referring to FIG. 5B, at step 2174N, the process can then retrieve from database 2176 raw lowest and highest GPM data and then calculate or standardize cooling GPM flow rate and the cooling capacity BTU/hr data using in one embodiment the following calculation: Gpm/Ton B=(corrected B capacity/12)*gpm per ton input in step 2104; Cooling Capacity btu/hr=corrected B capacity−(((raw gpm B−(gpm/ton B))/(raw gpm B−raw gpm A)*(corrected B capacity−corrected A capacity)); Cooling Gpm Flow rate= (cooling capacity/12)*gpm per ton input in step 2104. Next, the process can calculate the cooling power (kW). At step 2174O, the process can calculate the cooling power (kW) at the calculated cooling GPM flow rate using in one embodiment the following calculation: cooling power (kW)=corrected B pwr kw−(((raw gpm B−(gpm/ton B))/(raw gpm B−raw gpm A)*(corrected B pwr kw−corrected A pwr kw)).

FIG. 6A illustrates one embodiment of a flow chart for processing and standardizing individual zone heat pump performance data in each step for the building zone thermal loads, further based on FIG. 6. More specifically, within step 2178, at step 2178A, the process can retrieve from database 2176 a table array of data (such as Table 13) of the lowest performance data and extract the lowest closed loop flow rate data (A) by entering water temperature (EWT) and capacity and interpolate the step EWT using the methodology of FIG. 20 for step capacity. At step 2178B, the process can retrieve from database 2176 a table array of data (such as Table 13) of the lowest performance data and extract the lowest closed loop flow rate data (A) by entering water temperature (EWT) and power (kW) and interpolate the step EWT using the methodology of FIG. 20 for step power (kW). At step 2174C, the process can then retrieve from database 2176 a table array of data (such as Table 13) of the highest performance data and extract the highest closed loop flow rate data (B) by entering water temperature (EWT) and capacity and interpolate the step EWT using the methodology of FIG. 20 for step capacity. At step 2174D, the process can then retrieve from database 2176 a table array of data (such as Table 13) of the highest performance data and extract the highest closed loop flow rate data (B) by entering water temperature (EWT) and step power (kW) and interpolate the step EWT using the methodology of FIG. 20 for step power (kW).

Still referring to FIG. 6A, based on the prior calculated and interpolated data, the process will then correct the published heat pump capacity and power data. More specifically, at step 2178E, the process will correct and standardize the published heat pump capacity data using in one embodiment the following calculation: Corrected A capacity=A data*(FIG. 5A air flow, air temp, and antifreeze corrections)Corrected B capacity=B data*(FIG. 5A air flow, air temp, and antifreeze corrections). At step 2178F, the process will then correct and standardize the published heat pump power (kW) data using in one embodiment the following calculation: Corrected A pwr kw=A data*(FIG. 5A air flow, air temp, and antifreeze corrections); Corrected B pwr kw=B data*(FIG. 5A air flow, air temp, and antifreeze corrections).

Still referring to FIG. 6A, the process can then retrieve from database 2176 the raw lowest and highest GPM data for calculating the cooling step capacity for BTU/hr and cooling step power (kW) at cooling flow rate (GPM). More specifically, at step 2178G, the process can calculate the cooling step capacity for BTU/hr using in one embodiment the following calculation: Gpm/Ton B=((corrected B capacity/12)*gpm per ton input in 2104; Cooling Step Capacity btu/hr=corrected B capacity-(((raw gpm B-(gpm/ton B))/(raw gpm B-raw gpm A)*(corrected B capacity-corrected A capacity)). At step 2178H, the process calculate the cooling step power (kW) at cooling flow rate (GPM) using in one embodiment the following calculation: Cooling Step Power kw=corrected B pwr kw-(((raw gpm B-(gpm/ton B))/(raw gpm B-raw gpm A)*(corrected B pwr kw-corrected A pwr kw)).

Figure 20A:
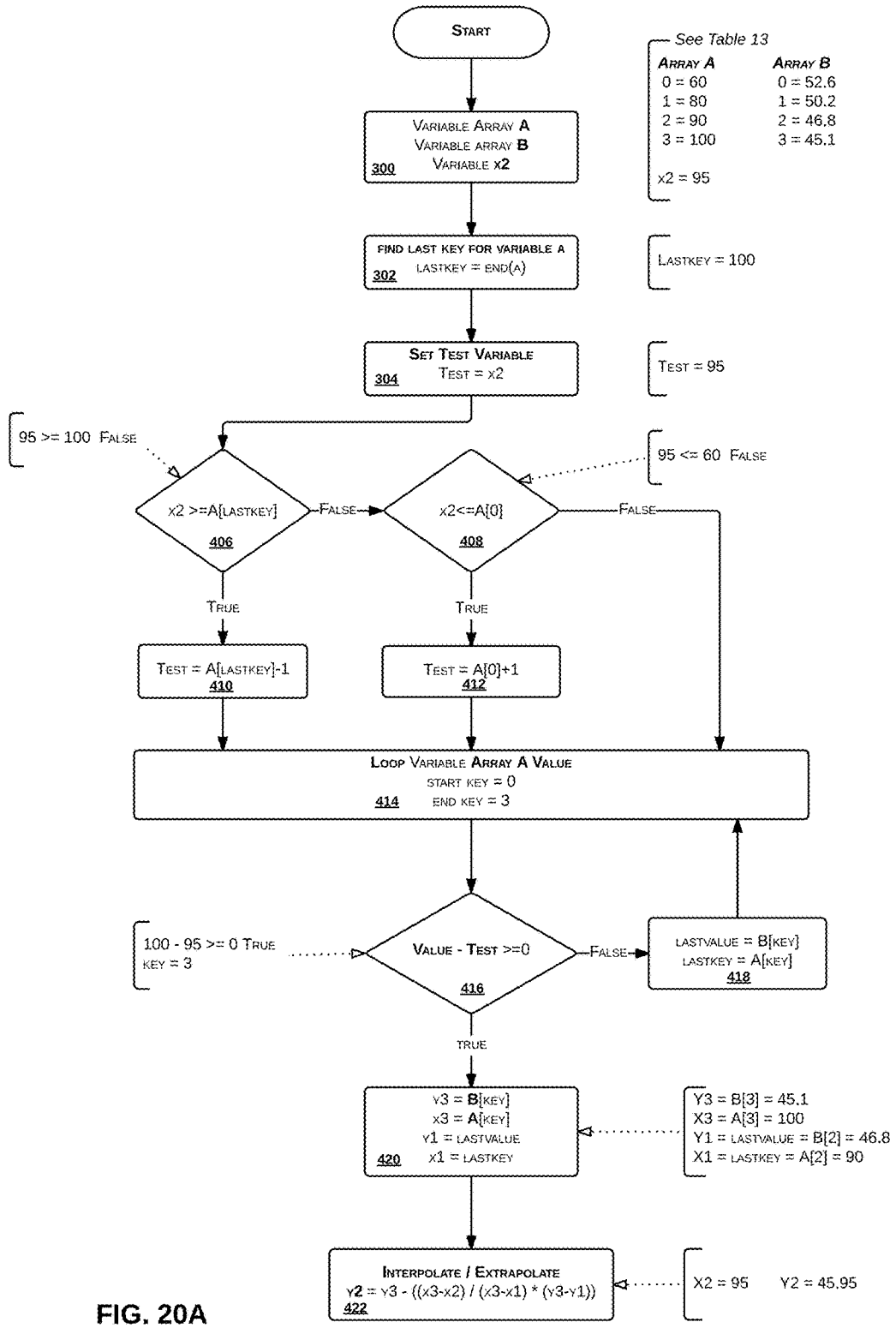
FIG. 20A illustrates one example scenario flow chart and non-limiting embodiment for the interpolation, iteration, or extrapolation method of FIG. 20.
Figure 20B:
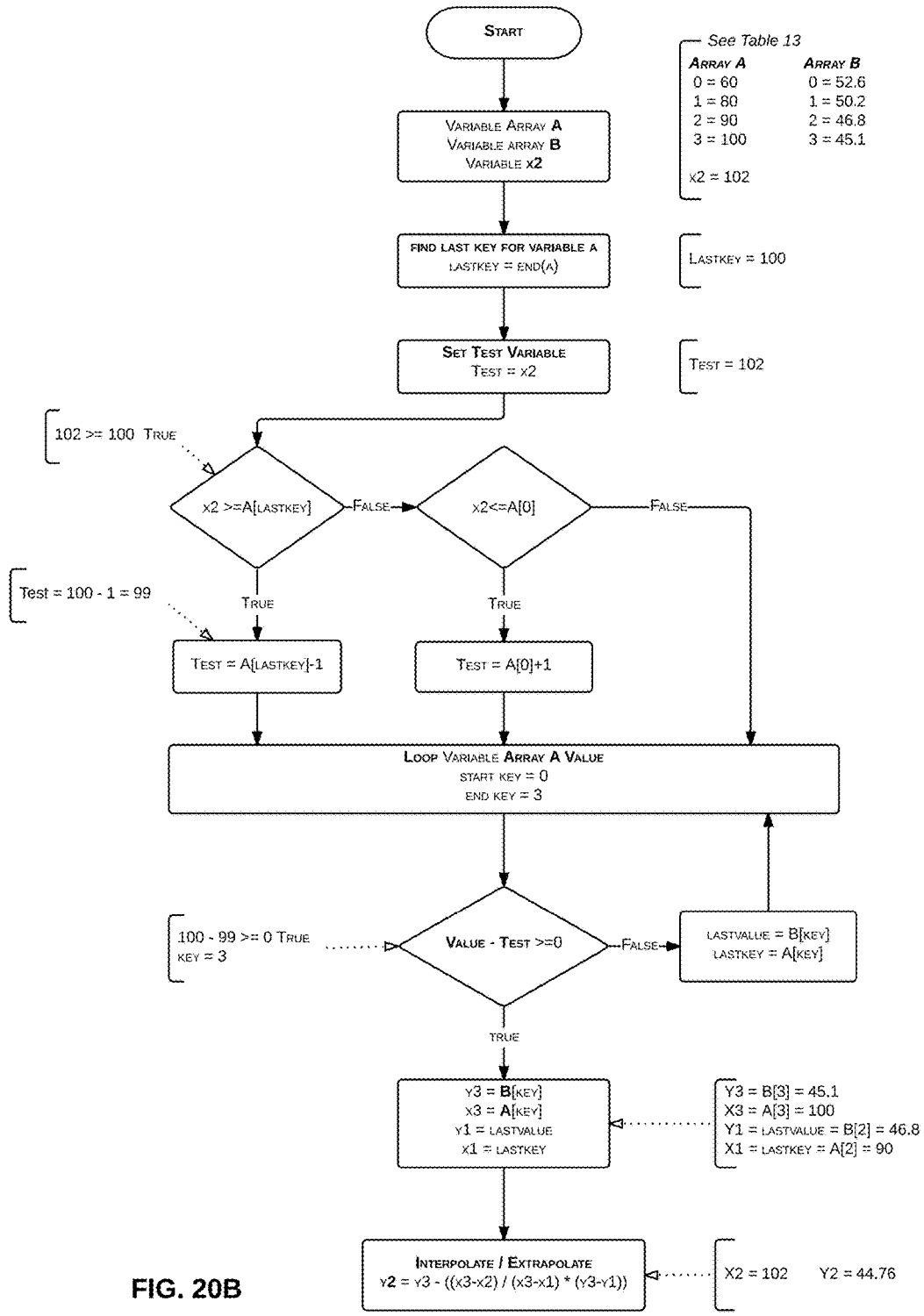
FIG. 20B illustrates another example scenario flowchart and non-limiting embodiment for the interpolation, iteration, or extrapolation method of FIG. 20.
Figure 20C:
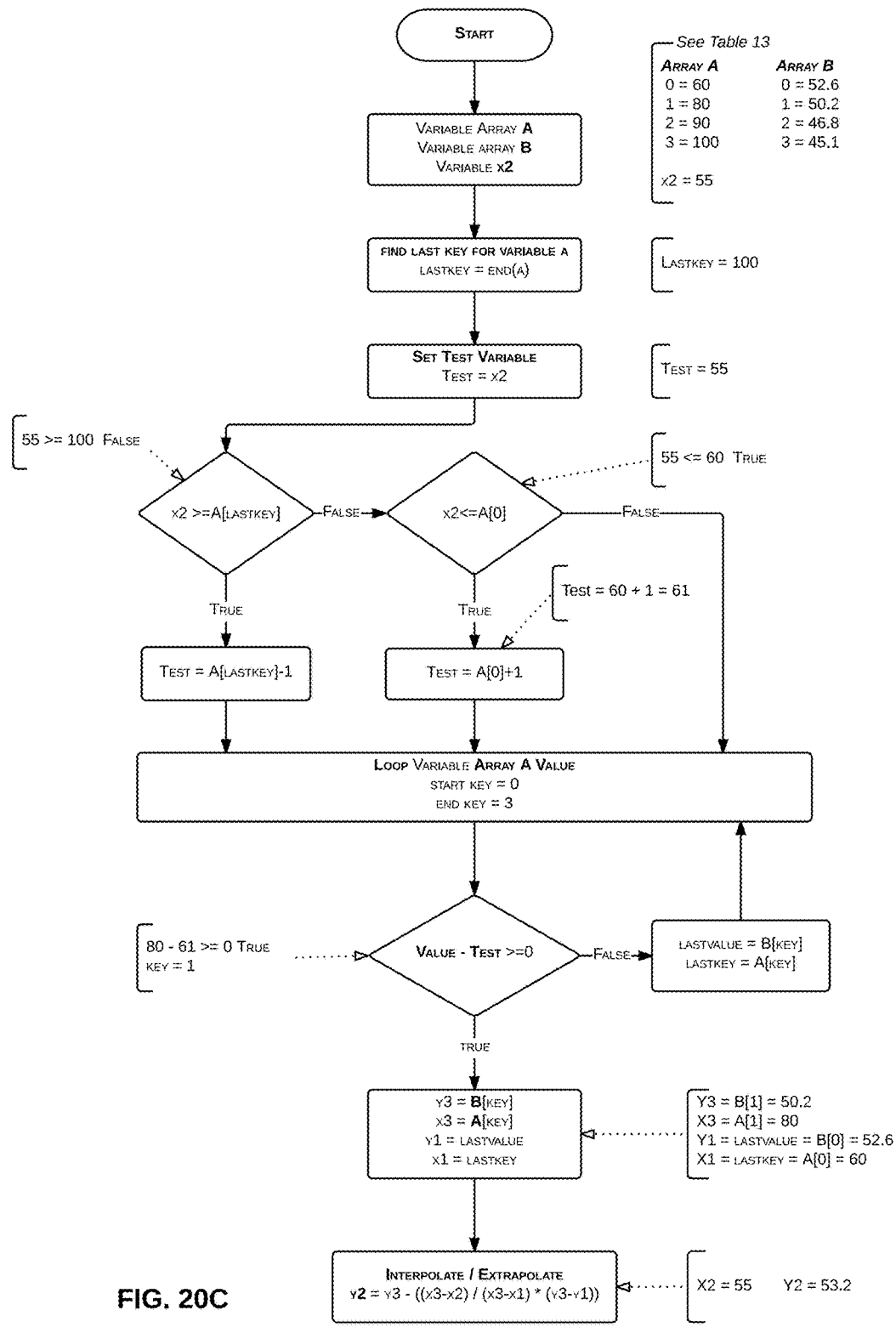
FIG. 20C illustrates another example scenario flowchart and non-limiting embodiment for the interpolation, iteration, or extrapolation method of FIG. 20.
Figure 21:
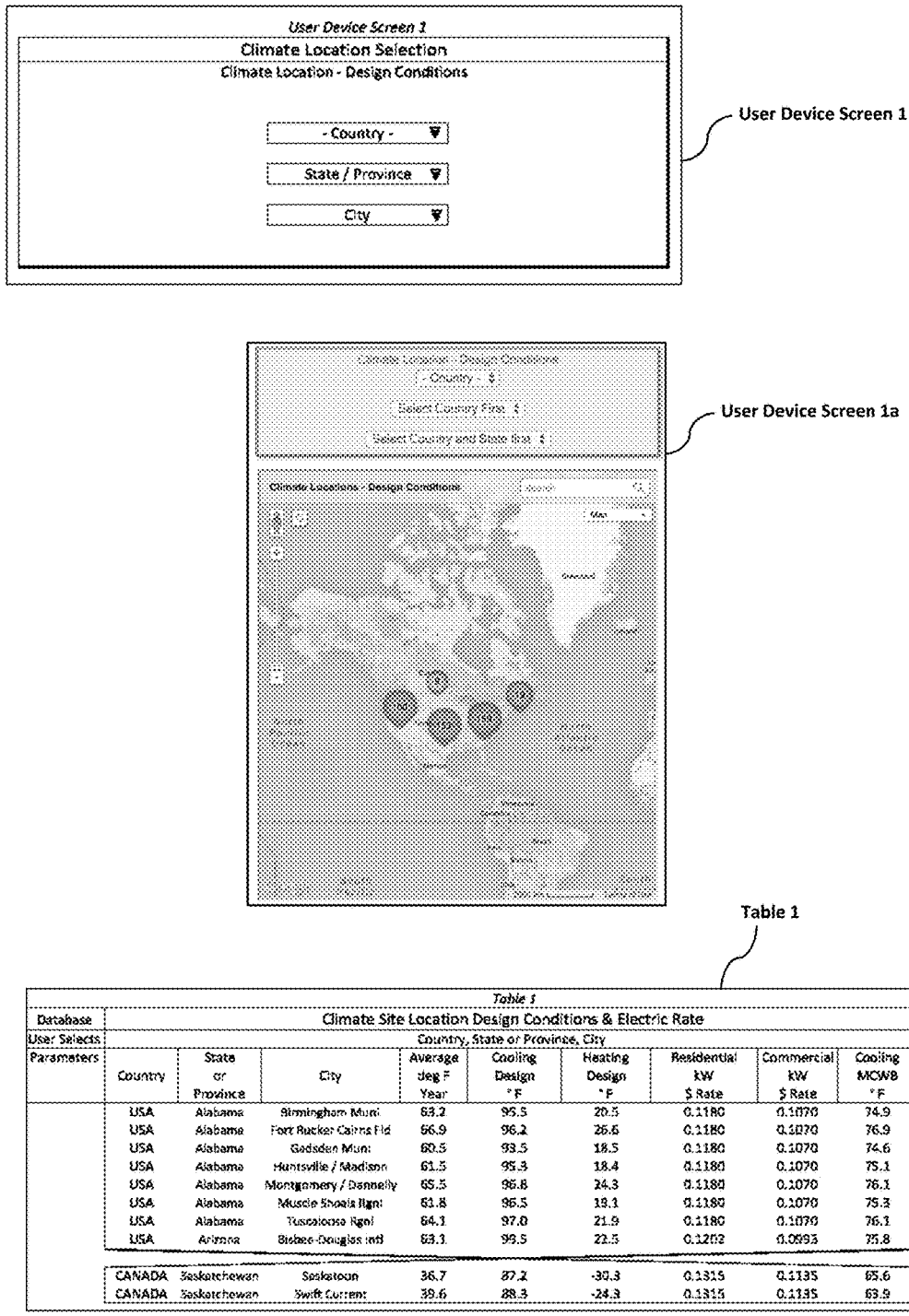
FIG. 21 illustrates one non-limiting embodiment of a user interface device display screen 1, another non-limiting embodiment of user interface device display screen 1*a*, and one non-limiting embodiment of sample data within a Table 1.

Referring now to FIGS. 20, 20A, 20B, and 20C, which illustrate several embodiments for a process of extracting array elements and processing universal interpolation, iteration, extrapolation data, a description will be provided for one methodology with respect to FIG. 20A, which uses sample exemplary data from Table 13. More specifically, the iteration process can begin at step 300, wherein data from Table 13 can be used as an example. Here, the GHP application is attempting to solve for a variable x2, wherein the x2 can be GHP design entering or inlet water temperature (see FIG. 1, step 2100). Further, variable Array A and Array B can be obtained from a table, such as Table 13, wherein in this embodiment Array A can correspond to manufacturer provided heat pump entering water temperature (EWT) and array B can correspond to manufacturer provided heat pump capacity data for each EWT from array A. At step 302, the process will find the last key for variable A, and set the LASTKEY to equal END(A). At step 304, the process will then set a "Test" variable to equal to x2. At step 306, the process will then determine if x2 is greater than or equal to variable A[LASTKEY], and if false, then the process proceeds to step 408. However, if at step 306 the decision is true, then the process will set at step 410 for Test to equal to "A[LASTKEY]-1". Referring back to step 408, if the decision is true, then the process will set at step 412 for Test to equal to "A[0]+1". Still referring to step 408, if the decision is false, then the process will move to step 414. In addition, steps 410 and 412 also proceed to step 414.

Still referring to FIG. 20A, at step 414, the process will loop the variable Array A Value from start key to end key (start key=0; end key=3). At step 416, the process will then determine if the Value from step 414 subtracted from Test is greater than or equal to zero. If false, the process will at step 418 set LASTVALUE=B[KEY] and LASTKEY=A[KEY]. However if the decision at step 416 is true, then at step 420, the process will set y3=B[KEY], x3=A[KEY], y1=LASTVALUE, and x1=LASTKEY. Finally, at step 422, the process will solve, interpolate, or extrapolate the value for y2, wherein y2=y3-((x3-x2)/(x3-x1)*(y3-y1)). Hence, for the variable x2, the corresponding iterated y2. In this instance, x2 was the GHP design heat pump EWT (95 deg. F.) and y2 is the iterated, standardized, and calculated heat pump capacity (45.95 MBTU/hr). Here, it is contemplated within the scope of the disclosure described herein that any other variable arrays and data can be used to calculate, solve, standardize, iterate, correct data using the process of FIGS. 20, 20A, 20B, and 20C, including but not limited to: flow rate, entering/inlet/outlet water and air temperature, power, freeze points, capacity, thermal loads, outside and wet bulb temperatures, building operating schedule, step loads, hybrid design, conditions, GHP design data, GHP benchmark data, BTUs to and from the ground, electric operating costs, ground condition, borehole data, long term temperature ground effect, thermal interference between boreholes, borehole length at 1-50 years, among others, or for any aforementioned calculations with respect to FIGS. 1-19 of the disclosure described herein.

Referring to FIGS. 20, 20A, 20B, and 20C, in another aspect of the disclosure described herein, a method of simulating a ground geothermal heat pump design disclosed. The method can include receiving or retrieving a first array having a plurality of temperature data values each assigned to plurality of keys, receiving or retrieving a second array having a plurality of heat pump data values each assigned to a plurality of keys, determining the last key in the first array having the highest temperature data value, receiving a first temperature input variable, receiving, retrieving, or defining a first variable to be the first temperature input variable, determining if the first variable or the first temperature input variable is greater than or equal to the last key from the first array, re-defining the first variable, wherein the re-defined first variable is the number one subtracted from the last key from the first array. In addition, the method can include subtracting the re-defined first variable from the last key in the first array and determining if the result is greater than or equal to zero, assigning, defining, or retrieving a second variable with a key to a value from the second array having the same key, assigning, defining, or retrieving a third variable with a key to a value from first array having the same key, assigning, defining, or retrieving a fourth variable to a last value from the second array, assigning, defining, or retrieving a fifth variable to the last key from the first array. In addition, the method can include calculating, interpolating, or extrapolating the received first temperature input variable, the second variable, the third variable, the fourth variable, and the fifth variable to calculate a sixth variable.

In addition, the method can further include executing a loop operation, wherein the loop operation is comprised of re-assigning the last key from the first array with the highest temperature value that resulted in subtracting the re-defined first variable from the re-assigned last key not being greater than or equal to zero. Here, the loop operation further comprises assigning a last value from the second array with the highest heat pump value that resulted in subtracting the re-defined first variable from the re-assigned last key not being greater than or equal to zero. Further, the plurality of temperature data values in the first array can include entering water temperatures. In addition, the plurality of heat pump data values in the second array can include heat pump capacity. Further, the plurality of heat pump data values in the second array can include heat pump power.

Referring to FIGS. 20, 20A, 20B, and 20C, another aspect of the disclosure described herein can include a method of simulating a ground geothermal heat pump design or a non-transitory computer readable-medium storing a program for simulating an in-ground geothermal heat pump design, wherein the program is implemented by one or more processors executing processor instructions. Here, the method or program can include receiving a first array having a plurality of temperature data values each assigned to plurality of keys, receiving a second array having a plurality of heat pump data values each assigned to a plurality of keys, finding or determining the last key in the first array having the highest temperature data value, receiving a first temperature input variable, defining a first variable to be the first temperature input variable, determining if the first variable or the first temperature input variable is greater than or equal to the last key from the first array, determining if the first temperature input variable is less than or equal to the value assigned to the starting key in the first array. The method or program can further include subtracting the first variable from the last key in the first array and determining if the result is greater than or equal to zero, assigning a second variable with a key to a value from the second array having the same key, assigning a third variable with a key to a value from first array having the same key, assigning a fourth variable to a value from the second array, assigning a fifth variable to a value from the first array, and interpolating or extrapolating the received first temperature input variable, the assigned second variable, the assigned third variable, the assigned fourth variable, and the assigned fifth variable to calculate a sixth variable.

In addition, the method or program can also include wherein the loop operation is comprised of re-assigning the last key from the first array with the highest temperature value that resulted in subtracting the first variable from the re-assigned last key not being greater than or equal to zero. Further, the loop operation can also include assigning a last value from the second array with the highest heat pump value that resulted in subtracting the first variable from the re-assigned last key not being greater than or equal to zero. In addition, the plurality of temperature data values in the first array can include entering water temperatures. Also, the plurality of heat pump data values in the second array can include heat pump capacity. In addition, the plurality of heat pump data values in the second array can include heat pump power.

Referring to FIGS. 20, 20A, 20B, and 20C, another aspect of the disclosure described herein can include a method of simulating a ground geothermal heat pump design or a non-transitory computer readable-medium storing a program for simulating an in-ground geothermal heat pump design, wherein the program is implemented by one or more processors executing processor instructions. Here, the method or program can include receiving a first array or list having a plurality of temperature data values each assigned or mapped to a plurality of keys, receiving a second array or list having a plurality of heat pump data values each assigned or mapped to a plurality of keys, determining the last key in the first array having the highest temperature data value, receiving a first temperature input variable, defining or assigning a first variable to be the first temperature input variable, determining if the first variable or the first temperature input variable is greater than or equal to the last key from the first array, determining if the first temperature input variable is less than or equal to the value assigned to the starting in the first array, re-defining the first variable, wherein the re-defined first variable is the number one added to the starting key from the first array. In addition, the method or program can include subtracting the re-defined first variable from the last key in the first array and determining if the result is greater than or equal to zero, executing a loop operation, wherein the loop operation is comprised of re-assigning the last key from the first array with the highest temperature value that resulted in subtracting the re-defined first variable from the re-assigned last key not being greater than or equal to zero. The method or program can also include assigning a second variable with a key to a value from the second array having the same key, assigning a third variable with a key to a value from first array having the same key, assigning a fourth variable to a value from the second array, assigning a fifth variable to the re-assigned last key value from the first array, and interpolating or extrapolating the received first temperature input variable, the assigned second variable, the assigned third variable, the assigned fourth variable, and the assigned fifth variable to calculate a sixth variable.

The method or program can also include wherein the loop operation further includes assigning or retrieving a last value from the second array with the highest heat pump data value that resulted in subtracting the re-defined first variable from the re-assigned last key not being greater than or equal to zero. Here, the plurality of temperature data values in the first array can include entering water temperatures. The the plurality of heat pump data values in the second array can include heat pump capacity data. In addition, the plurality of heat pump data values in the second array can include heat pump power data.

It is contemplated within the scope of the disclosure described herein that the GHP application of the disclosure described herein can be applied for any type of loop field for an in-ground geothermal system, including but not limited to closed vertical ground loops, closed horizontal ground loops, closed slinky coil ground loops, closed pond ground loops, and open geothermal ground loops. For example, with respect to horizontal ground loops or horizontal boreholes, horizontal boreholes are similar to vertical boreholes with almost the same design parameters except horizontal boreholes are closer to the surface with most of the borehole running horizontal to the surface at a depth of about 15 to 45 ft. below the surface. Generally, the entry into the ground is at an angle of about 18° and then levels off when reaching the level depth and then existing back to the surface with a similar angle. Further, up to three horizontal boreholes can be laid near the surface as long as they have a separation spacing of about 15 ft. Further, the header connections are nearly the same as the vertical borehole assembly. Here, horizontal trenches can also be used in the GHP application of the disclosure described herein using a flattened circular coil arrangement similar to a "slinky toy." In addition, extra length of piping is typically required to offset the climate condition at a minimum depth of about 6 ft. below the surface. Other parameters different from the vertical borehole design when determining the slinky piping length and the trench length is the width of the trench or the diameter of the pipe coil, and the overlap spacing called the "pitch". In addition, the center-to-center spacing between the trenches is also considered, along with the diameter of the HDPE pipe. Hence, the aforementioned can further be designed and simulated with the GHP application of the disclosure described herein.

In addition, it is contemplated within the scope of the disclosure described herein that the GHP application can be for modeling or simulating a GHP design for any type of building, including but not limited to: residential, commercial, industrial, government, office building, high-rise building, mid-rise building, school building, college or university building, dormitory building, apartment/condominium building, manufacturing plant building, distribution building, warehouse, agricultural building, underground building, residential house, or any other type of building or enclosure.

What is claimed is:
1. A method of simulating and interacting between an in-ground geothermal heat pump and a supplemental heating or cooling component, the method comprising:
receiving a geographical location;

receiving temperature data based on the geographical location, wherein the temperature data comprises a plurality of ambient temperature values for each of the 8760 hours in a year;

receiving a building type;

receiving an operating schedule for the building type, wherein the operating schedule is comprised of operating hours for the building type for one or more days in a week;

receiving one or more zones for the building type;

receiving an in-ground geothermal heat pump type for the one or more zones;

receiving a load amount to be transferred to a supplemental cooling or heating component;

receiving one or more internal heat conditions for each of the one or more zones;

receiving a block heating or cooling load condition for each of the one or more zones;

determining a plurality of zone load conditions for each of the one or more zones from the block heating or cooling load condition, wherein the plurality of zone load conditions are determined for each of the ambient temperature values based on the operating hours in the operating schedule;

applying the internal heat conditions to the plurality of zone load conditions;

determining an event wherein the plurality of zone load conditions for each of the ambient temperature values based on the operating hours in the operating schedule are at least partially split between the in-ground geothermal heat pump and the supplemental cooling or heating component, wherein the event is further based on the received load amount to be transferred to the supplemental cooling or heating component;

determining a first operation capacity for the in-ground geothermal heat pump and a second operation capacity for the supplemental heating or cooling component; and upon triggering of the event, initiating operation of the supplemental heating or cooling component for the second operation capacity.

2. The method of claim 1, wherein the event is comprised of a calculated or pre-defined entering water temperature to the in-ground geothermal heat pump.

3. The method of claim 1, wherein the event is comprised of a calculated or pre-defined amount of heat transfer to the in-ground geothermal heat pump.

4. The method of claim 1, wherein the first operation capacity for the in-ground geothermal heat pump comprises at least one of: a borehole length, number of boreholes, pipe length, or heat pump power capacity.

5. The method of claim 1, wherein the second operation capacity for the supplemental heating or cooling component comprises at least one of: one or more of hours of operation for the cooling or heating units, or power capacity for the cooling or heating units.

6. The method of claim 1, further comprising determining a borehole requirement.

7. The method of claim 6, wherein the borehole requirement is comprised of the number of boreholes and length per borehole.

8. The method of claim 7, further comprising automatically adjusting the borehole requirement based on the amount to be directed to the supplemental cooling or heating component.

9. The method of claim 1, wherein the supplemental heating or cooling component is comprised of one or more of: a cooling tower, fluid cooler, chiller, boiler, furnace, hot water heater, and secondary ground loop.

10. A method of simulating a hybrid ground geothermal heat pump system, the method comprising:

receiving a geographical location;

receiving temperature data based on the geographical location, wherein the temperature data comprises a plurality of ambient temperature values for each of the 8760 hours in a year;

receiving a building type;

receiving an operating schedule for the building type, wherein the operating schedule is comprised of operating hours for the building type for one or more days in a week;

receiving one or more zones for the building type;

receiving a geothermal heat pump system type for the one or more zones;

receiving an amount to be directed to a supplemental cooling or heating component comprised of at least of one of: a cooling tower, fluid cooler, chiller, boiler, furnace, hot water heater, or secondary ground loop;

receiving one or more internal heat conditions for each of the one or more zones;

receiving a block heating or cooling load condition for each of the one or more zones;

determining a plurality of zone load conditions for each of the one or more zones from the block heating or cooling load condition, wherein the plurality of zone load conditions are determined for each of the ambient temperature values based on the operating hours in the operating schedule;

applying the internal heat conditions to the plurality of zone load conditions;

determining a first condition wherein the plurality of zone load conditions for each of the ambient temperature values based on the operating hours in the operating schedule are at least partially split between the geothermal heat pump system and the cooling or heating component, wherein the first condition is further based on the received amount to be directed to the supplemental cooling or heating component;

determining a first operation capacity for the geothermal heat pump system and a second operation capacity for the supplemental heating or cooling component;

operating the first operation capacity for the geothermal heat pump system; and upon meeting the first condition, initiating the second operation capacity for the supplemental heating or cooling equipment for handling a portion of the received amount.

11. The method of claim 10, wherein the first condition is comprised of a calculated or pre-defined entering water temperature to the geothermal heat pump system.

12. The method of claim 10, wherein the condition is comprised of a calculated or pre-defined amount of heat transfer to the geothermal heat pump system.

13. The method of claim 10, wherein the first operation capacity for the geothermal heat pump system comprises at least one of: a borehole length, number of boreholes, pipe length, or heat pump power capacity.

14. The method of claim 10, wherein the second operation capacity for the supplemental heating or cooling component comprises at least one of: one or more of hours of operation for the cooling or heating units, or power capacity for the cooling or heating units.

15. The method of claim 10, further comprising determining a borehole requirement.

16. The method of claim 15, wherein the borehole requirement is comprised of the number of boreholes and length per borehole.

17. The method of claim 16, further comprising automatically adjusting the borehole requirement based on the amount to be directed to the supplemental cooling or heating component.

18. A method of simulating a hybrid ground geothermal heat pump system, the method comprising:
- receiving a geographical location;
- receiving temperature data based on the geographical location, wherein the temperature data comprises a plurality of ambient temperature values for each of the 8760 hours in a year;
- receiving a building type;
- receiving an operating schedule for the building type, wherein the operating schedule is comprised of operating hours for the building type for one or more days in a week;
- receiving one or more zones for the building type;
- receiving a geothermal heat pump system type for the one or more zones;
- receiving one or more internal heat conditions for each of the one or more zones;
- receiving a block heating or cooling load condition for each of the one or more zones;
- determining a plurality of zone load conditions for each of the one or more zones from the block heating or cooling load condition, wherein the plurality of zone load conditions are determined for each of the ambient temperature values based on the operating hours in the operating schedule;
- applying the internal heat conditions to the plurality of zone load conditions;
- calculating a threshold event wherein a portion of the zone load conditions are transferred to a supplemental cooling or heating component;
- determining a first operation capacity for the geothermal heat pump system and a second operation capacity for the supplemental heating or cooling component;
- operating the first operation capacity for the geothermal heat pump system; and
- upon meeting the threshold event, initiating the second operation capacity for the supplemental heating or cooling component.

19. The method of claim 18, wherein the threshold event is comprised of a calculated or pre-defined entering water temperature to the geothermal heat pump system.

20. The method of claim 18, wherein the threshold event is comprised of a calculated or pre-defined amount of heat transfer to the geothermal heat pump system.

* * * * *